US008625996B2

(12) United States Patent
Tanaka et al.

(10) Patent No.: US 8,625,996 B2
(45) Date of Patent: Jan. 7, 2014

(54) OPTICAL TRANSMITTER, OPTICAL TRANSMISSION METHOD, AND WAVELENGTH-SELECTIVE VARIABLE DELAYER

(75) Inventors: Toshiki Tanaka, Kawasaki (JP); Hisao Nakashima, Kawasaki (JP); Takeshi Hoshida, Kawasaki (JP); Toru Katagiri, Kawasaki (KR); Hiroki Ooi, Kawasaki (JP); Akira Miura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1220 days.

(21) Appl. No.: 11/939,646

(22) Filed: Nov. 14, 2007

(65) Prior Publication Data

US 2012/0170928 A1      Jul. 5, 2012

(30) Foreign Application Priority Data

Dec. 28, 2006    (JP) ................................. 2006-356187

(51) Int. Cl.
*H04B 10/00* (2013.01)
(52) U.S. Cl.
USPC ............................ 398/161; 398/159; 398/194
(58) Field of Classification Search
USPC ........................ 398/159, 161, 193, 194, 195
See application file for complete search history.

(56) References Cited

U.S. PATENT DOCUMENTS

| | | | | |
|---|---|---|---|---|
| 6,124,960 A | * | 9/2000 | Garthe et al. | ................. 398/194 |
| 6,381,048 B1 | * | 4/2002 | Chraplyvy et al. | ............. 398/79 |
| 6,427,043 B1 | | 7/2002 | Naito | |
| 6,681,082 B1 | * | 1/2004 | Tanaka et al. | ................. 398/158 |
| 2002/0071155 A1 | * | 6/2002 | Inada et al. | .................... 359/124 |
| 2003/0035172 A1 | * | 2/2003 | Chen et al. | .................... 359/127 |
| 2006/0029398 A1 | | 2/2006 | Liu et al. | |

FOREIGN PATENT DOCUMENTS

| | | |
|---|---|---|
| JP | 7-66779 | 3/1995 |
| JP | 9-93224 | 4/1997 |
| JP | 2000-357992 | 12/2000 |
| JP | 2001-94511 | 4/2001 |
| JP | 2002-57623 | 2/2002 |
| JP | 2002-185402 | 6/2002 |
| JP | 2003-224521 | 8/2003 |
| JP | 2003-224527 | 8/2003 |
| JP | 2006-50640 | 2/2006 |

OTHER PUBLICATIONS

Japanese Office Action issued on Apr. 9, 2009 in corresponding Japanese Patent Application 2006-356187.
G. Charlet, et al., "Nonlinear Interactions Between 10Gb/s NRZ Channels and 40Gb/s Channels with RZ-DQPSK or PSBT Format, over Low-Dispersion Fiber", Mo3.2.6 ECOC 2006.

(Continued)

*Primary Examiner* — Nathan Curs
(74) *Attorney, Agent, or Firm* — Staas & Halsey LLP

(57) ABSTRACT

An optical transmitter is provided for transmitting a wavelength multiplexed signal comprising an intensity modulation optical signal and a phase modulation optical signal through a transmission line. The optical transmitter includes a bit time difference given signal generator for generating at least two optical signals having a bit time difference therebetween, from the wavelength multiplexed signal. The optical transmitter further includes a wavelength multiplexed signal output unit to which at least two optical signals are input from the bit time difference given signal generator, and which generates and outputs a wavelength multiplexed signal in which the bit time difference was given between the phase modulation optical signal and the phase modulation optical signal.

10 Claims, 41 Drawing Sheets

(56) References Cited

OTHER PUBLICATIONS

G. Bellotti, et al., "Cross-Phase Modulation Suppressor for Multispan Dispersion-Managed WDM Transmissions", IEEE Photonics Technology Letters, vol. 12, No. 6, pp. 726-728, Jun. 2000.

G. Bellotti, et al., "10 X 10 Gb/s Cross-Phase Modulation Suppressor for Multispan Transmissions Using WDM Narrow-Band Fiber Bragg Gratings", IEEE Photonics Technology Letters, vol. 12, No. 10, pp. 1403-1405, Oct. 2000.

Japanese Office Action issued Sep. 3, 2013 in corresponding Japanese Application No. 2012-199258.

* cited by examiner

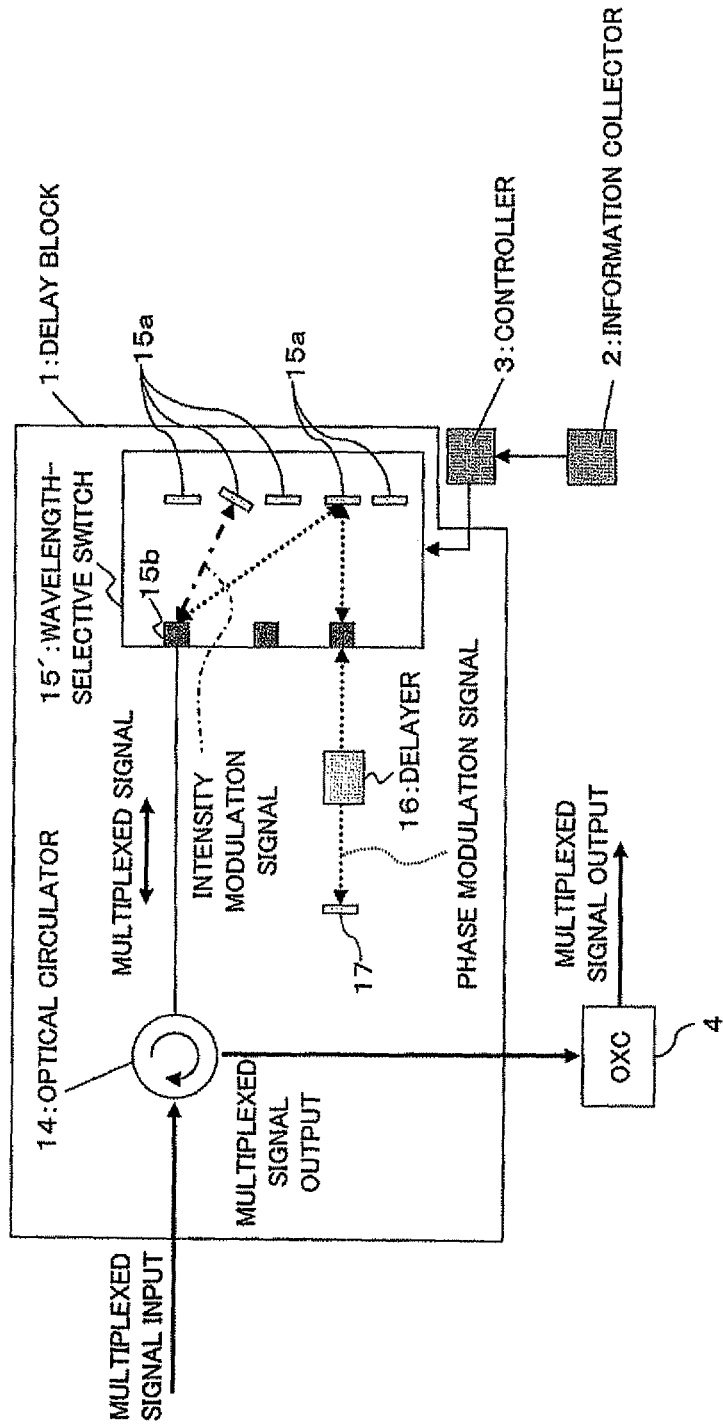

FIG. 5

| No. | INFORMATION | INFORMATION SOURCE | REMARKS |
|---|---|---|---|
| #1 | KIND OF TRANSMISSION FIBER | INFORMATION HELD IN A RELAY TRANSMITTER OR ESTIMATE FROM THE ITEMS #2, #3, AND #4 | |
| #2 | DISPERSION QUANTITY OF A DISPERSION COMPENSATING MODULE | INFORMATION HELD IN A RELAY TRANSMITTER | |
| #3 | SPAN LOSS IN A TRANSMISSION FIBER | INFORMATION MONITORED IN A RELAY TRANSMITTER (= OUTPUT POWER − INPUT POWER − RAMAN GAIN) | MONITOR THE POWER OF AN OPTICAL SIGNAL OR OSC |
| #4 | DISTANCE OF A TRANSMISSION FIBER | INFORMATION HELD IN A RELAY TRANSMITTER | |
| #5 | MODULATION METHOD OF EACH SIGNAL | INFORMATION HELD OR MONITORED IN A RELAY TRANSMITTER (ESTIMATE FROM "OCM") | RELATIONSHIP BETWEEN WAVELENGTH AND A MODULATION METHOD |
| #6 | BIT RATE OR SYMBOL RATE OF EACH SIGNAL | INFORMATION HELD OR MONITORED IN A RELAY TRANSMITTER (ESTIMATE FROM "OCM") | |
| #7 | OPERATIVE STATE OF THE WAVELENGTH OF AN OPTICAL SIGNAL | INFORMATION HELD OR MONITORED IN A RELAY TRANSMITTER (ESTIMATE FROM "OCM") | |

OPTICAL TRANSMITTER, OPTICAL TRANSMISSION METHOD, AND WAVELENGTH-SELECTIVE VARIABLE DELAYER

BACKGROUND OF THE INVENTION

1) Field of the Invention

The present invention relates to optical transmitters and optical transmission methods suitable for use in optical WDM (Wavelength-Division Multiplexing) communication systems.

2) Description of the Related Art

WDM transmission techniques, which employ 2.5-Gbps (Gbit/s) or 10-Gbps intensity modulation (on-off keying) optical signals of tens of wavelengths, have now been put to practical use in land transmission systems and submarine transmission systems, such as access network systems, metro network systems, long-distance network systems, etc. For 40-Gbps WDM systems that will be put to practical use in a short time, element techniques and development of devices have accelerated in recent years, and the 40-Gbps WDM systems are required to have the same transmission distance and frequency utilization factor as the 10-Gbps transmission systems.

As a means of realizing 40-Gbps WDM transmission systems, deep study has been devoted to modulation methods such as optical duobinary, CS-RZ (Carrier Suppressed-Return to Zero), DPSK (Differential Phase-Shift Keying), DQPSK (Differential Quadrature Phase-Shift Keying), and the like. These modulation methods are promising modulation techniques as a means of realizing 40-Gbps WDM transmission systems, because they are better in part or all of frequency utilization factor, OSNR (Optical Signal-to-Noise Ratio), and nonlinearity endurance than NRZ (Non-Return-to-Zero) used in transmission systems of 10 Gbps or less.

Among these modulation methods, DQPSK is a method in which one wavelength channel is modulated into four different phase angles to simultaneously transmit two bits per code. In this method, the pulse repeated frequency, that is, code transmission speed is reduced to half (e.g., 20 GHz) with respect to a data transmission rate (e.g., 40 Gbps). Compared with the conventional on-off keying, the signal spectral width becomes about half, so DQPSK is superior in frequency utilization factor, chromatic dispersion tolerance, and optical device transmission characteristics. Because of this, in the field of optical transmission systems, the use of phase modulation methods, such as DPSK, DQPSK, etc., is being actively investigated.

The WDM transmission systems, which have widely been put to practical use in various systems and employ 2.5-Gbps or 10-Gbps intensity modulation (on-off keying) optical signals, can be strengthened by increasing the number of wavelengths to be multiplexed. For example, some of C-band optical amplifiers have an optical signal band of about 32 nm, so if wavelength spacing is 100 GHz (about 0.8 nm), a maximum number of 40 channels can be transmitted. The WDM transmission systems themselves have the capacity of transmitting 40 channels. But, depending on the operating state of a network, users gradually increase the number of wavelengths that are used.

However, as set forth above, if the number of wavelengths multiplexed is increased to strengthen systems, the wavelength spacing becomes narrower, the walk-off quantity between wavelengths becomes smaller, and the influence of cross-phase modulation (which is nonlinear effects between wavelengths) becomes greater. In cross-phase modulation, the refractive index of an optical fiber changes in proportion to variations in the intensity of one optical channel, and this change in the refractive index modulates the phase of other optical channels.

FIGS. 42A to 42C conceptually show the phenomenon of cross-phase modulation between optical pulses. In FIG. 42A, $\lambda 1$ and $\lambda 2$ represent two optical pluses of different wavelengths, and from chromatic dispersion characteristics of an optical fiber, suppose that the speed of a first optical pulse of $\lambda 1$ is faster than that of a second optical pulse of $\lambda 2$. When the two optical pulses propagate through an optical fiber, the first optical pulse of $\lambda 1$ travels faster than the second optical pulse of $\lambda 2$. Therefore, as shown in FIG. 42B, the rising part of the first optical pulse of $\lambda 1$ begins to overlap with the falling part of the second optical pulse of $\lambda 2$.

At that stage, the falling part of the second optical pulse of $\lambda 2$ is shifted in phase by red chirp caused by the rising part of the first optical pulse of $\lambda 1$. If the two optical pulses of $\lambda 1$ and $\lambda 2$ further travel, as shown in FIG. 42C, the first optical pulse of $\lambda 1$ will pass the second optical pulse of $\lambda 2$ and the falling part of the first optical pulse of $\lambda 1$ will overlap with the rising part of the second optical pulse of $\lambda 2$. At this stage, the rising part of the second optical pulse of $\lambda 2$ is shifted in phase by blue chirp caused by the falling part of the first optical pulse of $\lambda 1$.

FIGS. 43A, 43B, 43C, and 43D are diagrams used to explain how chirp remains behind because of cross-phase modulation that arises during each relay span. As shown in FIG. 43A, in the case where transmission fibers 210 with a positive dispersion value are connected in multiple stages through a plurality of lumped-parameter optical amplifiers 220, as shown in FIG. 43B, an optical signal being transmitted through the transmission fiber 210 between two lumped-parameter optical amplifiers 220 has a relatively large optical power immediately after the lumped-parameter optical amplifier 220, but the optical power attenuates with propagation (first relay span). Then, if the optical signal is input to the next lumped-parameter optical amplifier 220, it is amplified to a relatively large optical power again and transmitted through the downstream transmission fiber 210. However, the optical power attenuates again with propagation (second relay span).

Now, suppose that the relay span between two lumped-parameter optical amplifiers 220 in FIG. 43A is 100 km, the chromatic dispersion near the wavelength of an optical signal is 2.5 ps/km/nm, the signal wavelength spacing is 0.8 nm, and the data transmission rate is 20 Gbit/s. The delay of an optical signal of an adjacent wavelength caused by chromatic dispersion can be expressed by the following Equation:

$$\text{Delay(ps)} = D(\text{ps/km/nm}) \times L(\text{km}) \times \Delta\lambda(\text{nm}) \quad (1)$$

where
D=chromatic dispersion,
L=transmission distance,
$\Delta\lambda$=wavelength spacing.

If a wavelength multiplexed optical signal is transmitted 25 km, the time delay between adjacent wavelengths is 2.5 (ps/km/nm)×25 (km)×0.8 (nm)=50 (ps) from Equation (1). This means that an adjacent optical pulse delays 1 bit because the bit interval of a 20-Gbit/s signal is 50 ps.

That is, at the spot (coordinates 0 km) immediately after a lumped-parameter optical amplifier 220, in the case where optical pulses of adjacent wavelengths $\lambda 11$ and $\lambda 2$ are about to, what is called, collide with each other (see FIGS. 42A to 42C), red chirp and blue chirp arise once during a transmission of 25 km. Therefore, in the case of a relay span of 100 km, the time delay is 2.5 (ps/km/nm)×100(km)×0.8(nm)=200

(ps). That is, the time delay between optical pulses of adjacent wavelengths is four bits, so blue chirp arises 4 times and red chirp arises 4 times. For instance, if the second optical pulse of λ2 passes through a transmission fiber 210 with a length of 100 km, it will arrive after a delay of four bits from the first optical pulse of λ1.

Now, assuming the signal bit patterns of two different adjacent wavelength signals λ1 and λ2 are all "1"s, consider the cross-phase modulation between the two wavelengths λ1 and λ2. After a wavelength multiplexed signal has been amplified to a desired level by the lumped-parameter optical amplifier 220, it is transmitted through the transmission fiber 210 of the next stage. During the span of this transmission fiber 210, the above-described cross-phase modulation arises between the two different wavelengths λ1 and λ2.

When there is no optical power attenuation over the span of the transmission fiber 210 through which the two different wavelengths λ1 and λ2 are transmitted, the quantities of red chirp and blue chirp that the second optical pulse of λ2 undergoes by the first optical pulse of λ1 become equal to each other. Therefore, they cancel each other when the first optical pulse of λ1 passes the second optical pulse of λ2. As a result, there is no possibility that the second optical pulse of λ2 will be shifted in phase by cross-phase modulation.

However, as shown in FIG. 43B, the optical power of an optical signal is attenuated as it is propagated through the transmission fiber 210. Therefore, as shown in FIG. 34C, the quantity of red chirp, which arises as first optical pulse of λ1 overlaps with the second optical pulse of λ2, is slightly larger than that of blue chirp that arises as the first optical pulse of λ1 passes the second optical pulse of λ2 from the overlapping state. Because of this, the two chirp quantities will not cancel each other, and the red chirp that has arisen at the location of the higher optical power will remain behind slightly.

Thus, during the span of the transmission fiber 210, as shown in FIG. 43D, red chirp always remains behind because of cross-phase modulation, and in total, it remains behind by ΔC. In this case, the second optical pulse of λ2 is shifted in phase by the residual red chirp, and the group speed of a wavelength multiplexed signal passing through an optical fiber changes.

In a relay transmitter including the lumped-parameter optical amplifier 220, dispersion compensation is normally performed to suppress waveform degradation. In the case where the propagation time delay difference between adjacent wavelengths λ1 and λ2 is compensated at each relay stage with the dispersion compensating function, and the bit patterns of adjacent wavelength signals input to the lumped-parameter amplifier 220 of each stage become practically the same, the residual red chirp in each relay stage accumulates. Because of this, as shown in FIGS. 43C and 43D, the residual chirp ΔC during each relay span is multiplied by the number of relay stages, resulting in severe waveform degradation.

Therefore, the optical pulse of λ2 is shifted in phase by the residual red chirp, the group speed passing through an optical fiber changes, and this influence remains behind at the end of each relay span. In the case of intensity modulation optical signals, the residual chirp causes jitter (deviation from the center position of a received pulse) at the signal receiving end, and in the case of phase modulation optical signals, the residual chirp becomes the direct noise component of a symbol code and degrades transmission performance.

Thus, because intensity distortion between adjacent wavelengths causes phase fluctuations and degrades transmission properties, cross-phase modulation has become an important consideration in wavelength multiplexing long-distance transmission systems in which a collision of optical pulses is repeated between adjacent wavelengths.

Note that the related art of the present invention is shown in non-patent document 1 (G. Charlet, et. al., "Nonlinear Interactions Between 10 Gb/s NRZ Channels and 40 Gb/s Channels with RZ-DQPSK or PSBT Format, over Low-Dispersion Fiber", Mo3.2.6, ECOC 2006).

Multiplexing and transmitting channels of phase modulation optical signals (modulated in phase modulation methods described above) and channels of intensity modulation optical signals are being examined. That is, multiplexing intensity modulation and phase modulation optical signals can increase the frequency utilization factor, and employ the existing equipment for WDM transmission of intensity modulation optical signals to upgrade transmission systems in steps and efficiently.

However, in upgrading transmission systems, when it is necessary to multiplex and transmit intensity modulation and phase modulation optical signals, nonlinear effects (cross-phase modulation) due to variations in the intensity of an intensity modulation optical signal greatly affect the reception quality of phase modulation optical signals.

That is, in systems for WDM transmission of intensity modulation optical signals, for example, nonzero dispersion-shifted fibers (NZDSFs) with a relatively small chromatic dispersion value per unit of length are sometime employed as transmission fibers to balance self-phase modulation and cross-phase modulation so that optimum reception signal quality is obtained.

However, in transmission systems with transmission fibers whose chromatic dispersion is small per unit of length, if the function of multiplexing phase modulation optical signals such as DQPSK signals is added, in nonzero dispersion-shifted fibers it cannot prove definitely that the code walk-off (or relative propagation speed difference in a transmission fiber) between wavelength channels is great enough to avoid the influence of cross-phase modulation that phase modulation optical signals undergo.

In other words, when employing nonzero dispersion-shifted fibers (NZDSFs), if phase modulation optical signals are arranged according to the conventional channel arrangement that could be used for wavelength-multiplexing intensity modulation optical signals, and are multiplexed along with phase modulation optical signals of other channels, the degradation of the reception signal quality of phase modulation optical signals due to cross-phase modulation becomes greater compared with the case of WDM transmission of only phase modulation optical signals.

The aforementioned non-patent document 1 has attained the following results. That is, in the case where 10-Gbps intensity modulation optical signals and 43-Gbps phase modulation optical signals are multiplexed and transmitted through a nonzero dispersion-shifted fiber, if the 10-Gbps intensity modulation optical signals are arranged at wavelengths adjacent to the 43-Gbps phase modulation optical signal, the reception signal quality is degraded compared with the case where 43-Gbps phase modulation optical signals are arranged at all wavelength channels. The non-patent document 1 has also attained the following results. That is, even when the state of polarization is optimum (orthogonal), a Q value representing reception signal quality degrades compared with WDM transmission of only 40-Gbps phase modulation optical signals, and in a parallel polarization state, the Q value degrades about 3 dB.

That is, in upgrading transmission systems, in the case of multiplexing and transmitting intensity modulation and phase modulation optical signals, it is necessary to take more effective countermeasures to suppress cross-phase modulation, compared with the case of the conventional WDM transmission of only 10-Gbps intensity modulation optical signals or WDM transmission for phase modulation optical signals.

The non-patent document 1 does not teach or suggest a means of suppressing the influence of cross-phase modulation that phase modulation optical signals undergo when multiplexing and transmitting intensity modulation and phase modulation optical signals.

SUMMARY OF THE INVENTION

The present invention has been made in view of the circumstances described above. Accordingly, an object of the present invention is to suppress transmission quality degradation in network systems where intensity modulation and phase modulation optical signals are multiplexed.

Note that another object of the present invention includes having advantages that are derived from preferred embodiments presented herein and not obtained by prior art.

Therefore, the present invention is characterized by optical transmitters, an optical transmission method, and a wavelength-selective variable delayer described below.

(1) That is, in accordance with the present invention, there is provided an optical transmitter for transmitting a wavelength multiplexed signal comprising an intensity modulation optical signal and a phase modulation optical signal through a transmission line. The optical transmitter includes two major components: a bit time difference given signal generator for generating at least two optical signals having a bit time difference therebetween, from the wavelength multiplexed signal; and a wavelength multiplexed signal output unit to which the at least two optical signals are input from the bit time difference given signal generator, and which generates and outputs a wavelength multiplexed signal in which the bit time difference was given between the phase modulation optical signal and the intensity modulation optical signal.

(2) In the optical transmitter of the above (1), the bit time difference given signal generator may be constructed such that as the two optical signals, it generates optical signals given a time delay difference by delaying one of two timings at which the two optical signals are input to the wavelength multiplexed signal output unit, with respect to the other of the two timings.

(3) In the optical transmitter of the above (1), the bit time difference given signal generator can be constructed such that as the two optical signals, it generates optical signals loaded with different chromatic dispersion quantities.

(4) In the optical transmitter of the above (1), the bit time difference given signal generator may comprise: a splitting unit for splitting the wavelength multiplexed signal into the at least two optical signals; and a bit time difference giving unit for giving a bit time difference between the at least two optical signals split in the splitting unit.

(5) In the optical transmitter of the above (4), the wavelength multiplexed signal output unit may comprise a wavelength-selective switch.

(6) The optical transmitter of the above (5) may further include an information collector for collecting network management information on properties of transmission lines constituting a network to which the optical transmitter is applied, and about methods in which optical signals are modulated; and a controller for controlling wavelength selection that is performed in the wavelength-selective switch, based on the management information collected in the information collector.

(7) In the optical transmitter of the above (1), the bit time difference given signal generator may comprise: a separating unit for separating the wavelength multiplexed signal into the phase modulation optical signal and the intensity modulation optical signal; and a bit time difference giving unit for giving a bit time difference between the phase modulation optical signal and intensity modulation optical signal separated in the separating unit.

(8) In the optical transmitter of the above (7), the wavelength multiplexed signal output unit can be constituted by a combining unit for combining the phase modulation optical signal and intensity modulation optical signal given the bit time difference in the bit time difference giving unit.

(9) The optical transmitter of the above (7) may further include: an information collector for collecting network management information on properties of transmission lines constituting a network to which the optical transmitter is applied, and about methods in which optical signals are modulated; and a controller for controlling the signal separation that is performed in the separating unit, based on the management information collected in the information collector.

(10) In the optical transmitter of the above (1), the optical transmitter may constitute each of a plurality of optical transmitters for transmitting the wavelength multiplexed signal which are connected in multiple stages through transmission lines in an optical communication system. Each optical transmitter may include a dispersion compensating unit for compensating for chromatic dispersion of a wavelength multiplexed signal that was input through an upstream transmission line. The bit time difference given signal generator may be constructed to generate optical signals having the bit time difference so that a time difference practically larger than a residual dispersion quantity after the compensation is given between the intensity modulation optical signal and the phase modulation optical signal that are input through the dispersion compensating unit.

(11) The optical transmitter of the above (1) may further include an amplifying unit for amplifying the wavelength multiplexed signal that is output from the wavelength multiplexed signal output unit.

(12) In the optical transmitter of the above (1), the optical transmitter may constitute each of a plurality of optical transmitters for transmitting the wavelength multiplexed signal which are connected in multiple stages through transmission lines in an optical communication system, and which each includes a dispersion compensating unit for compensating for chromatic dispersion of a wavelength multiplexed signal that was input through an upstream transmission line. The bit time difference between the optical signals generated in the bit time difference given signal generator may be a bit time difference such that a time difference practically larger than an allowable quantity of a residual dispersion quantity at an end receiving the wavelength multiplexed signal is given between the intensity modulation optical signal and the phase modulation optical signal that are output from the wavelength multiplexed signal output unit.

(13) In the optical transmitters of the above (1) to the above (12), the transmission line may comprise a dispersion-shifted fiber.

(14) In accordance with the present invention, there is provided a second optical transmitter for transmitting a wavelength multiplexed signal comprising an intensity modulation optical signal and a phase modulation optical signal through a transmission line. The second optical transmitter includes four major components: an intensity modulation optical signal generator for generating the intensity modulation optical signal; a phase modulation optical signal generator for generating the phase modulation optical signal; a chromatic dispersion loading unit for spreading out rising and falling parts of a waveform of the intensity modulation optical signal generated in the intensity modulation optical signal generator; and a multiplexing and transmitting unit for multiplexing the intensity modulation optical signal from the chromatic dispersion loading unit and the phase modulation optical signal from the phase modulation optical signal generator and transmitting the multiplexed signal.

(15) In accordance with the present invention, there is provided a third optical transmitter for relaying a wavelength multiplexed signal comprising an intensity modulation optical signal and a phase modulation optical signal through a transmission line. The third optical transmitter includes three major components: a separating unit for separating the wavelength multiplexed signal into a first separation wavelength multiplexed signal and a second separation wavelength multiplexed signal; a roundabout route sending-out unit for sending out the first separation wavelength multiplexed signal on a roundabout route; and a wavelength multiplexing and relaying unit for wavelength-multiplexing the first separation wavelength multiplexed signal that is input through the roundabout route and the second separation wavelength multiplexed signal that is input from the separating unit, and relaying the wavelength multiplexed signal. Among the separating unit, the roundabout route sending-out unit, and the wavelength multiplexing and relaying unit, at least one may have a function of selectively blocking transmission of either the intensity modulation optical signal or the phase modulation optical signal, from the first separation wavelength multiplexed signal. Among the separating unit, the roundabout route sending-out unit, and the wavelength multiplexing and relaying unit, at least one may have a function of selectively blocking transmission of either the intensity modulation optical signal or the phase modulation optical signal, from the second separation wavelength multiplexed signal.

(16) In accordance with the present invention, there is provided a fourth optical transmitter for relaying a wavelength multiplexed signal comprising an intensity modulation optical signal and a phase modulation optical signal through a transmission line. The fourth optical transmitter includes three major components: a line switching unit for selecting a transmission line on which the wavelength multiplexed signal is transmitted; an information collector for collecting network management information on properties of transmission lines constituting a network to which the optical transmitter is applied, and about methods in which optical signals are modulated; and a controller for controlling the transmission line selection that is performed in the switching unit, based on the management information collected in the information collector.

(17) In accordance with the present invention, there is provided a fifth optical transmitter for relaying a wavelength multiplexed signal comprising an intensity modulation optical signal and a phase modulation optical signal through a transmission line. The fifth optical transmitter includes three major components: a separating unit for separating optical signals of one wavelength band of the wavelength multiplexed signal from optical signals of another wavelength band; a wavelength allocation changing unit for changing wavelength allocation of the optical signals of the one wavelength band separated in the separating unit; and a wavelength multiplexing and relaying unit for wavelength-multiplexing the optical signals of the one wavelength band in which wavelength allocation was changed in the wavelength-allocation changing unit, and the optical signals of the other wavelength band, and relaying the wavelength multiplexed signal.

(18) In accordance with the pre sent invention, there is provided a sixth optical transmitter for relaying a wavelength multiplexed signal comprising an intensity modulation optical signal and a phase modulation optical signal through a transmission line. The sixth optical transmitter includes four major components: a wavelength pattern converting unit for converting a wavelength pattern of the wavelength multiplexed signal so that the intensity modulation and phase modulation optical signals are alternatively arranged, and outputting the wavelength converted signal as a wavelength multiplexed signal; a wavelength group dividing unit for dividing the wavelength multiplexed signal, in which the wavelength pattern conversion was performed in the wavelength pattern converting unit, into two wavelength groups with alternate wavelengths as one wavelength group; a bit time difference giving unit for giving a bit time difference between the two wavelength groups divided in the wavelength group dividing unit; and a wavelength group coupling unit for coupling the optical signals of the two wavelength groups, and outputting the coupled signal.

(19) In accordance with the present invention, there is provided a seventh optical transmitter for relaying a wavelength multiplexed signal comprising an intensity modulation optical signal and a phase modulation optical signal through a transmission line. The seventh optical transmitter includes three major components: a separating unit for separating the wavelength multiplexed signal into the intensity modulation optical signal and the phase modulation optical signal; an intensity giving unit for giving an intensity difference between the intensity modulation optical signal and the phase modulation optical signal separated in the separating unit; and a wavelength multiplexing and relaying unit for wavelength-multiplexing the intensity modulation optical signal and phase modulation optical signal given the intensity difference in the intensity giving unit, and relaying the wavelength multiplexed signal.

(20) In accordance with the present invention, there is provided a method of transmitting a wavelength multiplexed signal comprising an intensity modulation optical signal and a phase modulation optical signal through a transmission line. The method includes a step of giving a bit time difference, which differs relatively from that between the intensity modulation optical signal and phase modulation optical signal at modulation, between the intensity modulation optical signal and the phase modulation optical signal that are transmitted as the wavelength multiplexed signal, in order to adjust a mutual phase modulation quantity that the phase modulation optical signal undergoes from the intensity modulation optical signal. The method further includes a step of outputting the wavelength multiplexed signal in which the bit time difference was given between the intensity modulation optical signal and the phase modulation optical signal.

(21) In accordance with the present invention, there is provided a wavelength-selective variable delayer, which includes an input port to which a wavelength multiplexed signal is input, and an output port. The magnitude of a passage time delay from the input port to the output port can be selected and set from at least settings of two stages, for each wavelength channel of the wavelength multiplexed signal.

Thus, the present invention is capable of suppressing transmission quality degradation in network systems where intensity modulation and phase modulation optical signals are multiplexed together. In addition, because transmission systems can be upgraded by phase modulation optical signals, the enhancement of system performance (a wavelength utilization factor, an OSNR (optical signal-to-noise ratio) characteristic, etc.) can be expected, and the flexibility of network design and management can be increased.

BRIEF DESCRIPTION OF THE DRAWINGS

The present invention will be described in further detail with reference to the accompanying drawings wherein:

FIG. 4 is a block diagram for explaining another specific configuration of the delay block shown in FIG. 2;

FIG. 5 is a diagram showing an example of the management information of the network system that collects in an information collector;

FIG. 6, which includes

FIG. 42, which includes FIG. 43, which includes

DESCRIPTION OF THE PREFERRED EMBODIMENTS

Preferred embodiments of the present invention will hereinafter be described in detail with reference to the accompanying drawings.

Note that the present invention is not to be limited to the following embodiments. The foregoing and other objects, features, and advantages of the present invention will become more apparent from preferred embodiments presented below.

[A] First Embodiment

Figure 1:
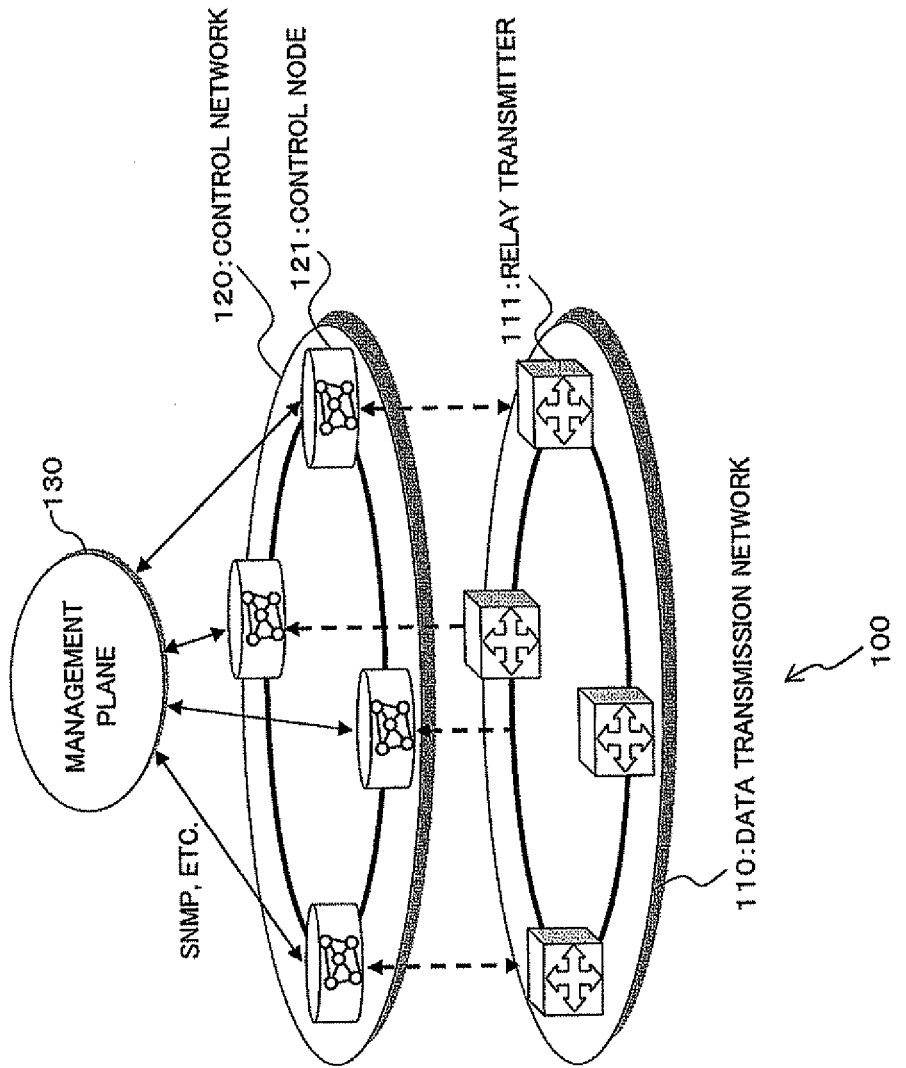
FIG. 1 is a diagram showing the configuration of a network system to which an optical transmitter according to a first embodiment of the present invention is applied.

Referring to FIG. 1, there is shown a network system to which an optical transmitter according to a first embodiment of the present invention is applied. The network system 100 shown in the figure is constituted by a data transmission network 110, a control network 120 which controls the data transmission network 110, and a management plane 130 which manages the control network 120. The data transmission network 110 includes a plurality of optical transmitters 111, which are interconnected. The control network 120 includes a plurality of control nodes 121, which are connected with one another and disposed so as to correspond to the optical transmitters 111 forming the data transmission network 110.

With the above configuration, the control nodes 121 forming the control network 120 extract information from the optical transmitters (relay transmitters) 111 of the data transmission network 110 (which are target objects in the data transmission network 110), thereby being able to control operation of the optical transmitters 111 (see each dashed line in FIG. 1). The management plane 130 uses management protocols such as SNMP (Simple Network Management Protocol) to collect the information extracted by each control node 121.

Figure 2:
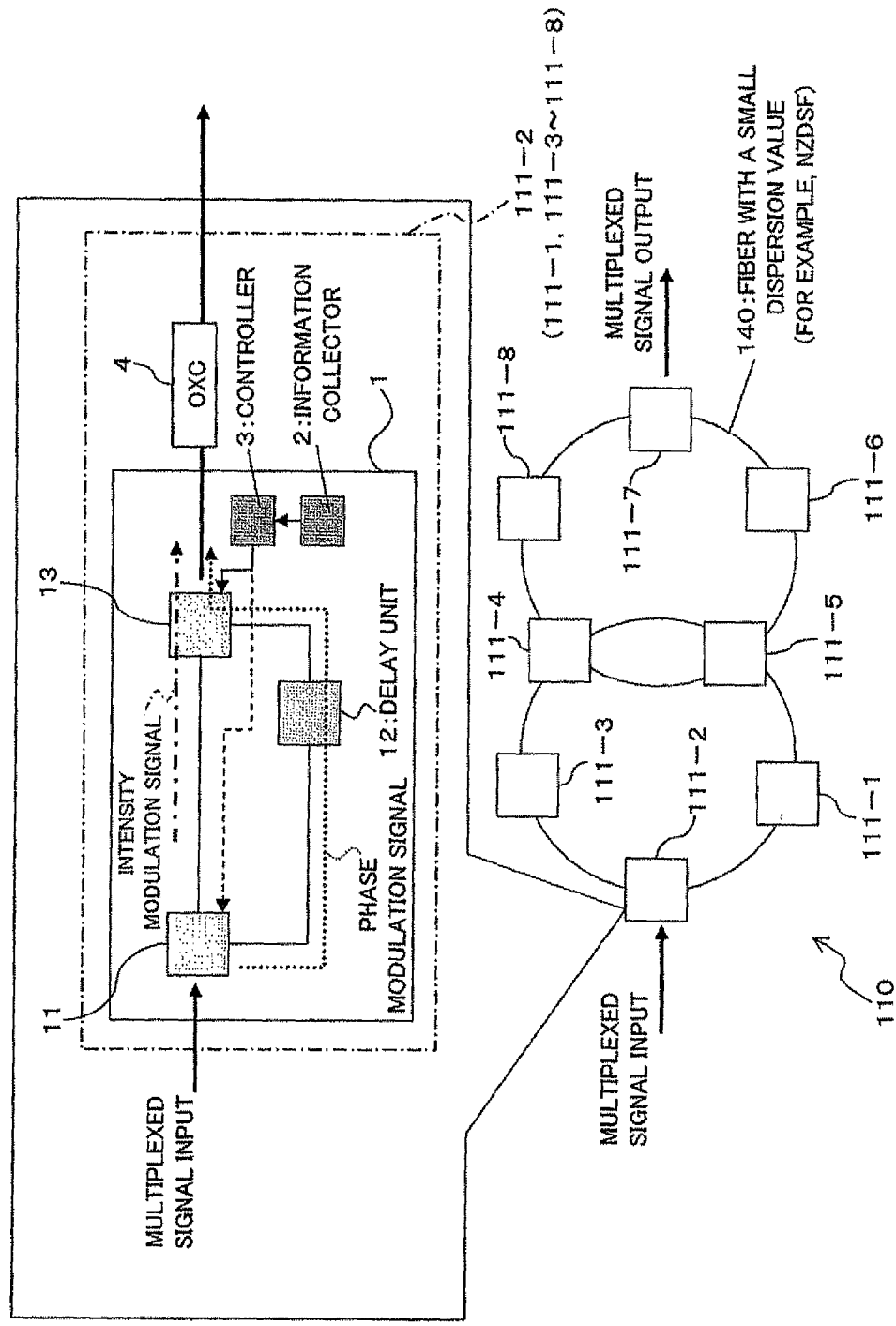
FIG. 2 is a block diagram used to explain the configuration of the optical transmitter of the first embodiment along with the configuration of a data transmission network.

FIG. 2 is a block diagram used to explain the configuration of the optical transmitter 111 along with the configuration example of the data transmission network 110. In the data transmission network 110 shown in the figure, optical transmitters 111-1 to 111-5 are connected in ring form through a transmission fiber 140 with a small dispersion value (e.g., NZDSF (Nonzero Dispersion-Shifted Fiber)), and optical transmitters 111-4 to 111-8 also are connected in ring form through a transmission fiber 140 with a small dispersion value (e.g., NZDSF (Nonzero Dispersion-Shifted Fiber)). In FIG. 2, when the optical transmitters 111-1 to 111-8 are not discriminated from one another, they are referred to collectively as optical transmitter 111.

In addition to having the function of selecting a route for each wavelength of a wavelength multiplexed input signal, each of the optical transmitters 111-1 to 111-8 constituting the data transmission network 110 shown in FIG. 2 is constructed such that it is able to perform signal processing which can suppress waveform degradation. That is, when a wavelength multiplexed input signal of intensity modulation and phase modulation optical signals is input, each optical transmitter 111 is able to suppress the waveform degradation at the signal receiving end that is caused by the cross-phase modulation that the phase modulation optical signal undergoes from the intensity modulation optical signal.

More specifically, as shown in FIG. 2, the optical transmitter 111 includes an optical cross connect (OXC) 4, and a delay block 1 placed before or after the optical cross connect 4 to give a time delay difference between a phase modulation optical signal (described as a phase modulation signal in FIG. 2) and an intensity modulation optical signal (described as an intensity modulation signal in FIG. 2) which form a wavelength multiplexed input, and further includes an information collector 2 and a controller 3. Moreover, the optical transmitter 111 may include a dispersion compensating unit, which is placed before the delay block 1 to compensate for the chromatic dispersion of a transmission fiber, and a lumped-parameter amplifier, which is placed at its output end from which an optical output signal is sent out to a downstream transmission fiber.

The delay block 1 includes a splitting unit 11 which splits a wavelength multiplexed input signal into an intensity modulation optical signal and a phase modulation optical signal, a delay unit 12 which gives a time delay difference between the intensity modulation optical signal and the phase modulation optical signal split in the splitting unit 11, and a combining unit 13 which combines the intensity modulation optical signal and phase modulation optical signal given the time delay difference in the delay unit 12. The delay unit 12 is required to give a time delay difference between an intensity modulation optical signal and a phase modulation optical signal, so in FIG. 2, a time delay is given to the phase modulation optical signal, but it may be given to the intensity modulation optical signal. Both may also be given different time delays. In the above description and FIG. 2, while a wavelength multiplexed input signal is split into an intensity modulation optical signal and a phase modulation optical signal by the splitting unit 11, the installation of the function of selecting the intensity modulation optical signal and phase modulation optical signal is not limited to the splitting unit 11. For example, the splitting unit 11 may simply split an input signal into two outputs without selecting wavelengths, and the combining unit 13 may have a wavelength-selective switch so that intensity modulation and phase modulation optical signals from two ports can be selectively combined. Further, the delay unit 12 has the function of blocking wavelengths selectively.

Figure 3:
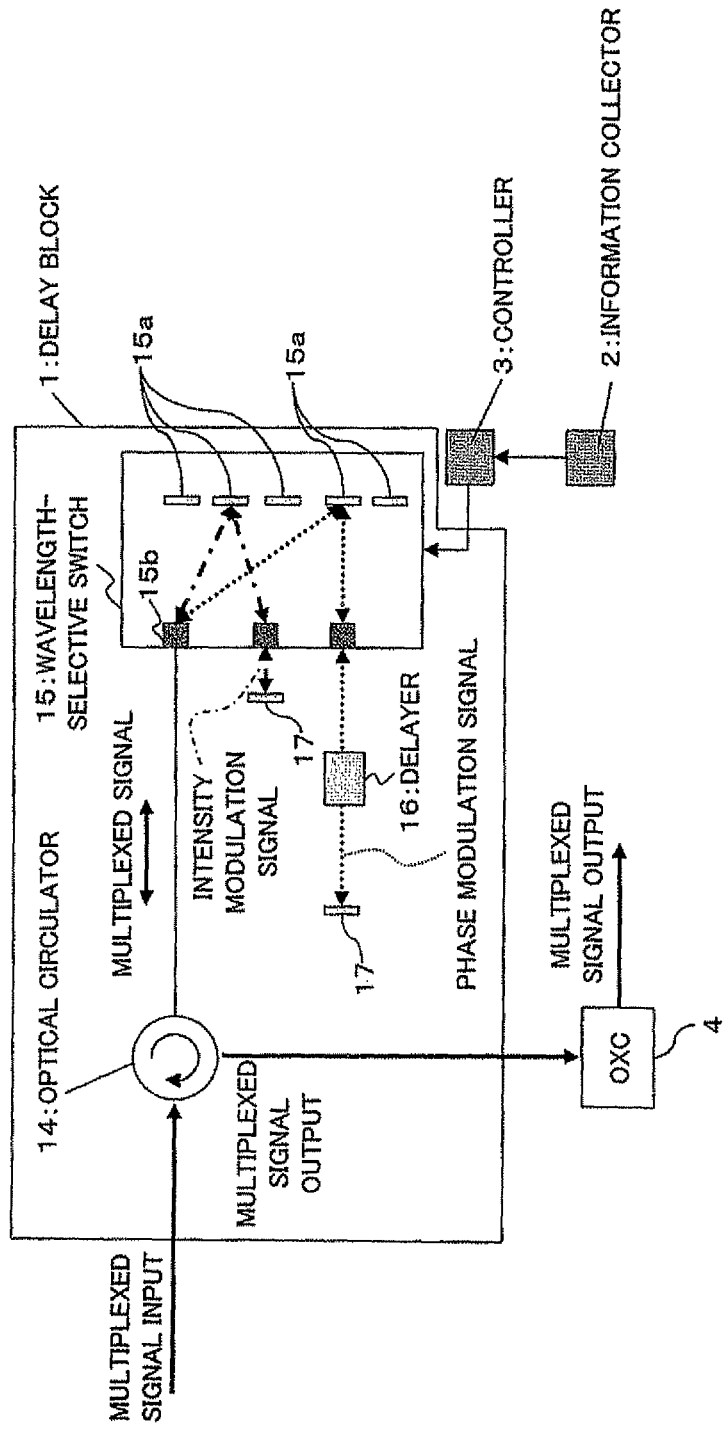
FIG. 3 is a block diagram for explaining a specific configuration of the delay block shown in FIG. 2.

FIGS. 3 and 4 are diagrams used to explain specific configuration examples of the delay block 1. For example, as shown in FIG. 3, the delay block 1 is constituted by an optical circulator 14, a wavelength-selective switch (WSS) 15, a delayer 16, and a reflector 17.

For a multiplexed signal that was input to the wavelength-selective switch 15 through the optical circulator 14, the light of the wavelength of the intensity modulation optical signal is reflected at the reflector 15a within the wavelength-selective switch 15 and output to the port having no delayer 16, and is then reflected at the reflector 17 and returns back to the input port of the wavelength-selective switch 15. In contrast, the light of the wavelength of the phase modulation optical signal is output to the port having the delayer 16, and is then reflected at the reflector 17 and returns back to the input port of the wavelength-selective switch 15. Therefore, a time delay difference can be given between the intensity modulation optical signal and the phase modulation optical signal. Note that the wavelength-selective switch 15 functions as the splitting unit 11 and combining unit 13 shown in FIG. 2, while the delayer 16 functions as the delay unit 12 shown in FIG. 2.

In addition, as shown in FIG. 4, the delay block 1 can be constituted by the same optical circulator 14, delayer 16, and reflector 17 as FIG. 3, and a wavelength-selective switch 15' which performs a route selecting operation differing from FIG. 3.

For a multiplexed signal that was input to the wavelength-selective switch 15' through the optical circulator 14, the light of the wavelength of the intensity modulation optical signal is reflected at the reflector 15a within the wavelength-selective switch 15', and then returns back to the input port of the wavelength-selective switch 15 without being reflected at an external reflector. In contrast, the light of the wavelength of the phase modulation optical signal is output to the port having the delayer 16, and is then reflected at the reflector and returns back to the input port of the wavelength-selective switch 15'. Even the delay unit 1 thus constructed can give a time delay difference between the intensity modulation optical signal and the phase modulation optical signal.

Thus, the wavelength-selective switch 15 or 15', which forms the above-described splitting unit 11, and the delayer 16, which functions as the delay unit 12, constitute a time difference given signal generator, which generates at least two optical signals given a bit time difference, from a wavelength multiplexed input signal. The splitting unit 11 functions as a unit that splits a wavelength multiplexed input signal into an intensity modulation optical signal and a phase modulation optical signal, while the delay unit 12 constitutes a bit time difference giving unit that gives a bit time difference between the optical signals split in the splitting unit 11.

As described later, by giving a time delay difference between an intensity modulation optical signal and a phase modulation optical signal with the delay block 1 as described above, the waveform degradation at the receiving end due to the influence of cross-phase modulation on the phase modulation optical signal from the intensity modulation optical signal can be suppressed.

In the wavelength-selective switches 15 and 15' shown in FIGS. 3 and 4, the input port to which an optical signal is input from the optical circulator 14 is provided with a splitting and combining unit 15b so that the wavelength multiplexed signal from the optical circulator is split into wavelengths and they fall on the corresponding reflectors 15a, and so that optical signals from the reflectors 15a enter the input ports connected to the optical circulator 14 and are combined together. Each of the reflectors 15a is constructed such that under control of the controller 3, its reflecting surface is free to rotate, and can switch the optical coupling relationships between the input port (which is provided with the splitting and combining unit 15b) and other ports, as required.

Thus, the wavelength-selective switch 15 or 15' forming the combining unit 13 constitutes a wavelength multiplexed signal output unit to which at least two optical signals are input from the time difference given signal generator, and which generates and outputs a wavelength multiplexed signal in which a bit time difference is given between the phase modulation and intensity modulation optical signals.

The information collector 2 is adapted to collect management information on the network system 100 through control signals transmitted to and from the control node 121 (see FIG. 1). The controller 3 is adapted to control operation of the optical transmitter 111 based on management information collected in the information collector 2. More specifically, based on management information collected in the information collector 2, the controller 3 judges whether a phase modulation optical signal is vulnerable to cross-phase modulation in the transmission fiber 140. When the phase modulation optical signal is judged to be vulnerable to cross-phase modulation, the controller 3 controls the wavelength-selective switch (15 shown in FIG. 3 or 15' shown in FIG. 4) to give a delay difference between the phase modulation signal and the intensity modulation optical signal, as described above.

Several kinds of management information in the network system 100 that are collected in the information collector 2 are shown in FIG. 5. As shown in the figure, the information collector 2 is adapted to collect information on the kind of transmission fiber 140 (kind #1), the dispersion quantity of a dispersion compensating module (kind #2), the span loss in the transmission fiber 140 (kind #3), the distance of the transmission fiber 140 (kind #4), the method of modulation of an optical signal in each channel (kind #5), the bit rate or code rate of each signal (kind #6), and the operative state of the wavelength of an optical signal (kind #7).

The kinds #1, #2, and #4 to #7 of management information can be extracted from the setting control information transmitted to and from the control network 120. The kind #3 of management information (span loss) can be derived by monitoring the input power (A) of an optical signal to an optical transmitter 111, then acquiring the output power (B) of that optical signal contained in an OSC (Optical Supervisory Channel) light when that optical signal is transmitted from the upstream optical transmitter 111, and in the case where there is provided a Raman amplifier (not shown), acquiring the Raman gain (C) in the transmission fiber between the two optical transmitters, and further making calculations (span loss=B−A−C).

For instance, in the optical transmitter 111-3 shown in FIG. 2, the input power (A) of an optical signal from the upstream optical transmitter 111-2 is monitored, then the output power (B) of that optical signal at the upstream optical transmitter 111-2 is acquired through the OSC light, and the Raman gain (C) in the transmission fiber 140 between the optical transmitters 111-2 and 111-3 is acquired. From those three pieces of information, the span loss (=B−A−C) is derived.

The kinds #5 to #7 of management information can also be extracted from the information of an optical spectrum monitor that monitors the optical spectrum of the wavelength bandwidth of an optical signal. The information on the kind of fiber which is the kind #1 of information can also be estimated from the kinds #2 to #4 of information that have been obtained. That is, even when the kind of transmission fiber is not known, the transmission fiber used can be estimated from the dispersion quantity of the dispersion compensating module, the span loss in the transmission fiber, and the distance of the transmission fiber.

In the controller 3, for example, based on the kind #1 of management information, when the transmission fiber 140 is a fiber with a relatively large dispersion value such as SMF (Single Mode Fiber), the walk-off between intensity modulation and phase modulation optical signals is great and therefore the influence of cross-phase modulation on phase modulation optical signals in the transmission fiber 140 can be judged to be relatively slight (phase modulation optical signals are invulnerable to cross-phase modulation). On the other hand, when the transmission fiber 140 is a fiber with a relatively small dispersion value such as NZDSF (Nonzero Dispersion-Shifted Fiber), the influence of cross-phase modulation on phase modulation optical signals in the transmission fiber 140 can be judged to be relatively great (phase modulation optical signals are vulnerable to cross-phase modulation).

As described above, when the influence of cross-phase modulation is judged to be relatively great, the controller 3 controls the delay block 1 to provide a time delay difference between a phase modulation optical signal and an intensity modulation optical signal. In this case, by controlling optical routes in the wavelength-selective switch 15 or 15' that serves as the combining unit 13 (see FIGS. 2 to 4), a phase modulation optical signal is output from the combining unit 13 without traveling through the delay unit 12, while an intensity modulation optical signal is output from the combining unit 13 via the delay unit 12. In other words, the controller 3 controls the splitting of a multiplexed signal in the wavelength switch 15 or 15' which functions as the splitting unit 11, based on management information collected in the information collector 2.

If the delay unit 12 is constructed to vary a time delay, the controller 3 can variably control the quantity of a bit time difference which is given in the delay unit 12 functioning as the time difference given signal generator, based on management information collected in the information collector 2.

In the optical transmitter 111 constructed as described above, if the controller 3 recognizes, based on management information collected in the information collector 2, that the phase modulation optical signal is vulnerable to cross-phase modulation in the transmission fiber 140 (for example, the chromatic dispersion value of the transmission fiber 140 is small), the delay block 1 is controlled to change the routes of the intensity modulation and phase modulation optical signals within the relay transmitter 111 to give a time delay difference between the two optical signals.

By giving such a time delay difference in the optical transmitter 111 of each relay stage, the bit patterns of two signals do not overlap each other at the output of each optical transmitter 111, so that the accumulation of phase modulation due to cross-phase modulation is reduced, and the waveform degradation of phase modulation optical signals can be suppressed. In this embodiment, while the routes of intensity modulation and phase modulation optical signals are selected one by one, the routes of a plurality of signals may be selected collectively at a time. In FIGS. 2 to 4, while the delay unit 12 is provided in the route through which a phase modulation optical signal travels, it may be provided in the route through which an intensity modulation optical signal travels. In addition, the delay unit 12 is effective if it is provided in a relay node, disposed downstream of a transmission span including a fiber in which the influence of cross-phase modulation becomes great, which includes a chromatic dispersion compensating module first. Besides, there are cases where it is desirable that the delay quantities of the delay units 12 of the optical transmitters 111 not be uniform. The reason is as follows; that is, the relative bit patterns between the intensity modulation and phase modulation optical signals in wavelength multiplexed signals which are sent out within the optical transmitters 111 of relay stages, become irregular. As a result, even when the residual quantity of dispersion compensation for each relay span is regular, residual red chirp for each relay span can be prevented from being simply added.

Figure 6A:
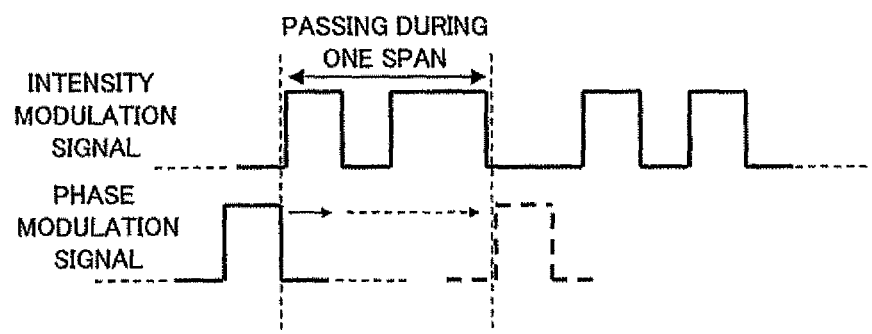
FIGS. 6A and 6B, is a diagram used to explain that the influence of cross-phase modulation at a signal receiving end can be mitigated by providing a propagation time delay difference between an intensity modulation optical signal and a phase modulation optical signal.
Figure 6B:
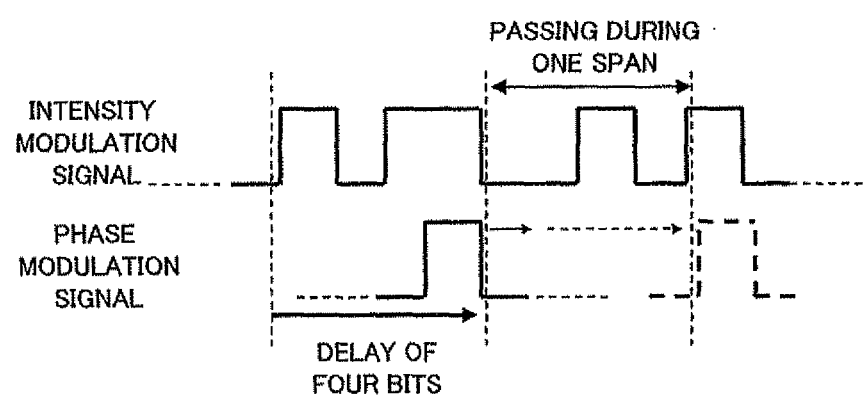

FIGS. 6A, 6B, 7, and 8 are diagrams used to explain that providing a propagation time delay difference between an intensity modulation optical signal and a phase modulation optical signal can suppress the influence of cross-phase modulation at the signal receiving end. For example, suppose two cases by simplifying the bit pattern models of phase modulation and intensity modulation optical signals coded by RZ (return-to-zero). When the propagation speed of a phase modulation optical signal is faster in one span between two optical transmitters 111 by the time of four bits of an intensity modulation optical signal, the passing of the phase modulation optical signal at the bit waveform level of the intensity modulation optical signal can be considered as shown in FIGS. 6A, and 6B.

That is, in the case of FIG. 6A, even during one span, upstream of the transmission fiber 140, a phase modulation optical signal passes the rising part and falling part of one pulse of an intensity modulation optical signal (occurrence of red chirp and blue chirp). In the middle of one span, it passes the rising part of the intensity modulation optical signal (occurrence of red chirp). At an input place to the next relay stage, at the time of transmission the bit falling part of the intensity modulation optical signal four bits ahead coincides with the falling part of the phase modulation optical signal (occurrence of blue chirp).

In contrast, when an intensity modulation optical signal is delayed by the time of four bits with respect to a phase modulation optical signal, the passing at the bit waveform level is performed according to a pattern of four bits that is ahead by the time of four bits, as shown in FIG. 6B, and differs from the case of FIG. 6A. In this case, upstream of the transmission fiber 140, the phase modulation optical signal passes the falling part of the intensity modulation optical signal. In the middle of one span, at the time of transmission it passes the rising part and falling part of the intensity modulation optical signal two bits ahead (occurrence of red chirp and blue chirp). At an input place to the next relay stage, at the time of transmission the bit rising part of the intensity modulation optical signal four bits ahead coincides with the bit rising part of the intensity modulation optical signal (occurrence of red chirp).

Figure 7:
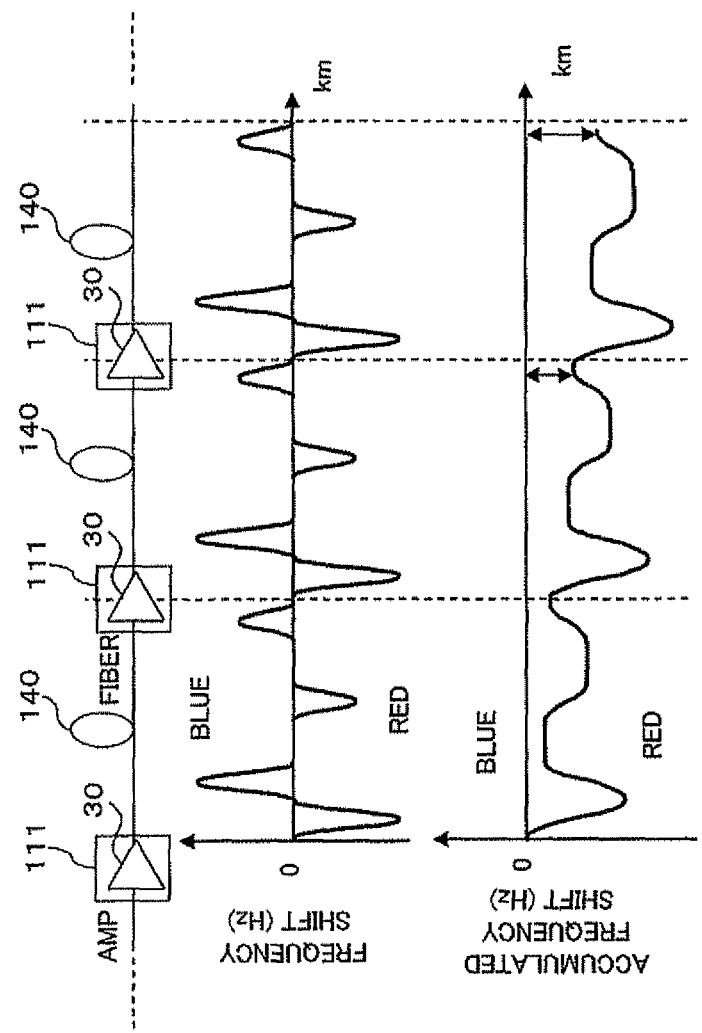
FIGS. 7 and 8 are diagrams used to explain that the influence of cross-phase modulation at a signal receiving end can be mitigated by providing a propagation time delay difference between an intensity modulation optical signal and a phase modulation optical signal.

Now, suppose that there is provided a dispersion compensating function (not shown) before the delay block 1 in the optical transmitter 111, and there is provided a lumped-parameter amplifier 30 at a position before the sending-out of an output signal to the downstream transmission fiber. In this case, when in the optical transmitter 111 provided in the transmission fiber 140 there is no time delay difference between a phase modulation optical signal and an intensity modulation optical signal, and the dispersion of the transmission fiber 140 is compensated to zero by the above-described dispersion compensating function, the relative bit pattern relationship between an intensity modulation optical signal and a phase modulation optical signal at the point where they are input to the amplifier 30 is always the same (e.g., the relationship shown in FIG. 6A is obtained). In this case, as shown in FIG. 7, the residual chirp in each relay span accumulates, so a wavelength multiplexed optical signal will undergo the influence of cross-phase modulation at the signal receiving end.

Figure 8:
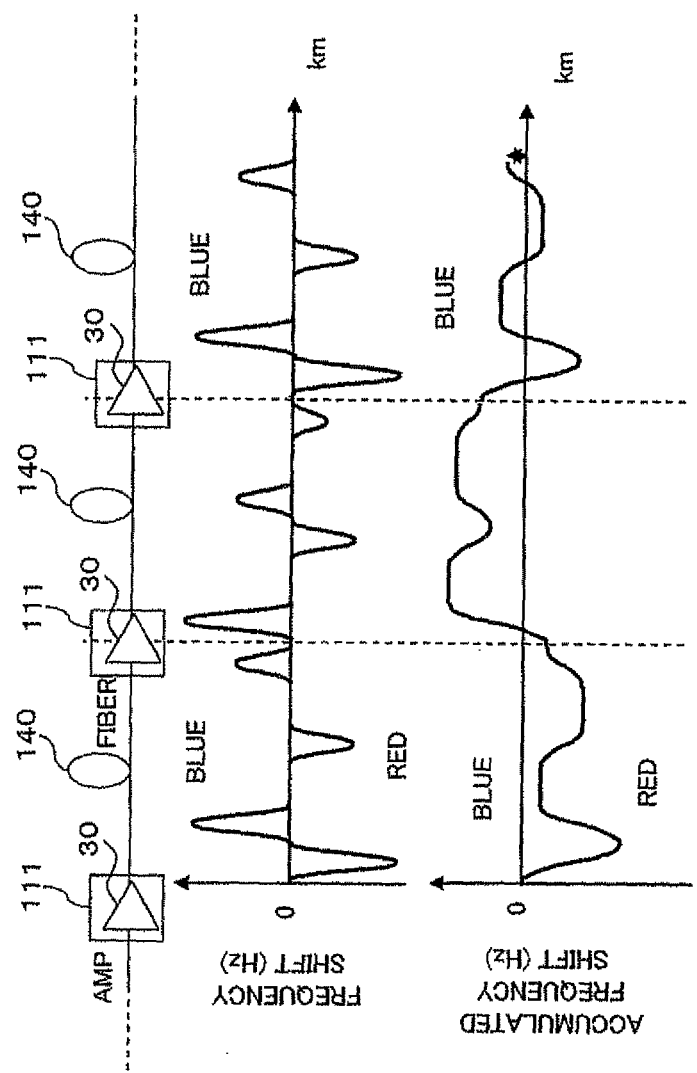

In contrast, in the case where in the optical transmitter 111 provided in the transmission fiber 140 there is provided a time delay difference between a phase modulation optical signal and an intensity modulation optical signal, even if chromatic dispersion were compensated to zero by the above-described dispersion compensating function at the point where the two signals are input to the delay block 1, the relative bit pattern relationship between the intensity modulation optical signal and phase modulation optical signal at the point where they are input to the amplifier 30 would vary in each relay stage. For instance, the relationship is obtained as shown in FIG. 6A or 6B. In this case, as shown in FIG. 8, the residual chirp quantities in the relay spans are offset as a whole. Therefore, compared with the case shown in FIG. 7, the case of FIG. 8 can suppress the influence of cross-phase modulation at the signal receiving end, particularly the influence of cross-phase modulation on phase modulation optical signals.

Thus, since the influence of cross-phase modulation at the signal receiving end can be suppressed by the delay unit 12 and combining unit 13 which form the delay block 1, the first embodiment of the present invention has the advantage of being able to suppress transmission quality degradation in network systems where intensity modulation and phase modulation optical signals are multiplexed together. In addition, as transmission systems can be easily upgraded by phase modulation optical signals, the enhancement of system performance (a wavelength utilization factor, an OSNR (optical signal-to-noise ratio) characteristic, etc.) can be expected, and the flexibility of network management can be increased.

[A1] First Alteration of the First Embodiment

While the optical transmitter 111 of the first embodiment is provided with the delay block 1 to give a bit time delay difference between an intensity modulation optical signal and a phase modulation optical signal, the present invention is able to incorporate the function of the delay block 1 into the function of an add-drop unit that adds and drops wavelengths, as shown FIGS. 9 to 12.

Figure 9:
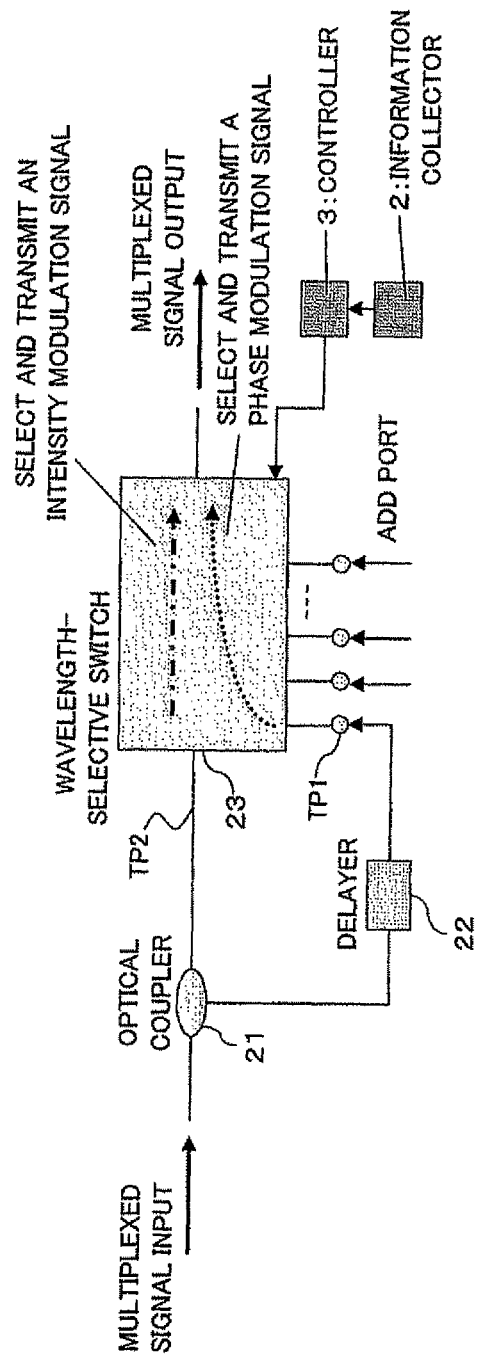
FIGS. 9 to 12 are diagrams showing a first alteration of the first embodiment of the present invention.

For example, as shown in FIG. 9, a first alteration of the first embodiment includes an optical coupler (splitting unit) 21 which splits a wavelength multiplexed input signal (in which intensity modulation and phase modulation optical signals are multiplexed together) into two optical signals, a delayer (bit time difference giving unit) 22 for giving a delay difference (bit time difference) to one wavelength multiplexed optical signal (intensity modulation and phase modulation optical signals) that was split in the splitting unit 21, and a wavelength-selective switch 23 with an add-through function having N inputs (where N is an integer greater than or equal to 2) and one output.

That is, the wavelength multiplexed signal delayed in the delayer 22 is input through one of the N−1 add ports (or a first through port TP1 for the wavelength multiplexed signal delayed in the delayer 22), while the other wavelength multiplexed signal not delayed in the delayer 22 is input through a second through port TP2. For optical signals that are input through the through ports TP1, TP2 and add ports, an optical signal to be output from the output port is selected for each wavelength, and the selected signals are output as a wavelength multiplexed signal (multiplexed signal output).

That is, if a wavelength multiplexed signal in which methods of modulation are prescribed for each wavelength is input as a multiplexed signal, the controller 3 controls the wavelength-selective switch 23, whereby the wavelength-selective switch 23 can be operated so that the wavelength signal of the intensity modulation optical signal is output through the second through port TP2 and the output port, while the wavelength signal of the phase modulation optical signal delayed in the delayer 22 is output through the first through port TP1 and the output port. Note that the phase modulation optical signal from the second through port TP2 and the intensity modulation optical signals from the add ports are blocked so they are not output to the output port.

In this manner, the multiplexed signal is output with the phase modulation optical signal given a time delay. Thus, the wavelength-selective switch 23 constitutes a wavelength multiplexed signal output unit that outputs a wavelength multiplexed signal containing an optical signal given a bit time delay in the delayer 22. In FIG. 9, while the phase modulation optical signal is delayed with respect to the intensity modulation optical signal, the intensity modulation optical signal may be delayed with respect to the phase modulation optical signal.

Figure 10:
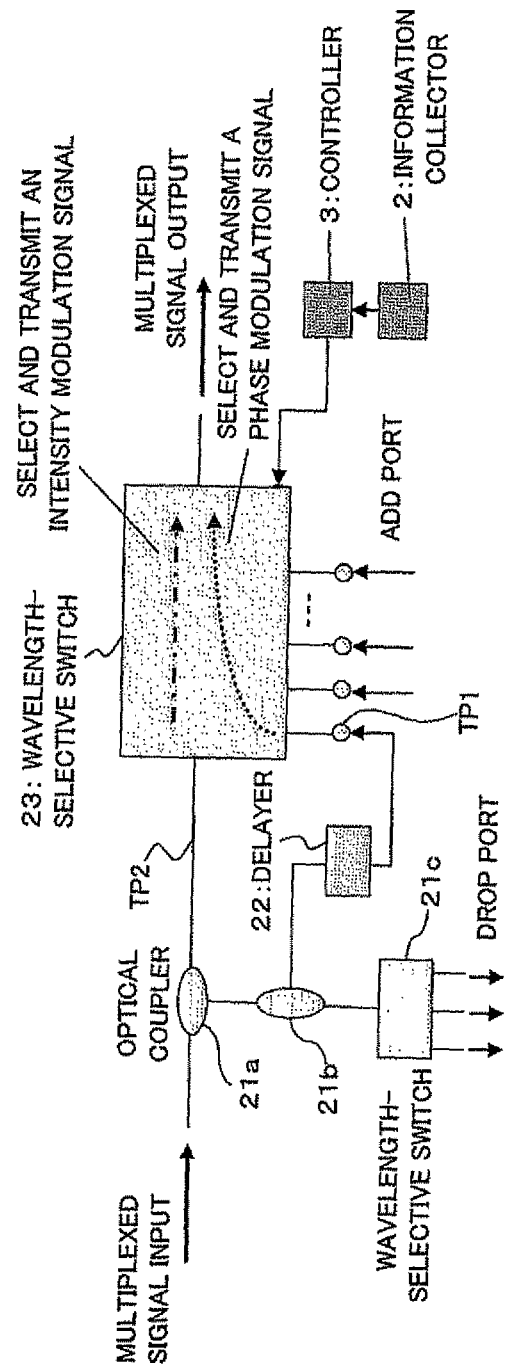

A second example shown in FIG. 10 differs from the first example shown in FIG. 9 in that one of two optical signals split in a first coupler 21a is further split into two optical signals by a second coupler 21b, one of the two optical signals split in the second coupler 21b is input to a delayer 22, and the other optical signal is input to a wavelength-selective switch 21c with a plurality of drop ports. This wavelength-selective switch 21c is constructed such that for the wavelength multiplexed signal from the second optical coupler 21b, optical signals to be output to the drop ports can be selected and output in wavelength units.

Figure 11:
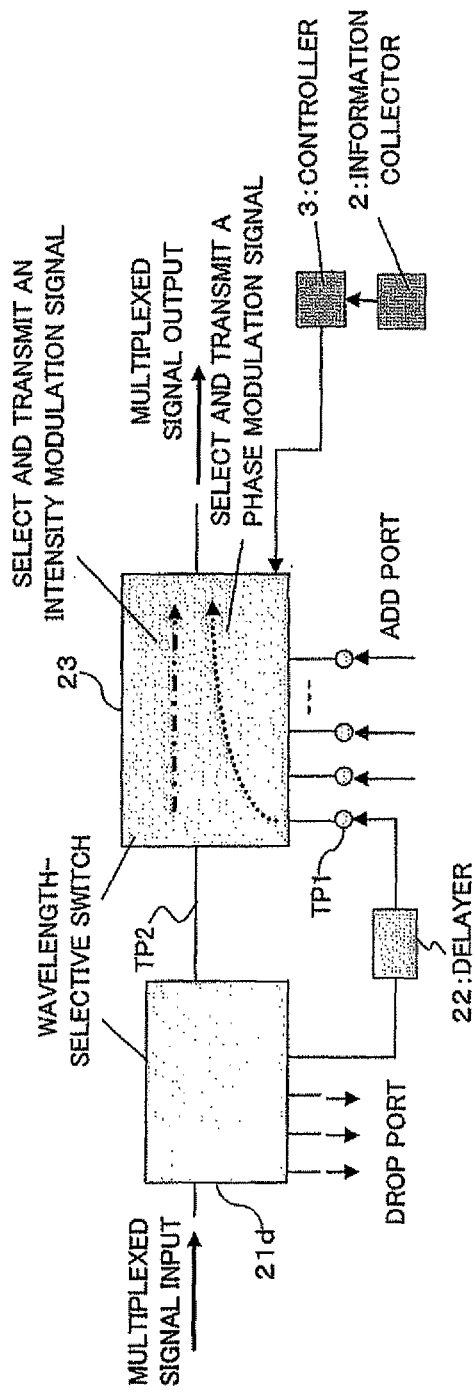

A third example shown in FIG. 11 is characterized in that the optical couplers 21a, 21b and wavelength-selective switch 21c shown in FIG. 10 are realized with a single wavelength-selective switch 21d having one input and three or more output ports. The wavelength-selective switch 21d outputs a wavelength multiplexed input signal through the output port TP2 connected to the through port of a wavelength-selective switch 23, and through an output port connected to a delayer 22. Note that the remaining output ports of the wavelength-selective switch 21d can be used as drop ports.

Figure 12:
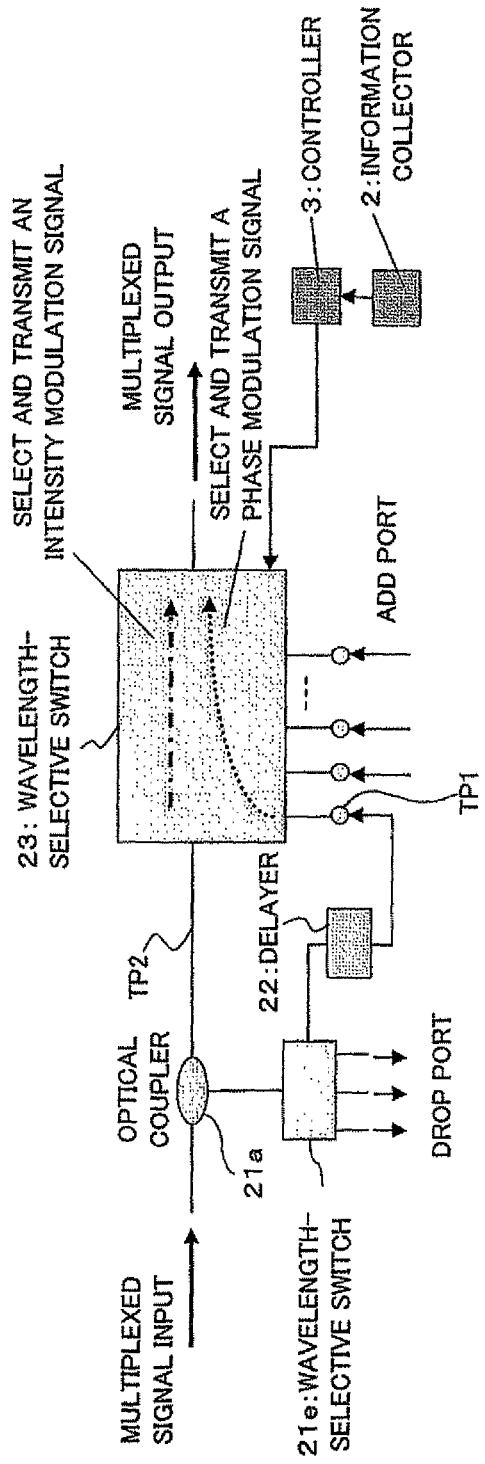

A fourth example shown in FIG. 12 differs from the first example shown in FIG. 9 in that a wavelength-selective switch 21e is interposed between the optical coupler 21 of FIG. 9 and the delayer 22 of FIG. 9. One of the multiplexed signals split in an optical coupler 21a is input to the wavelength-selective switch 21e. One of the output ports of the wavelength-selective switch 21e is connected to a delayer 22. The remaining output ports of the wavelength-selective switch 21e can be used as drop ports.

Note in FIGS. 9 through 12 that the same reference numerals have approximately the same functions. An optical transmitter such as those shown in FIGS. 9 through 12 is able to have the OADM (Optical Add-Drop Multiplexer) function of dropping and adding a multiplexed signal in wavelength units and the function of the same delay block as the first embodiment which provides a bit time delay difference between phase modulation and intensity modulation optical signals, by the wavelength-selective switch 21c to 21e and 23.

In the case of FIG. 9, the optical coupler 21 and delayer 22 as a whole constitute a time difference given signal generator, and the wavelength-selective switch 23 constitutes the above-described wavelength multiplexed signal output unit. In the case of FIG. 10, the optical couplers 21a and 21b and delayer 22 as a whole constitute the above-described time difference given signal generator, and the wavelength-selective switch 23 constitutes the above-described wavelength multiplexed signal output unit.

Likewise, in the case of FIG. 11, the wavelength-selective switch 21d and delayer 22 as a whole constitute the above-described time difference given signal generator, and the wavelength-selective switch 23 functions as the above-described wavelength multiplexed signal output unit. In the case of FIG. 12, the optical coupler 21a, wavelength-selective switch 21e, and delayer 22 as a whole constitute the above-described time difference given signal generator, and the wavelength-selective switch 23 functions as the above-described wavelength multiplexed signal output unit.

[A2] Second Alteration of the First Embodiment

Figure 14:
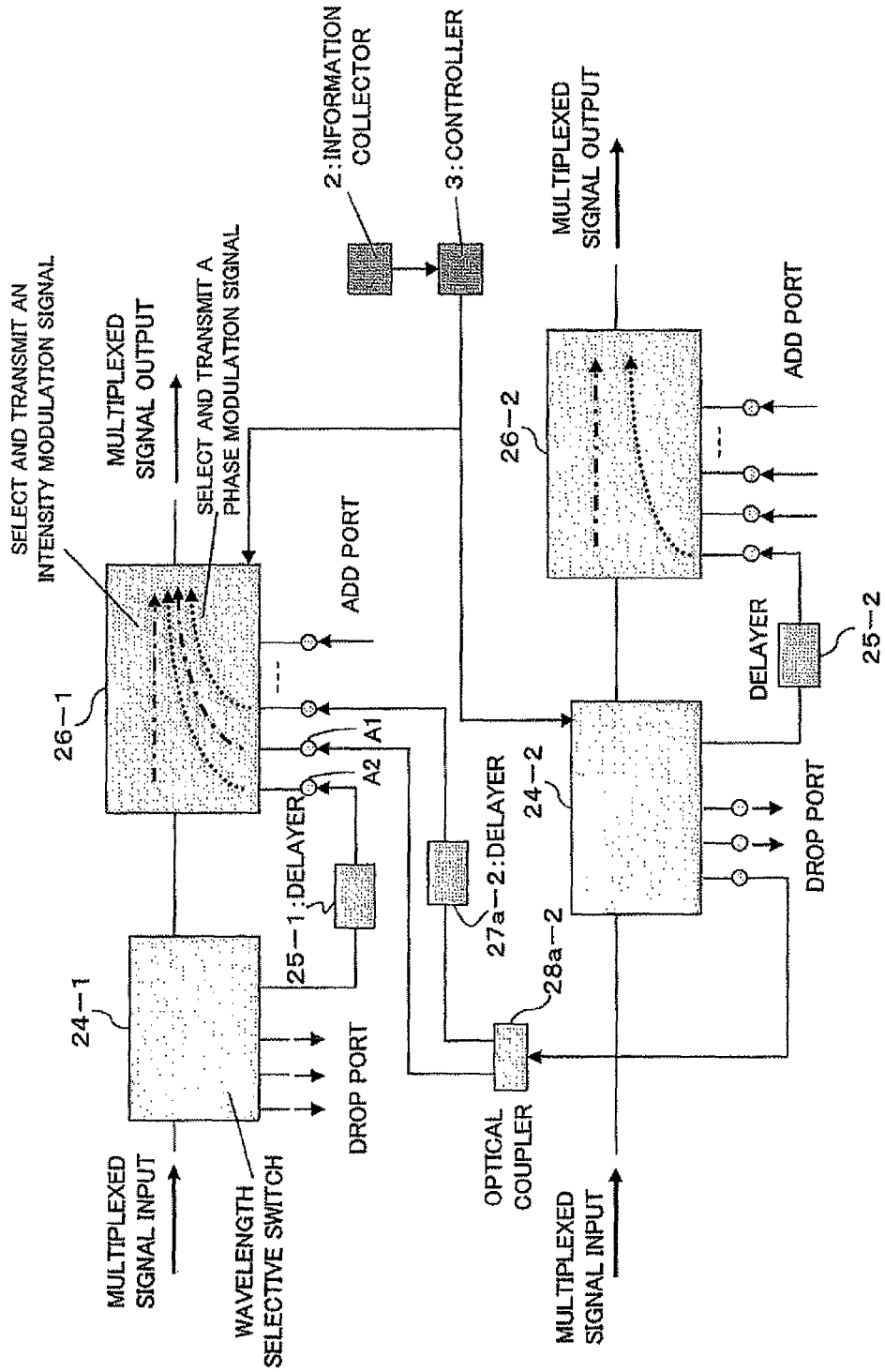
Figure 15:
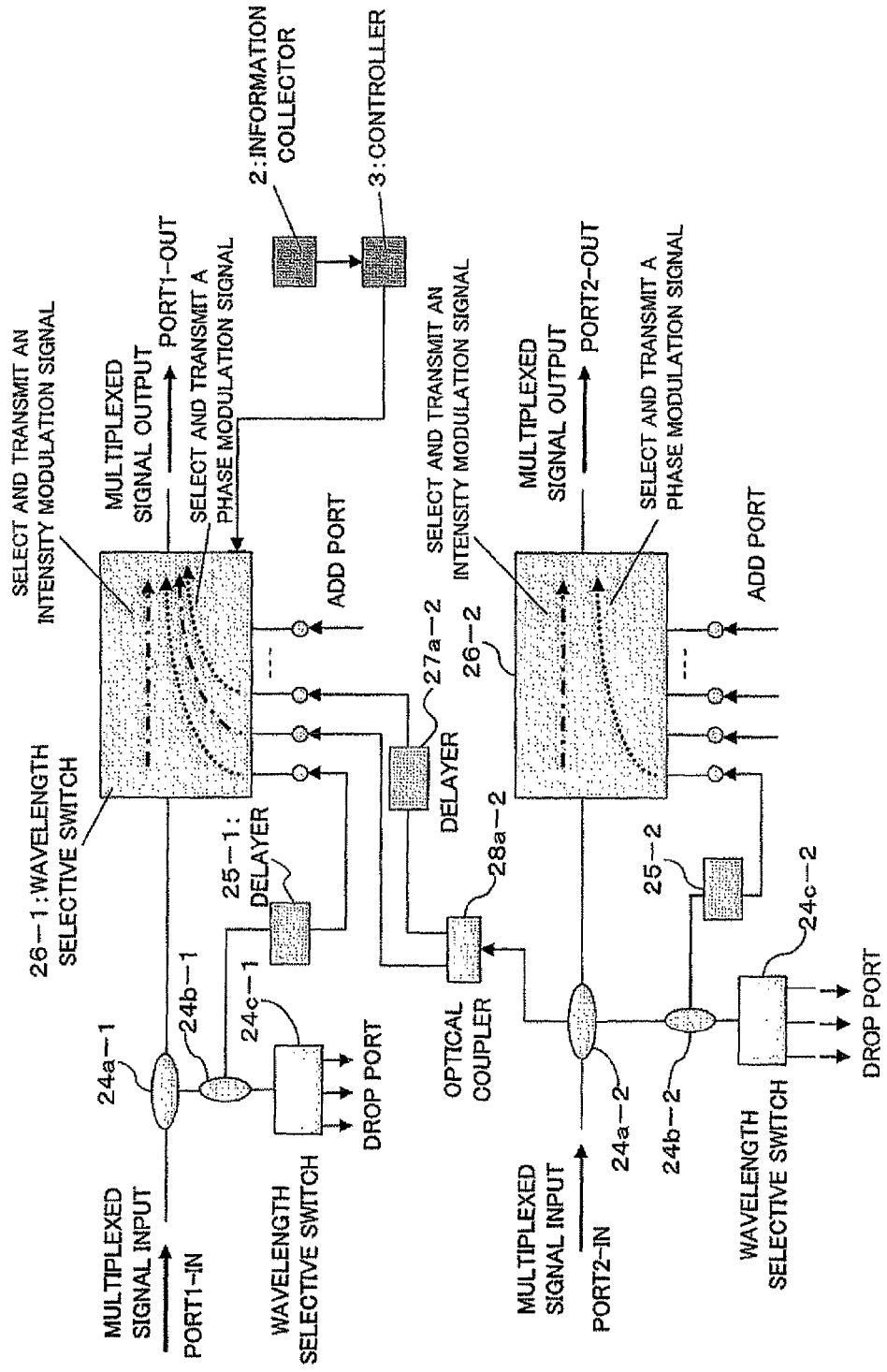

As set forth above, the optical transmitter of the first alteration is constructed such that the function of the delay block 1 is incorporated into the splitting and combining unit that splits an input signal into two signals and combines two inputs into one input. However, for example, as shown in FIGS. 13 to 15, the present invention can also be constructed such that the function of the delay block 1 is incorporated into the function of an optical cross connect (OXC).

Figure 13:
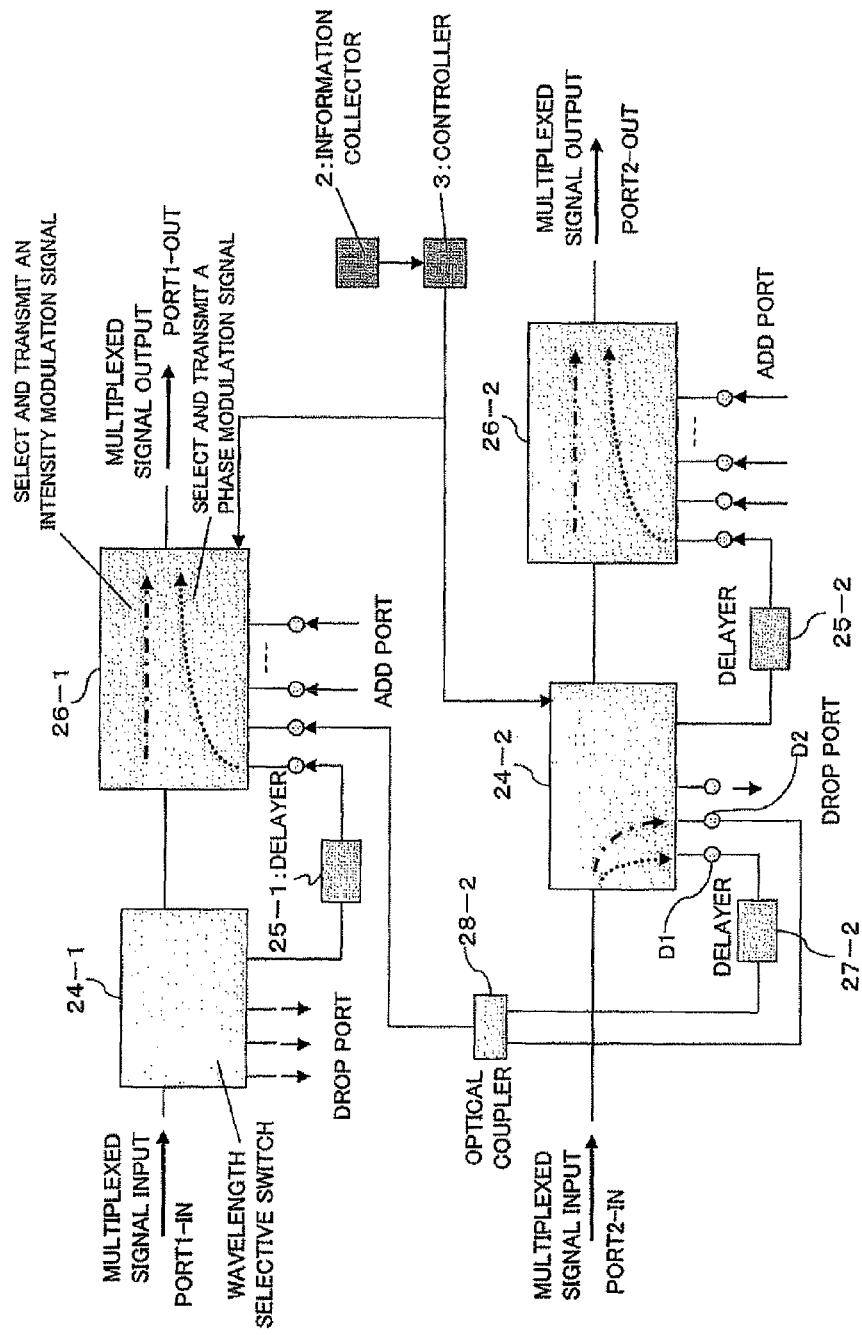
FIGS. 13 to 15 are diagrams showing a second alteration of the first embodiment of the present invention.

An optical transmitter shown in FIG. 13 includes the same information collector 2 and controller 3 as the aforementioned first embodiment, and also includes wavelength-selective switches 24-1, 24-2, delayers (bit time difference giving units) 25-1, 25-2, and wavelength-selective switches (wavelength multiplexed signal output units) 26-1, 26-2, which form the same constituent elements (reference numerals 21d, 22, 23) as those of the optical transmitter shown in FIG. 11 and are provided in parallel so they correspond to the number (2) of input/output ports.

With the configuration of the optical transmitter described above, the first input wavelength-selective switch 24-1 receives a first multiplexed input signal through the first input port (Port1-IN), and the first output wavelength-selective switch 26-1 transmits a first multiplexed output signal in which there is a time delay difference between an intensity modulation optical signal and a phase modulation optical signal, through the first output port (Port1-OUT). Similarly, the second input wavelength-selective switch 24-2 receives a second multiplexed input signal through the second input port (Port2-IN), and the second output wavelength-selective switch 26-2 transmits a second multiplexed output signal in which there is a time delay difference between an intensity modulation optical signal and a phase modulation optical signal, through the second output port (Port2-OUT).

At least one of the drop ports of the first input wavelength-selective switch 24-1 is connected to an add port of the second output wavelength-selective switch 26-2. Likewise, at least one of the drop ports of the second input wavelength-selective switch 24-2 is connected to an add port of the first output wavelength-selective switch 26-1. This realizes OXC by selecting optical signals of different wavelengths from the first input port (Port1-IN) in wavelength units and transmitting them through the second output port (Port2-OUT), or by selecting optical signals of different wavelengths from the second input is port (Port2-IN) in wavelength units and transmitting them through the first output port (Port1-OUT). Note that FIG. 13 is shown by directing attention to the connection between drop ports of the second input wavelength-selective switch 24-2 and an add port of the first output wavelength-selective switch 26-1.

The optical transmitter shown in FIG. 13 also includes the same bit time delay difference providing unit as the aforementioned first embodiment, which provides a bit time delay difference between the intensity modulation and phase modulation optical signals of a multiplexed signal in which route switching was made. For instance, a delayer 27-2 and an optical coupler 28-2 are interposed between drop ports of the second input wavelength-selective switch 24-2 and an add port of the first output wavelength-selective switch 26-1. Although not shown, a delayer and an optical coupler can be similarly interposed between drop ports of the first input wavelength-selective switch 24-1 and an add port of the second output wavelength-selective switch 26-2.

The delayer 27-2 is the same bit time delay giving unit as the delayer 22 of the first embodiment, which is adapted to give a bit time delay to the output signal from one drop port D1 of the second input wavelength-selective switch 24-2. The optical coupler 28-2 is adapted to combine the output of the delayer 27-2 and an output from a drop port D2 of the second input wavelength-selective switch 24-2 (to which the delayer 27-2 is not connected), and send the multiplexed signal to an add port of the first output wavelength-selective switch 26-1.

Note that on the basis of management information collected in the information collector 2, the controller 3 is able to control the wavelength selection that is performed in the wavelength-selective switches 24-1, 24-2, 26-1, and 26-2.

In the optical transmitter shown in FIG. 13 constructed as described above, a description will be given of the operation in the case where an input signal is output from the second input port (Port2-IN) to the first output port (Port1-OUT). A multiplexed signal, input through the second input port (Port2-IN), is split in wavelength units in the second input wavelength-selective switch 24-2, so that the phase modulation optical signal is output to port D1 connected to the delayer 27-2, while the intensity modulation optical signal is output to port D2 having no delayer. Thereafter, they are combined in the optical coupler 28-2, then the multiplexed signal is input to an add port of the first output wavelength-selective switch 26-1 which is connected to the first output port (Port1-OUT), and it is output to the first output (Port1-OUT) through the output of the first output wavelength-selective switch 26-1.

The phase modulation optical signal forming the multiplexed signal that was thus output can be output with a time delay difference given with respect to the intensity modulation optical signal, whether the input source is the first input port or second input port. In the example shown in FIG. 13, while the delayer 27-2 is inserted in the route of the phase modulation optical signal, the routes of the intensity modulation optical signal and phase modulation optical signal can be exchanged so the delayer 27-2 is inserted in the route of the intensity modulation optical signal.

In FIG. 13, although there is shown OXC with two input ports and two output ports, the present invention may include OXC having two or more input and output ports. In this case, the optical coupler 28-2, which splits a multiplexed signal given a bit time delay difference, splits the input signal thereof by (the number of input and output ports arranged in parallel−1), and the multiplexed signals that were split are connected to add ports of the wavelength-selective switches which are connected to the respective output ports. In the case where the optical insertion loss of the optical coupler 28-2 increases with an increase in the number of signals split, a wavelength multiplexing optical amplifier may be provided between the optical coupler 28-2 and the first output wavelength-selective switch26-1 to compensate for the insertion loss.

To give a bit time delay difference to a multiplexed signal in which wavelength selection was performed, an optical transmitter shown in FIG. 14 includes an optical coupler 28a-2 and a delayer 27a-2, which differ in function from those shown in FIG. 13. Note that although not shown, the same coupler and delayer as the coupler 28a-2 and delayer 27a-2 can be provided between a drop port of a first input wavelength-selective switch 24-1 and add ports of a second output wavelength-selective switch 26-2.

In FIG. 14, the optical coupler 28a-2 is constructed to split the multiplexed signal from one drop port of the second input wavelength-selective switch 24-2 into two signals. One of the two signals is given the same bit time delay as the first embodiment in the delayer 27a-2 and input to a first add port A1 of the first output wavelength-selective switch 26-1, while the other signal is input to a second add port without being delayed in the delayer 27a-2. Even the optical transmitter thus constructed can realize the OXC function, and can output a phase modulation optical signal given a time delay with respect to an intensity modulation optical signal, whether the input source is the first input port or second input port.

An optical transmitter shown in FIG. 15 includes optical couplers 24a-1 to 24c-1, 24a-2 to 24c-2, delayers 25-1, 25-2, and wavelength-selective switches 26-1, 26-2, which form the same constituent elements (21a to 21c, 22, 23) as those of the optical transmitter shown in FIG. 10 and are disposed in parallel so as to correspond to the number (2) of input/output ports. At least one drop port of the first input wavelength-selective switch 24c-1 is connected to an add port of the second output wavelength-selective switch 26-2 which leads to the second output port (Port2-OUT). Similarly, at least one drop port of the second input wavelength-selective switch 24c-2 is connected to an add port of the first output wavelength-selective switch 26-1 which lead to the first output port (Port1-OUT). This makes it possible to realize OXC by splitting the optical signal from the first input port (Port1-IN) in wavelength units and outputting the multiplexed signal through the second output port (Port2-OUT), or by splitting the optical signal from the second input port (Port2-IN) in wavelength units and outputting the multiplexed signal through the first output port (Port1-OUT).

For a multiplexed signal in which wavelength selection was performed, the optical transmitter shown in FIG. 15 also is constructed such that the same bit time delay difference as the case of FIG. 14 is given between the intensity modulation optical signal and the phase modulation optical signal. For instance, the optical coupler 28a-2 and delayer 27a-2 are interposed between a drop port of the second input wavelength-selective switch 24-2 and add ports of the first output wavelength-selective switch 26-1. Although not shown, the same optical coupler and delayer as the above case can be interposed between a drop port of the first input wavelength-selective switch 24a-1 and the second output wavelength-selective switch 26-2.

[A3] Third Alteration of the First Embodiment

The optical transmitter of the first alteration, as shown in FIGS. 9 to 12, is constructed to incorporate the function of the delay block 1 into the function of the splitting and combining unit which performs signal splitting and signal combining in wavelength units, by suitably employing the wavelength-selective switches 21c to 21e and 23. However, instead of the wavelength-selective switches 21c to 21e and 23, by employing PLC (Planner Lightwave Circuit) wavelength-selective switches such as AWG (Arrayed Waveguide Grating), the same optical transmitter can be configured as shown in FIGS. 16 and 17.

Figure 16:
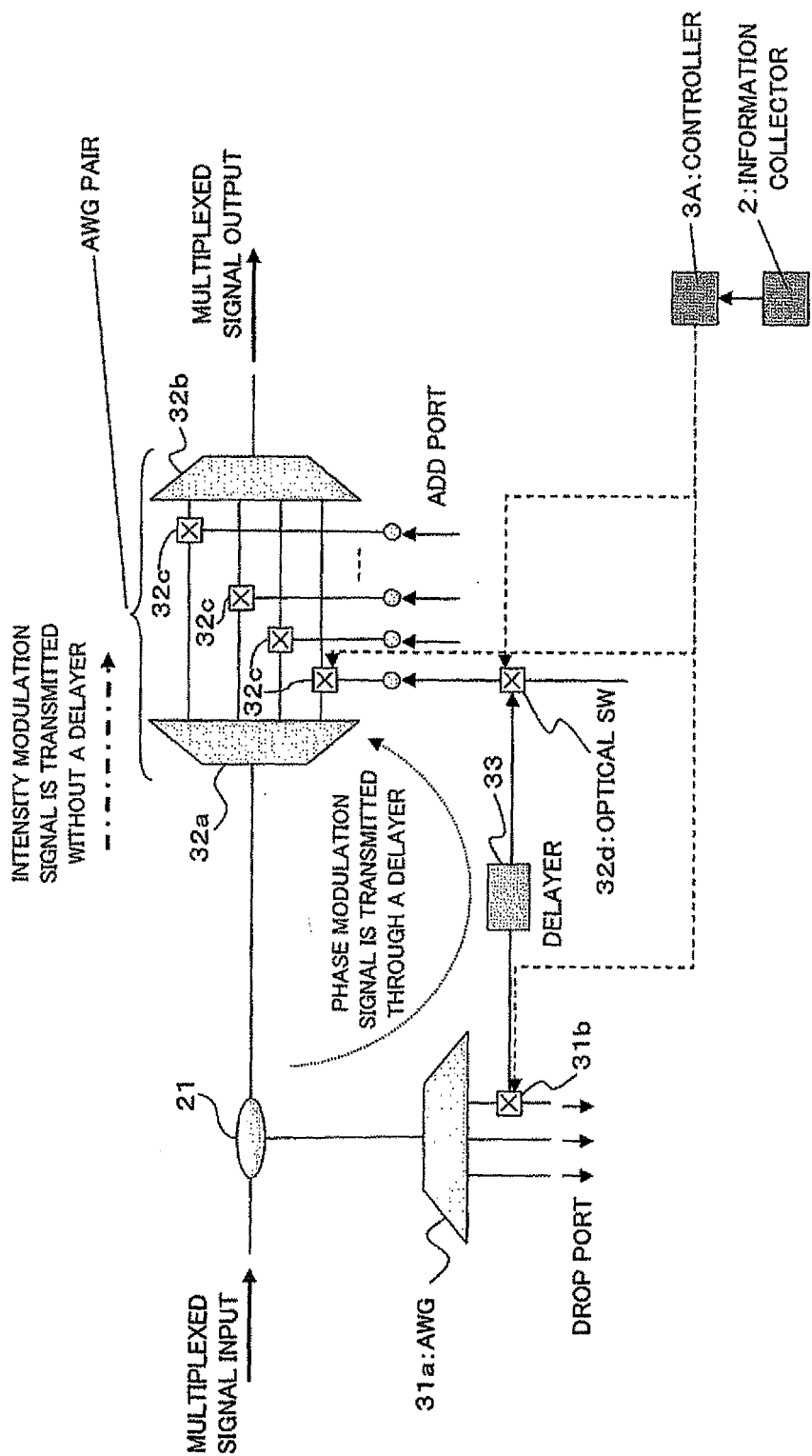
FIGS. 16 and 17 are diagrams showing a third alteration of the first embodiment of the present invention.
Figure 17:
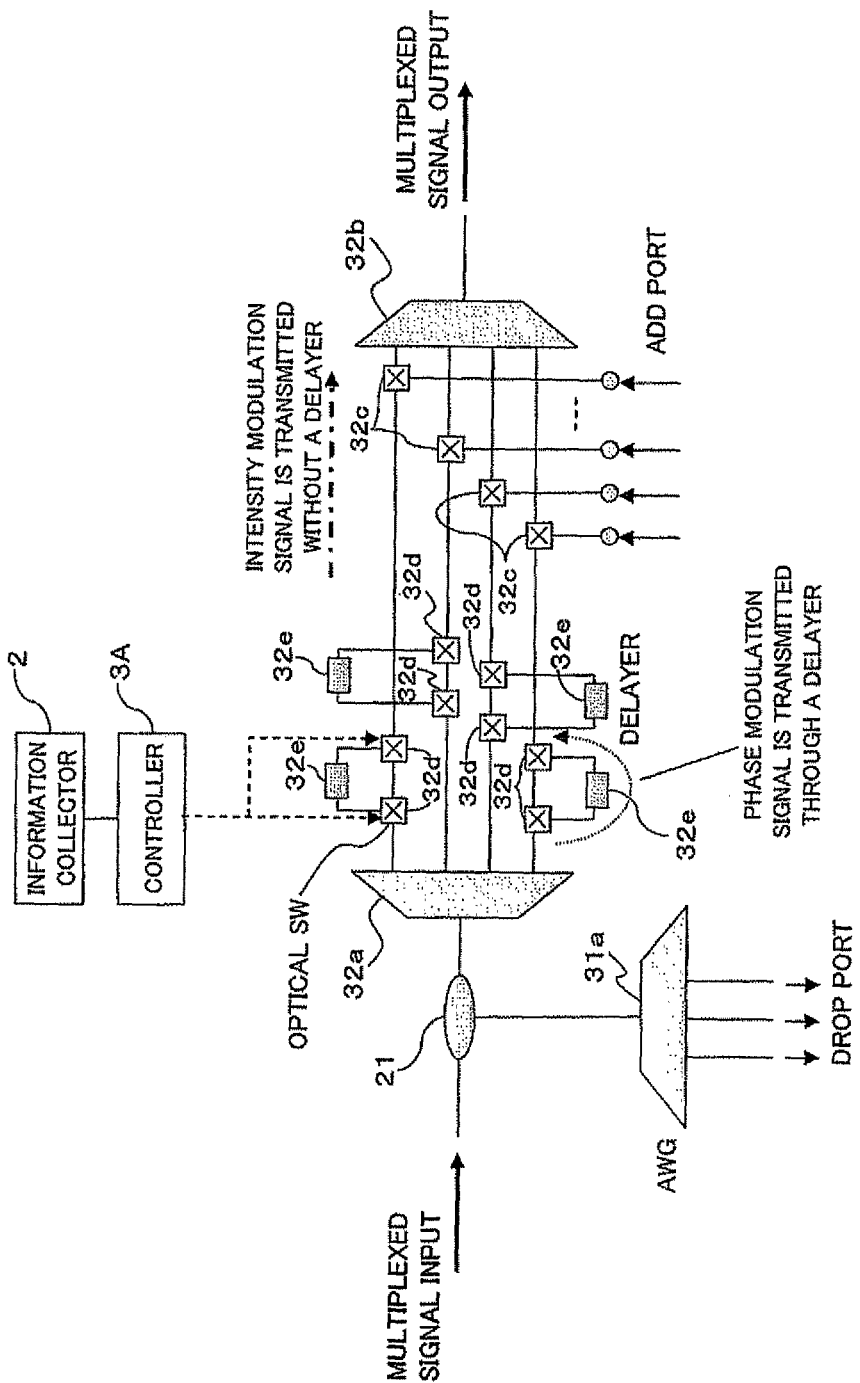

An optical transmitter shown in FIG. 16 includes the same optical coupler 21 as that shown in FIG. 9, an AWG 31a and optical switches 31b, which guide one of the optical signals split in the optical coupler 21 to the drop ports thereof, AWGs 32a, 32b and optical switches 32c, 32d, which transmit the other optical signal split in the optical coupler 21 therethrough or add an optical signal through an add port, and delayers 33, which give a bit delay difference between a phase modulation optical signal and an intensity modulation optical signal in outputting them as a multiplexed signal.

The input AWG 31a is constructed to input a multiplexed signal (wavelength multiplexed signal) that is one of the optical signals split in the optical coupler 21, and split and output the multiplexed signal in wavelength units. The optical switches 31b also are provided to correspond to the wavelengths split in the input AWG 31a. For optical signals of different wavelengths output from the input AWG 31a, each optical switch 31b selects either a route connected to a drop port or a route connected to an add port.

Each delayer (bit time difference giving unit) 33 is the same device as the delayer 22 of the first embodiment, which gives a time delay (bit time delay) to the split signal from the input AWG 31a that is input through the optical switch 31b. The delayers 33, as with the optical switches 31b, are disposed to correspond to the different wavelengths split and output in the input AWG 31a. The optical switch 32d also is used to selectively output either the optical signal delayed in the delayer 33, or an optical signal with a wavelength corresponding to an add side.

The first output AWG 32a is a device to which the other multiplexed signal (wavelength multiplexed signal) is input from the optical coupler 21, and which splits the multiplexed signal into optical signals of different wavelengths and outputs them. The optical switches 32c also are provided to correspond to the different wavelengths split in the first output AWG 32a. Each optical switch 32c functions to selectively output either the optical signal input through the add port or the optical signal input through the AWG 32a. The second output AWG 32b functions to wavelength-multiplex the optical signals from the optical switches 32c and output a wavelength multiplexed signal (multiplexed signal output).

In FIG. 16, although only the optical switches 31b and 32d are shown for one wavelength, other optical switches can be disposed to correspond to other different wavelengths. A controller 3A is used for controlling the switching operation in each of the optical switches 31b, 32c, and 32d, based on management information collected in an information collector 2.

Thus, the optical coupler 21, AWG 31a, optical switch 31b, and delayer 33 constitute a time difference given signal generator that generates at least two optical signals having a bit time difference, from the aforementioned wavelength multiplexed input signal.

In the optical transmitter constructed as described above, for a wavelength multiplexed signal that was input from the optical coupler 21, the intensity modulation optical signal is selected by the optical switch 32c and transmitted through the output AWG 32b. However, the intensity modulation optical signal can also be output through a drop port of the input AWG 31a by the optical switch 31b.

Thus, the AWGs 32a, 32b and optical switches 32c, 32d constitute a wavelength multiplexed signal output unit to which at least two optical signals are input from the above-described time difference given signal generator, and which generates and outputs a wavelength multiplexed signal in which there is a bit time difference between the phase modulation optical signal and the intensity modulation optical signal.

For the multiplexed signal that is input to the optical coupler 21, the phase modulation optical signal is input to the delayer 33 through the input optical switch 31b. After the phase modulation optical signal is delayed by the delayer 33, it is output from the output AWG 32b through the optical switches 32d, 32c. More specifically, after the multiplexed signal is split in the input AWG 31a, the phase modulation optical signal is input to the delayer 33 through the input optical switch 31b. Then, it is input to an add port of the output AWGs 32a, 32b through the output optical switches 32d, 32c. In this manner, a multiplexed signal is output from the output AWG 32b with the phase modulation optical signal delayed with respect to the intensity modulation optical signal. In FIG. 16, while the delayer 33 is inserted in the route of the phase modulation optical signal, it may be inserted in the route of the intensity modulation optical signal.

An optical transmitter shown in FIG. 17 includes optical switches 32d and delayers 32e, which can set bypass routes each passing through the delayer 32e in wavelength units. The optical switches 32d and delayers 32e are inserted in the propagation routes of the optical signals split in an AWG 32a, respectively. The optical switches 32d and delayers 32e also are disposed upstream of optical switches 32c. Each optical switch 32c selects either an optical signal from an add port or an optical signal from the AWG 32a, and outputs the selected signal to the AWG 32b.

That is, unlike the optical transmitter of FIG. 16 in which the delayer 33 is provided after the input AWG 31a, the optical transmitter shown in FIG. 17 is constructed such that the delayer 32e is interposed between the output AWGs 32a and 32b. More specifically, the same controller 3A as that shown in FIG. 16 controls routes so that a phase modulation optical signal is passed through the delayer 32e by the optical switches 32d, while an intensity modulation optical signal is output through the optical switches 32d to the optical switch 32c without passing through the delayer 32e.

The optical transmitters of FIGS. 16 and 17 that are thus constructed also are able to possess the same advantages as the first embodiment.

Figure 18:
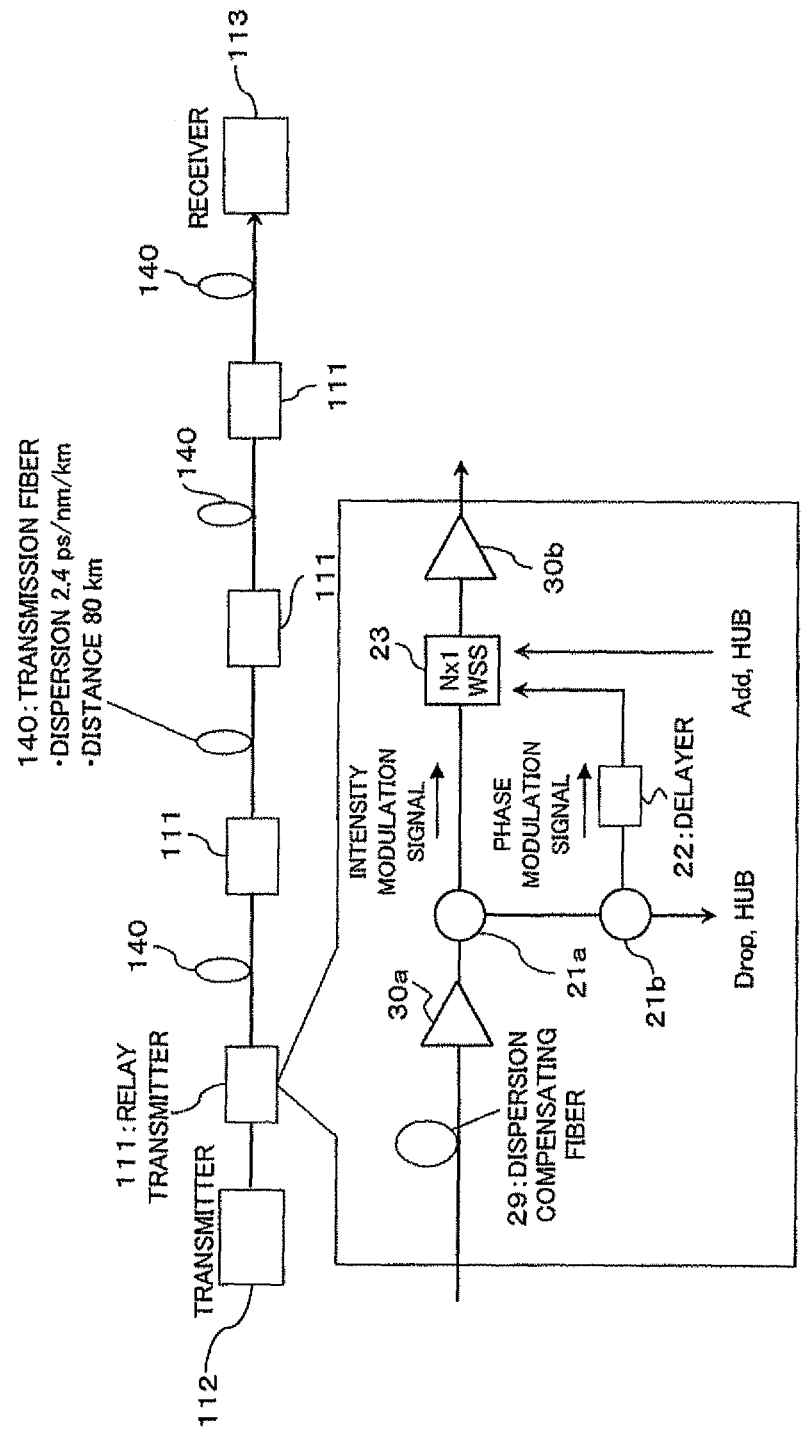
FIGS. 18 and 19 are diagrams used to explain the operational effects of the first, second, and third alterations of the first embodiment.
Figure 19:
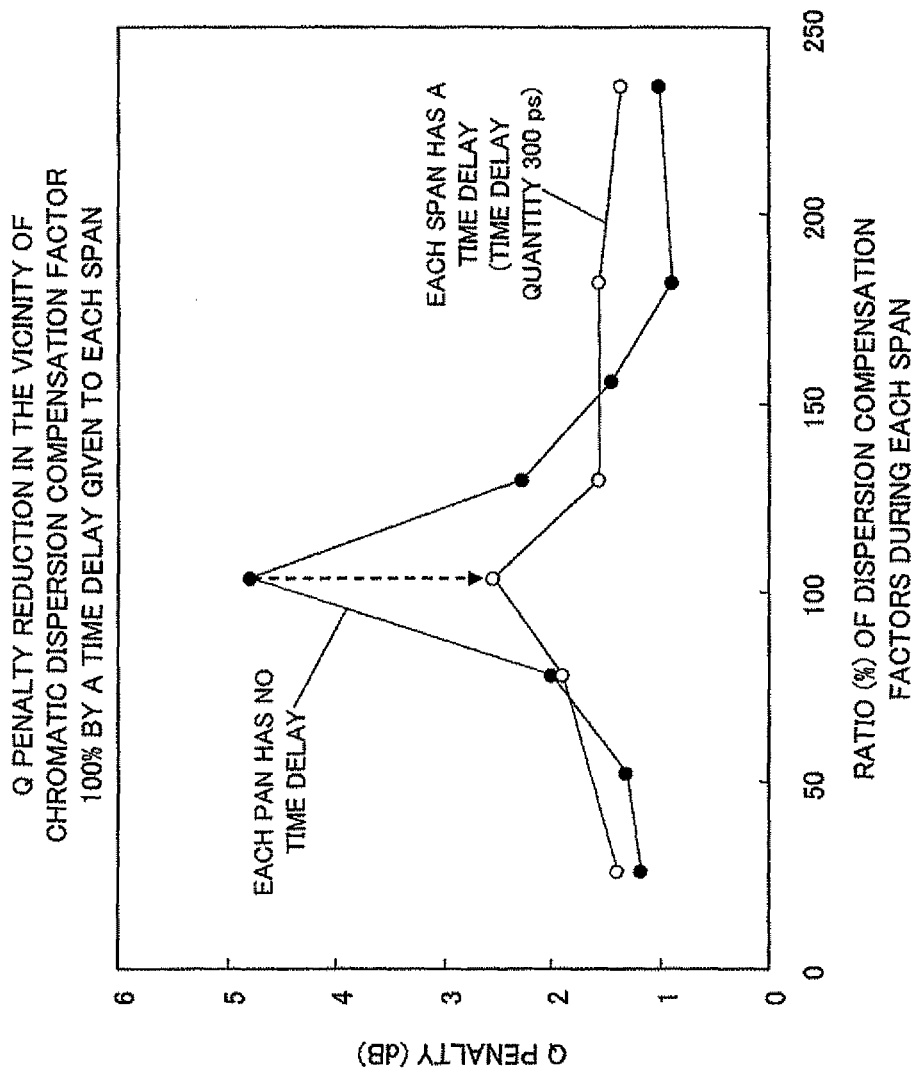

[A4] Operational Effects of the First Embodiment and Three Alterations of the First Embodiment A model used to calculate the operational effects of the first embodiment and the first through the third alterations of the first embodiment is shown in FIG. 18, and the results are shown in FIG. 19.

As shown in FIG. 18, a transmission fiber 140 has a chromatic dispersion of 2.4 ps/nm/km (picoseconds per nanometer per kilometer) and a relay span of 80 km. Within the optical transmitter 111 as a relay transmitter, the input signal (wavelength multiplexed signal) is wavelength-compensated by a dispersion compensating fiber 29 and amplified by an optical amplifier 30. Then, an optical coupler 21a splits the input signal into an intensity modulation optical signal and a phase modulation optical signal. After the phase modulation optical signal is delayed by a delayer 22, a wavelength-selective switch 23 combines the delayed phase modulation optical signal with the intensity modulation optical signal. Thereafter, the output from the wavelength-selective switch 23 is amplified by an optical amplifier 30b and is sent out on the transmission fiber 140.

Using the model shown in FIG. 18, calculation results such as those shown in FIG. 19 were obtained. That is, by giving a time delay between channels during each relay span, the worst Q penalty could be reduced by about 3 dB (in the case of a chromatic dispersion compensation factor 100%). The time delay between channels is interrelated with chromatic dispersion, and depending upon the quantity of a time delay given, bit patterns sometimes coincide with each other because of a shift in chromatic dispersion compensation. For that reason, in each optical transmitter 111, it is desirable to give a delay difference that is far larger than a delay quantity caused by the residual dispersion quantity which results from the dispersion quantity of the transmission fiber 140 compensated by the dispersion compensating fiber 29. For example, the chromatic dispersion tolerance of a 10-Gbps transmission signal is approximately ±1000 ps/nm for the entire transmission line between the transmitter 112 and the receiver 113, so if wavelength spacing is assumed to be 0.8 nm, the optical transmitter 111 as a relay transmitter is safe if a time delay between channels is ±800 ps or greater in total.

[B] Second Embodiment

Figure 20:
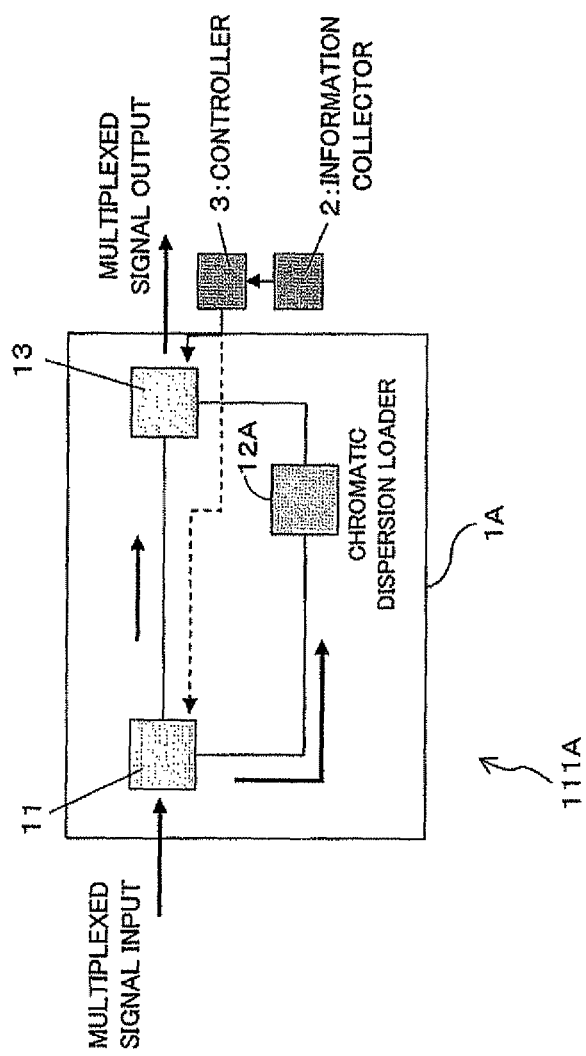
FIG. 20 is a block diagram showing an optical transmitter in accordance with a second embodiment of the present invention.

Referring to FIG. 20, there is shown an optical transmitter 111A according to a second embodiment of the present invention. The optical transmitter 111A differs from the optical transmitter 111 (see FIG. 2) of the first embodiment in that a delay block 1A includes a chromatic dispersion giving unit (bit time difference giving unit) 12A instead of the delay unit 12. The remaining parts other than this are basically the same as the first embodiment. In FIG. 20, the same reference numerals as FIG. 2 denote approximately the same parts.

That is, in an optical coupler 11 as the splitting unit 11, the input signal (multiplexed signal) is split into two signals. One of the two signals, as it is, is output to a wavelength-selective switch 13 serving as the combining unit 13. The other signal is further given chromatic dispersion in the chromatic dispersion giving unit 12A. This gives a difference in chromatic dispersion between the one optical signal, which is input to the wavelength-selective switch 13 without passing through the chromatic dispersion giving unit 12A, and the other optical signal, which is given chromatic dispersion in the chromatic dispersion giving unit 12A and input to the wavelength-selective switch 13.

Thus, the optical coupler 11 and chromatic dispersion loader 12A constitute a bit time difference given signal generator that generates at least two optical signals having a bit time difference therebetween (through loading the signals with different chromatic dispersion quantities), from an input signal (wavelength multiplexed optical signal).

In the wavelength-selective switch 13, one of the optical signals split in the optical coupler 11 and the other optical signal via the chromatic dispersion loader 12A are input, and optical signals to be output through the output port can be selected and output in wavelength units.

At this time, when the controller 3 decides, based on management information collected in the information collector 2, that an optical fiber to which an output signal is sent out is vulnerable to cross-phase modulation, the controller 3 is able to control the wavelength-selective switch 13 so that, for example, the phase modulation optical signal is sent out from the output port via the chromatic dispersion loader 12A, while the intensity modulation optical signal is sent out from the output port without passing through the chromatic dispersion loader 12A. This can give a bit time delay difference between the phase modulation optical signal and intensity modulation optical signal. As a result, the optical transmitter 111A of FIG. 20, as with the first embodiment, is capable of reducing residual red chirp caused by cross-phase modulation.

Thus, the wavelength-selective switch 13 constitutes a wavelength multiplexed signal output unit to which two optical signals are input from the optical coupler 11 and chromatic dispersion loader 12A, and which generates and outputs a wavelength multiplexed signal in which there is a bit time difference between the optical phase modulation signal and the optical intensity modulation signal.

While the optical transmitter 111A shown in FIG. 20 includes the optical coupler 11 as the splitting unit and the wavelength-selective switch 13 as the combining unit, the present invention can include a wavelength-selective switch as the splitting unit instead of the optical coupler 11, and a combining element such as an optical coupler instead of the wavelength-selective switch 13. Of course, like the wavelength-selective switches 15, 15' (see FIGS. 3 and 4) in the case of the first embodiment, the present invention may employ one wavelength-selective switch serving both as the splitting unit and the combining unit.

In the optical transmitter 111A of the second embodiment constructed as described above, if the controller 3 recognizes, based on management information collected in the information collector 2, that the transmission fiber 140 is vulnerable to cross-phase modulation (for example, the chromatic dispersion value of the transmission fiber 140 is small), the controller 3 controls the wavelength-selective switch 13 of the delay block 1A so that within the optical transmitter 111A, a chromatic dispersion difference is given between a phase modulation optical signal and an intensity modulation optical signal.

Figure 21:
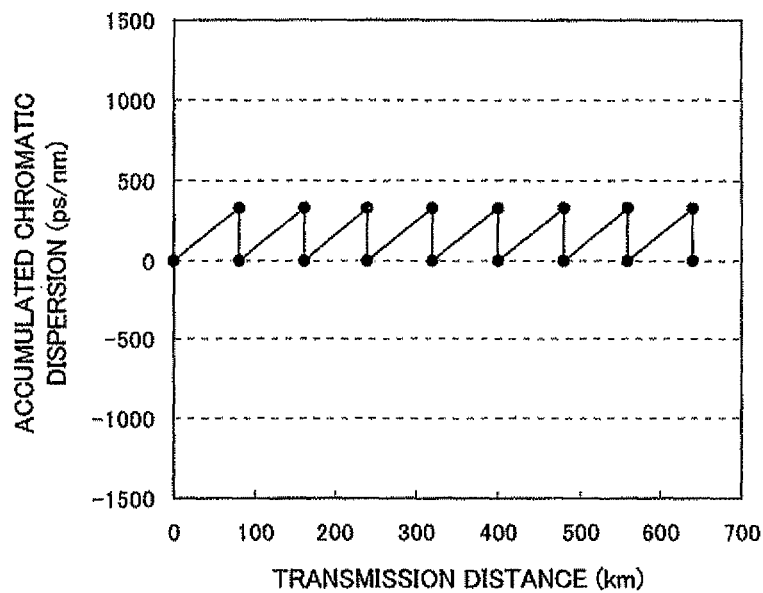
FIGS. 21 to 24 are diagrams used to explain the operational effects of the second embodiment of the present invention.
Figure 22:
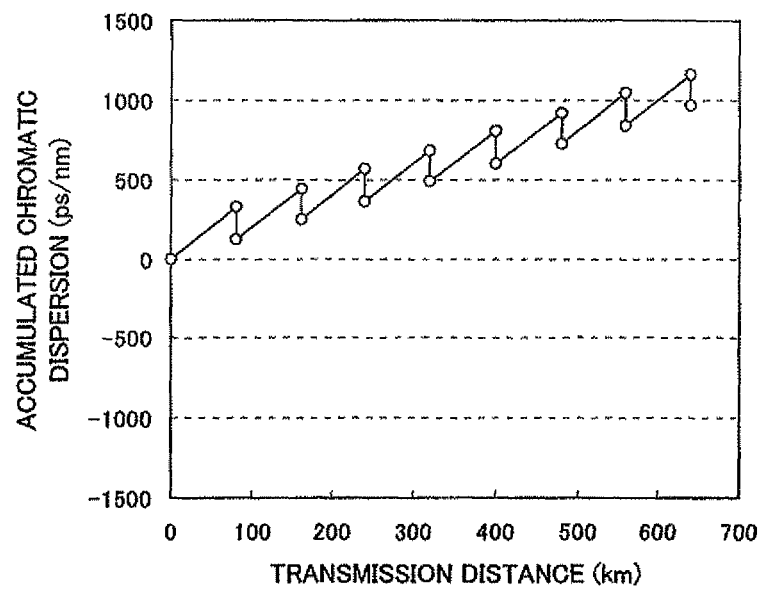

Like the dispersion map (graph of transmission distance versus accumulated chromatic dispersion) shown in FIG. 21, in the case where the dispersion compensation factor of the dispersion compensating unit in the optical transmitter 111A serving as each relay transmitter is 100%, bit patterns overlap each other at each optical transmitter 111A and therefore phase modulation caused by cross-phase modulation is accumulated. In contrast, as shown in FIG. 20, within the optical transmitter 111A, the phase modulation optical signal is passed through the chromatic dispersion loader 12A so that it is loaded with chromatic dispersion, whereby the dispersion map is obtained as shown in FIG. 22. As a result, the dispersion compensation factor in each optical transmitter 111A can be shifted from 100%. In this manner, bit patterns do not overlap each other at each optical transmitter 111A, so that the accumulation of phase modulation due to cross-phase modulation is reduced. In FIG. 20, while the chromatic dispersion loader 12A is inserted in the route of the phase modulation optical signal, it may be inserted in the route of the intensity modulation optical signal.

Figure 23:
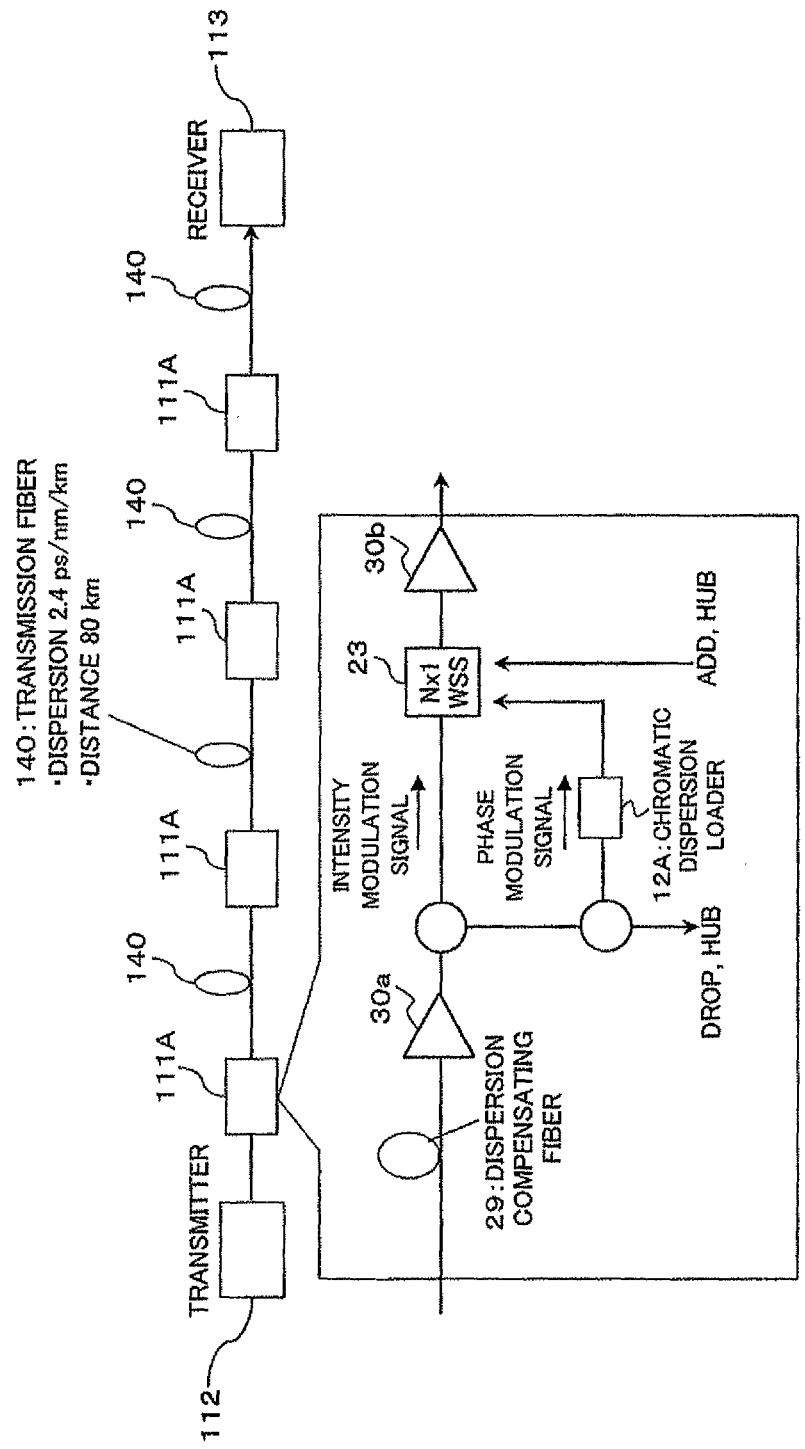
Figure 24:
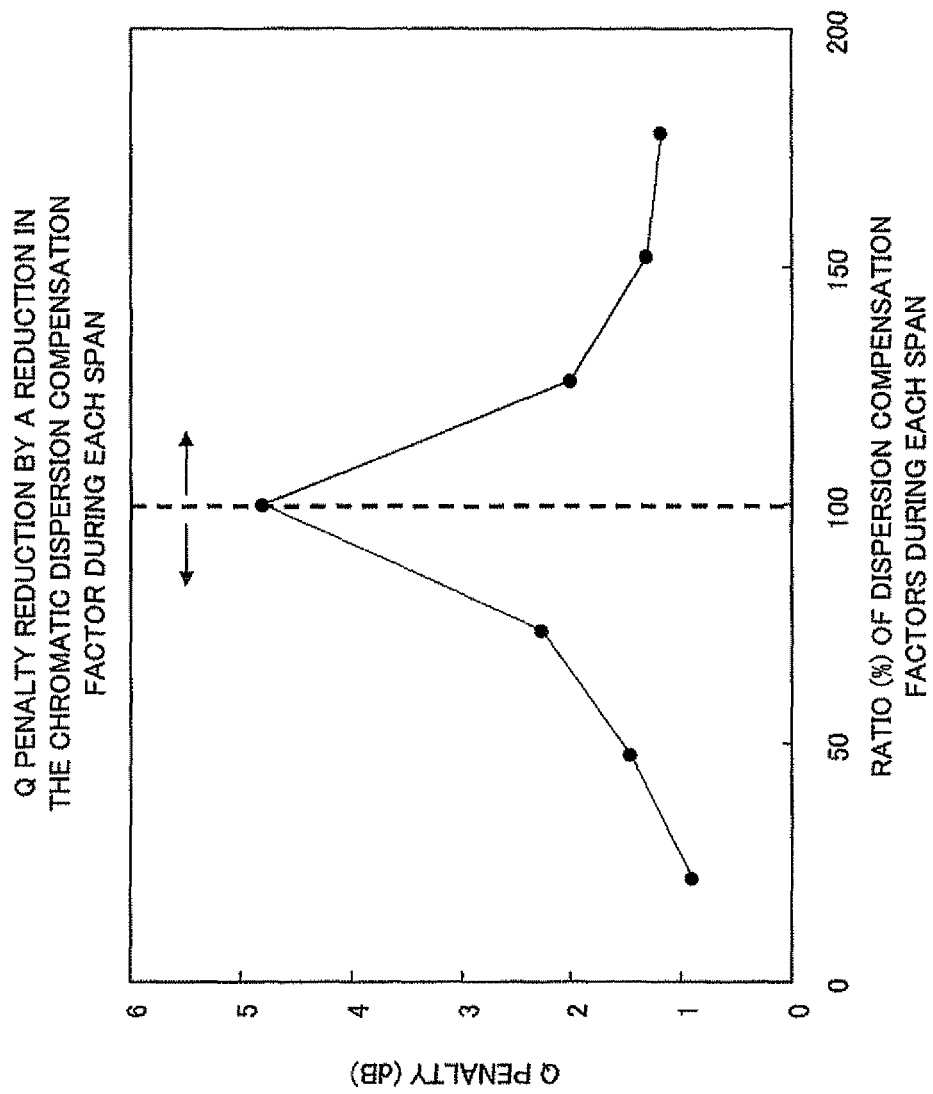

A model used to calculate effects of the second embodiment is shown in FIG. 23, and the calculation results are shown in FIG. 24. The model shown in FIG. 23 differs from that of FIG. 18 in that it includes the chromatic dispersion loader 12A instead of the delayer 22. The chromatic dispersion of the transmission fiber 140 is 2.4 ps/nm/km and the relay span between two optical transmitters is 80 km. Within the optical transmitter 111A, optical couplers (splitting units) 21a, 21b split the input signal into the intensity modulation optical signal and the phase modulation optical signal. Then, the chromatic dispersion loader 12A delays the phase modulation optical signal with respect to the intensity modulation optical signal. Thereafter, the wavelength-selective switch 23 combines the two signals. As shown in the calculation results of FIG. 24, by shifting the ratio of the dispersion compensation factors between the intensity modulation optical signal and the phase modulation optical signal in each optical transmitter 111A from 100%, bit patterns that are subjected to cross-phase modulation do not overlap each other in each relay transmitter, so that the accumulation of phase modulation due to cross-phase modulation can be reduced.

Thus, the second embodiment of the present invention also is able to possess the same advantages as the first embodiment by the chromatic dispersion loader 12A and combining unit 13.

(C) Third Embodiment

Figure 25:
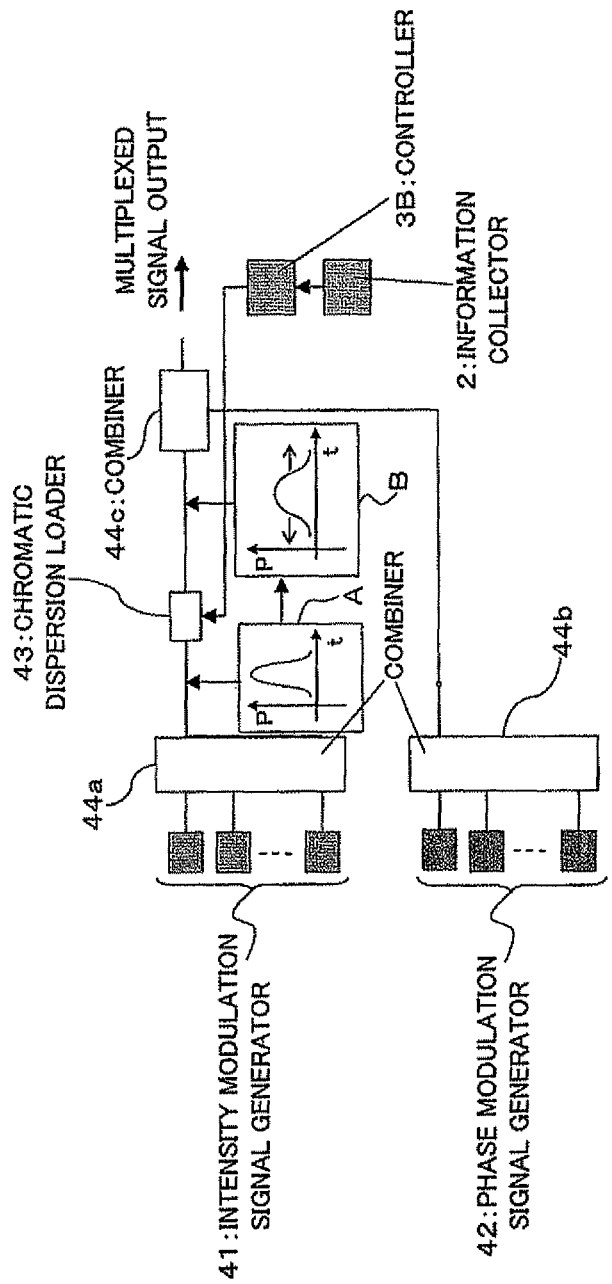
FIG. 25 is a block diagram showing an optical transmitter in accordance with a third embodiment of the present invention.

Referring to FIG. 25, there is shown an optical transmitter according to a third embodiment of the present invention. The optical transmitter shown in the figure is adapted to transmit a wavelength multiplexed signal of an intensity modulation optical signal and a phase modulation optical signal through a transmission line. This optical transmitter includes an intensity modulation signal generator 41 which outputs at least one intensity modulation optical signal over at least one channel (in this embodiment, a plurality of channels), and a phase modulation signal generator 42 which outputs at least one phase modulation optical signal over at least one channel (in this embodiment, a plurality of channels). The optical transmitter further includes a chromatic dispersion loader 43, combiners 44a to 44c, an information collector 2, and a controller 3B.

The first input combiner 44a is used for combining (wavelength-multiplexing) the intensity modulation optical signals from the intensity modulation signal generator 41, particularly different intensity modulation optical signals of different channels. Likewise, the second input combiner unit 44b is used for combining (wavelength-multiplexing) the phase modulation optical signals from the phase modulation signal generator 42, particularly different phase modulation optical signals of different channels.

The chromatic dispersion loader 43 has the function of a chromatic dispersion loading unit that spreads out the rising part and falling part of the intensity modulation optical signal generated in the intensity modulation signal generator 41. The chromatic dispersion loader 43 loads the intensity modulation optical signal (see reference character A in FIG. 25) from the first input combiner 44a with chromatic dispersion to output an intensity modulation optical signal (see reference character B in FIG. 25) in which the rising part and falling part have been spread out.

The output combiner 43c is used for combining (wavelength-multiplexing) the phase modulation optical signal loaded with chromatic dispersion in the chromatic dispersion loader 43 with the phase modulation optical signal from the second input combiner 42b to output a multiplexed signal. Thus, the combiners 44a to 44c constitute a multiplexing and transmitting unit, which multiplexes the intensity modulation optical signal from the chromatic dispersion loader 43 and the phase modulation optical signal from the phase modulation signal generator 42 and transmits the multiplexed signal.

Figure 26:
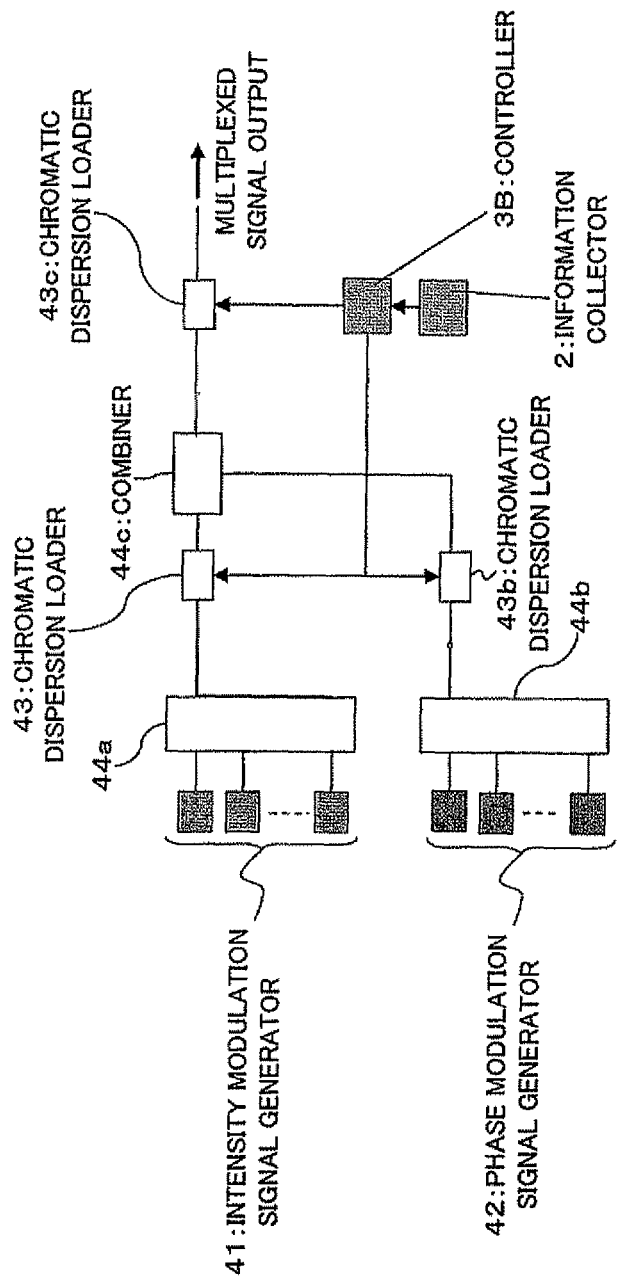
FIGS. 26 and 27 are block diagrams showing other optical transmitters in accordance with the third embodiment.

FIG. 26 shows another optical transmitter according to the third embodiment of the present invention. This optical transmitter, in addition to the components shown in FIG. 25, further includes a second chromatic dispersion loader 43b which loads the phase modulation optical signal from a second combiner 44b with chromatic dispersion, and a third chromatic dispersion loader 43c which loads the wavelength multiplexed signal from a third combiner 44c with the chromatic dispersion of overcompensation in a transmission line.

Figure 27:
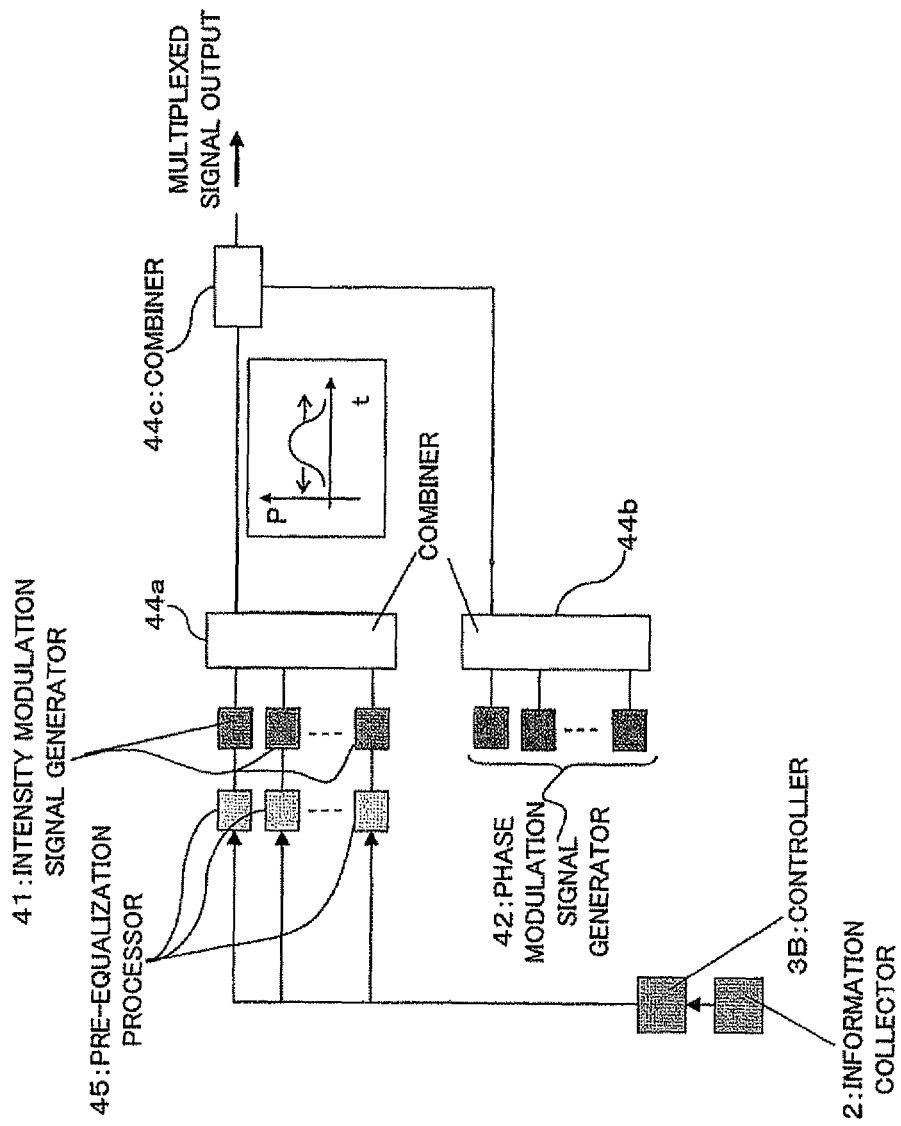

FIG. 27 shows still another optical transmitter according to the third embodiment of the present invention. The optical transmitter in the figure differs from those shown in FIGS. 25 and 26 in that instead of the chromatic dispersion loaders 43, 43b, and 43c, it includes pre-equalization processing units 45 which perform pre-equalization in the electric signal stage for each channel so that an intensity modulation optical signal generated in an intensity modulation signal generator 41 becomes an intensity modulation optical signal, in which the waveform has been spread out, such as that shown in FIG. 25. Thus, this pre-equalization processing unit 45 constitutes a chromatic dispersion loading unit that spreads out the waveform of an intensity modulation optical signal that is generated in the intensity modulation signal generator 41.

The optical transmitter of the third embodiment of the present invention loads a generated intensity modulation optical signal with dispersion to transmit a multiplexed signal in which the waveform of the intensity modulation optical signal has been spread out. That is, since the rise time and fall time of the intensity modulation optical signal become longer, the amount of change in the intensity becomes smaller, whereby the effect of cross-phase modulation becomes smaller.

Figure 28A:
FIGS. 28A to 28E and 29A to 29E are diagrams used to explain that the influence of cross-phase modulation at a signal receiving end can be suppressed by loading an intensity modulation optical signal with chromatic dispersion.
Figure 28B:
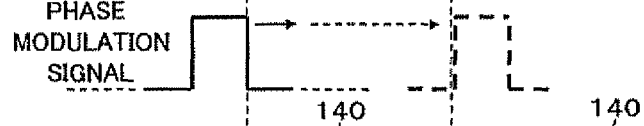
Figure 28C:
Figure 28D:
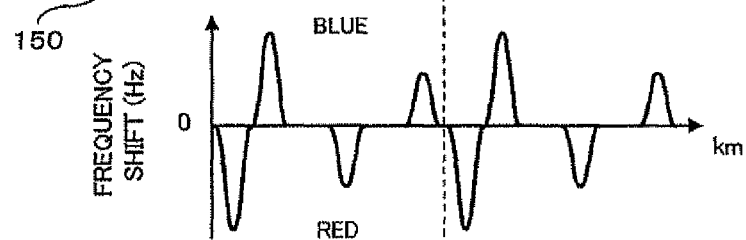
Figure 28E:
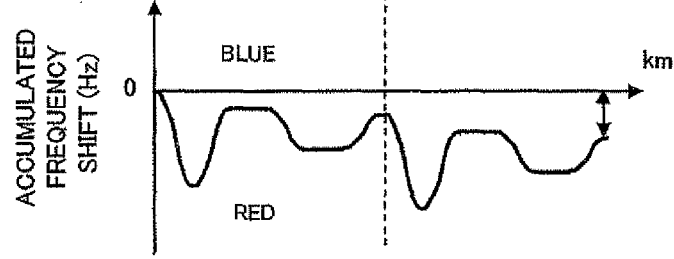
Figure 29A:
Figure 29B:
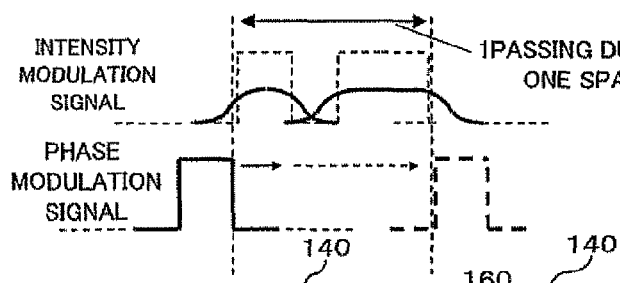
Figure 29C:
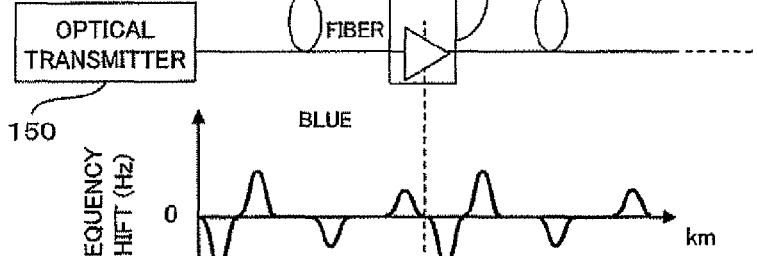

FIGS. 28A to 28E and 29A to 29E are diagrams used to explain that the influence of cross-phase modulation at the signal receiving end can be suppressed by loading an intensity modulation optical signal with chromatic dispersion. As shown in FIGS. 28C and 29C, suppose that a multiplexed signal of a phase modulation optical signal and an intensity modulation optical signal is sent out to a network in which optical transmitters 150 are connected in multiple stages through transmission fibers 140 and through relay transmitters 160 each including an optical amplifier.

In the case where the optical transmitter 150 transmits a multiplexed signal without spreading out the waveform of the intensity modulation optical signal, the intensity modulation optical signal and phase modulation optical signal can be considered to have bit patterns such as those shown in FIGS. 28A and 28B. That is, in one transmission span from the optical transmitter 150 to the next relay transmitter 160, when the propagation speed of the phase modulation optical signal is faster by four bits of the intensity modulation optical signal, the passing of the phase modulation optical signal at the bit waveform level of the intensity modulation optical signal can be considered as shown in FIGS. 28A and 28B.

That is, as shown in FIG. 28D, even during one span, upstream of the transmission fiber 140, the phase modulation optical signal passes the rising part and falling part of one pulse of the intensity modulation optical signal (occurrence of red chirp and blue chirp). In the middle of one span, it passes the rising part of the intensity modulation optical signal (occurrence of red chirp). At an input place to the next relay stage, at the time of transmission the bit falling part of the intensity modulation optical signal four bits ahead coincides with the falling part of the phase modulation optical signal (occurrence of blue chirp).

In other words, for the bit pattern of a multiplexed signal which is output from the optical transmitter 150, as shown in FIGS. 28A and 28B, it is conceivable that the bit patterns of the intensity modulation optical signal and phase modulation optical signal will coincide with each other. In this case, as shown in FIG. 28E, the residual chirp during each relay span accumulates, so that the effect of cross-phase modulation becomes greater at the signal receiving end.

Figure 29D:
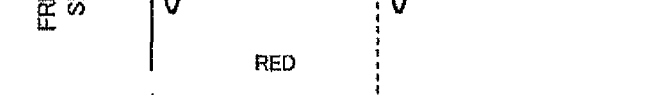
Figure 29E:
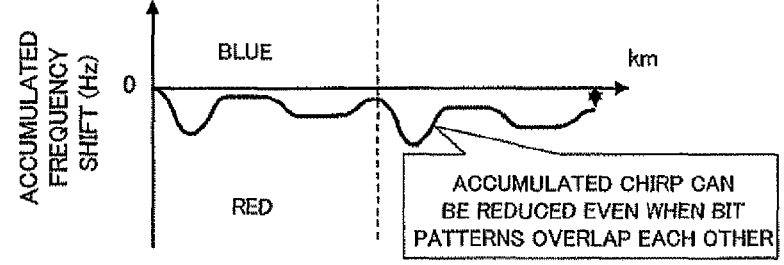

In contrast, in the case where an intensity modulation optical signal is loaded with chromatic dispersion so that the waveform is spread out, as shown in FIGS. 29A and 29B, even when the bit patterns of the intensity modulation optical signal and phase modulation optical signal coincide with each other, as shown on FIG. 29D, the red chirp and blue chirp that occur on the transmission fiber 140 can be reduced compared with the case of FIG. 28D. As a result, the amount of residual chirp that accumulates during the relay span also can be reduced as shown in FIG. 29E.

Thus, according to the third embodiment of the present invention, the chromatic dispersion loader 43 can reduce the occurrence of chirp on a transmission line due to cross-phase modulation, so that the influence of cross-phase modulation at the signal receiving end can be suppressed. Accordingly, the third embodiment is capable of suppressing transmission quality degradation in a network system where intensity modulation and phase modulation optical signals are multiplexed. In addition, because transmission systems can be easily upgraded by phase modulation optical signals, the enhancement of system performance (a wavelength utilization factor, an OSNR (optical signal-to-noise ratio) characteristic, etc.) can be expected, and the flexibility of network management can be increased.

In the third embodiment, while the intensity modulation optical signal which is generated in the optical transmitter is loaded with chromatic dispersion so that the waveform is spread out, according to the present invention, an optical relay transmitter may also have the function of loading an intensity modulation optical signal with chromatic dispersion so that the waveform is spread out.

Figure 30:
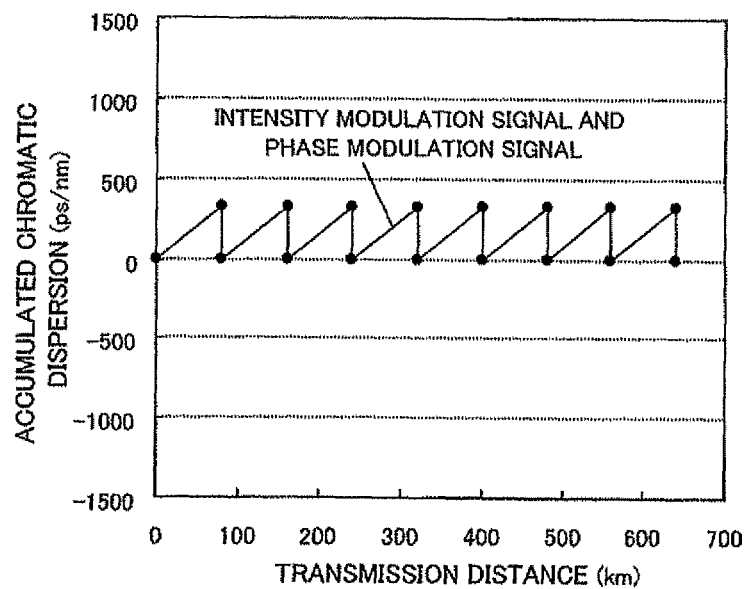
FIGS. 30 and 31 are diagrams used to explain the operational effects of the third embodiment of the present invention.
Figure 31:
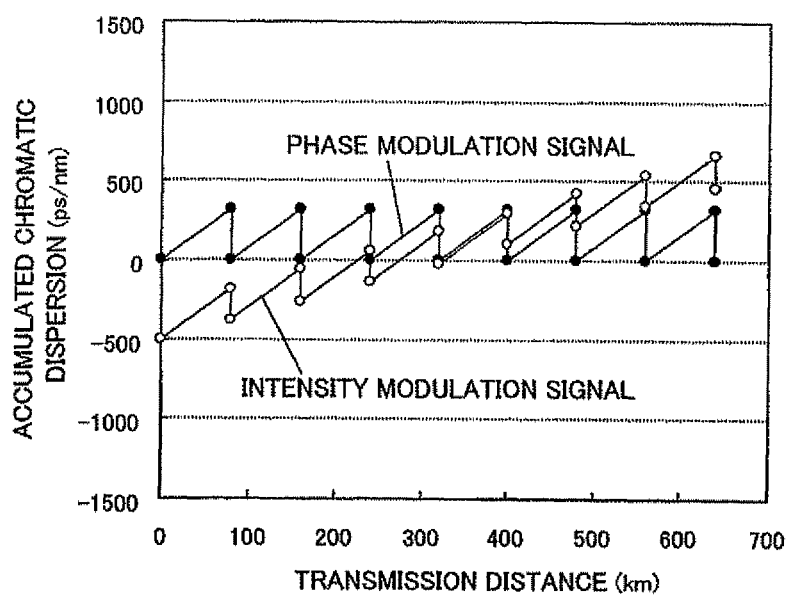

The chromatic dispersion in the second embodiment and the chromatic dispersion in the third embodiment can also be combined and carried out. FIG. 31 shows an example of a chromatic dispersion map in the case where the chromatic dispersion in the second embodiment is combined the chromatic dispersion in the third embodiment. A comparative chromatic dispersion map is shown in FIG. 30. In the chromatic dispersion map of FIG. 30, both an intensity modulation optical signal and a phase modulation optical signal have a chromatic dispersion compensation factor of 100%. In contrast, in the chromatic dispersion map of FIG. 31, an intensity modulation optical signal is loaded with chromatic dispersion in the transmitting unit, and in the chromatic dispersion loader 12A in the optical transmitter 111A as each relay transmitter, the chromatic dispersion compensation factor for an intensity modulation optical signal is shifted from 100%. In this manner, waveform degradation due to cross-phase modulation can be suppressed, while preserving the transmission property of an intensity modulation optical signal over long distances as much as possible.

[D] Fourth Embodiment

Figure 32:
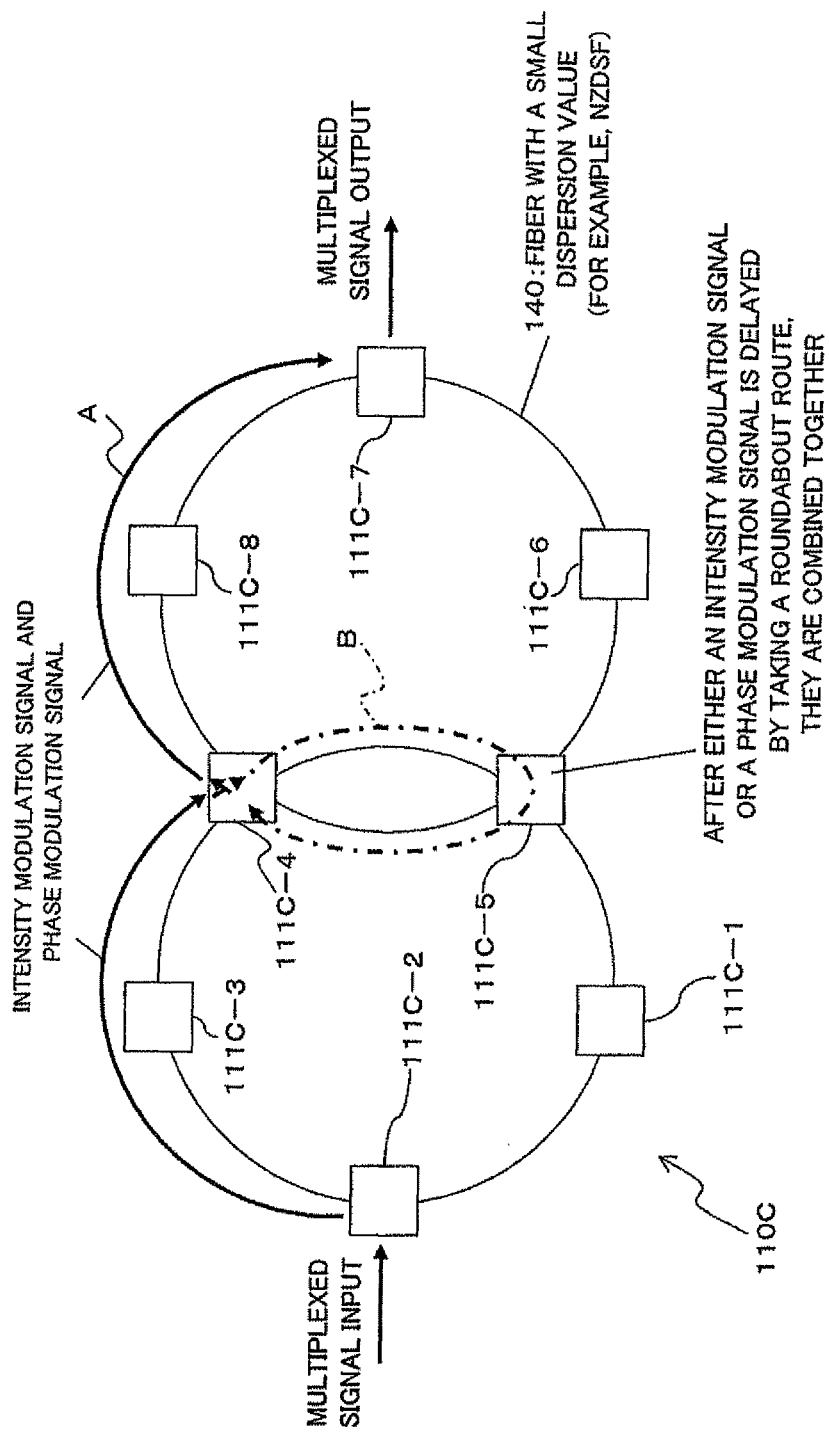
FIG. 32 is a diagram showing the configuration of a data transmission network system to which an optical transmitter according to a fourth embodiment of the present invention is applied.

FIG. 32 shows the configuration of a data transmission network system to which an optical transmitter according to a fourth embodiment of the present invention is applied. As shown in the figure, the data transmission network system 1100 is applied as the data transmission network system 110 shown in FIG. 1. Therefore, as with the data transmission network system 110 shown in FIG. 1, optical transmitters 111C-1 to 111C-5 are connected in ring form through a transmission fiber 140 with a relatively small dispersion value (e.g., NZDSF (Nonzero Dispersion-Shifted Fiber)), and optical transmitters 111C-4 to 111C-8 also are connected in ring form through a transmission fiber 140 with a relatively small dispersion value (e.g., NZDSF (Nonzero Dispersion-Shifted Fiber)).

In the data transmission network system 110C described above, consider the case where a multiplexed signal of an intensity modulation optical signal and a phase modulation optical signal, which is input to the optical transmitter 111C-2, is relayed in order through the optical transmitters 111C-3, 111C-4, 111C-8, and 111C-7 (see reference character A in FIG. 32).

Directing attention to the relay process of the optical transmitter 111C-4, either of the intensity modulation optical signal and phase modulation optical signal of the multiplexed input signal (e.g., the intensity modulation optical signal) is relayed to the optical transmitters 111C-8 and 111C-7 by way of a roundabout route (see reference character B in FIG. 32) formed between the optical transmitters 111C-4 and 111C-5.

More specifically, the optical transmitter 111C-4 changes the routes of the intensity modulation optical signal and phase modulation optical signal in cooperation with the optical transmitter 111C-5 to give a time delay difference between both signals. Therefore, as with the first embodiment, the optical transmitter 111C of the fourth embodiment is able to suppress the influence of cross-phase modulation at the signal receiving end.

Figure 33:
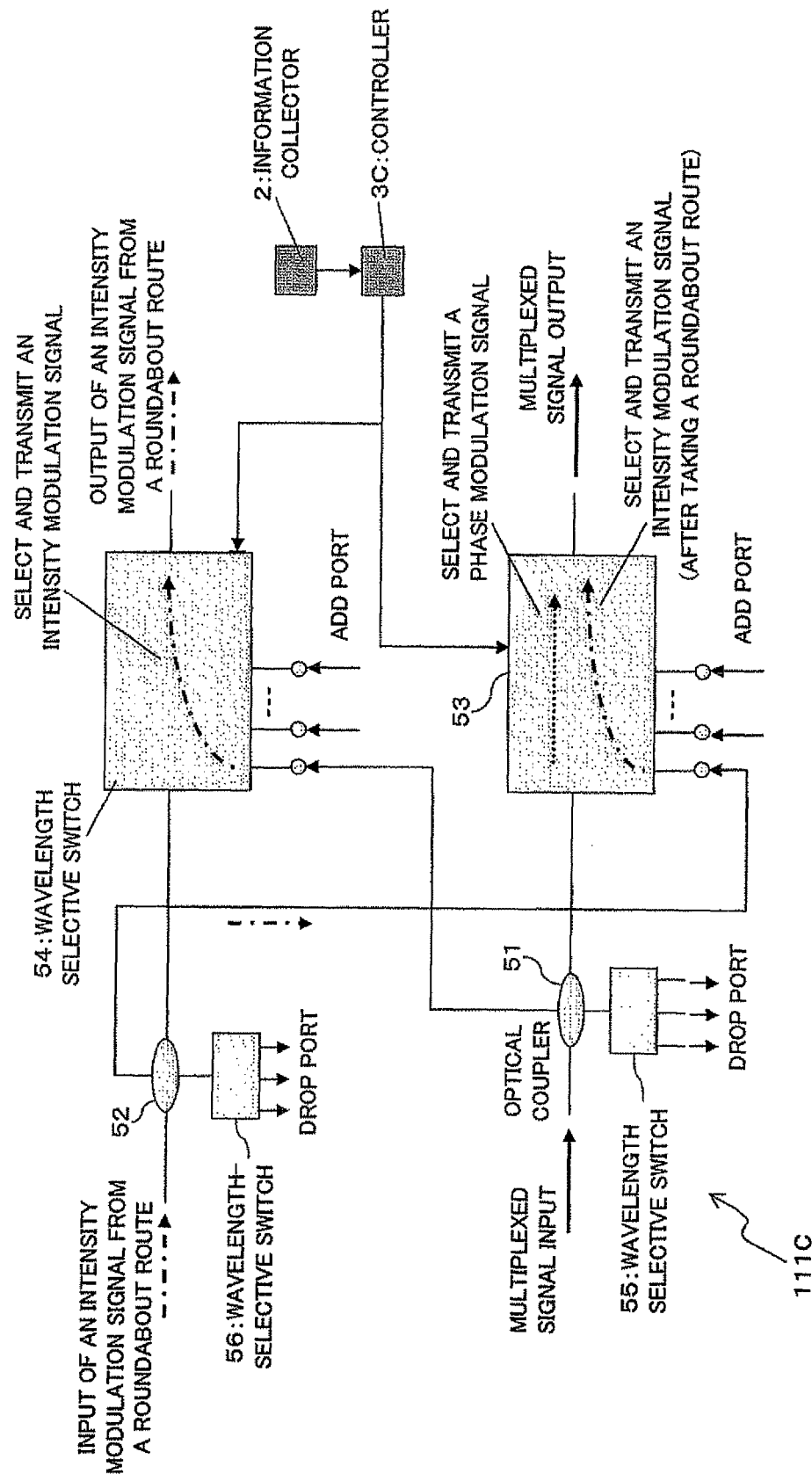
FIG. 33 is a block diagram showing the optical transmitter configured in accordance with the fourth embodiment of the present invention.

FIG. 33 shows the configuration of the optical transmitter 1110 in which a roundabout route can be set as described above. The optical transmitter 111C, as shown in the figure, includes optical couplers 51, 52 and wavelength-selective switches 53 to 56, and further includes an information collector 2 and a controller 3C which are basically the same as the first embodiment.

The first optical coupler 51 is constructed to split a multiplexed input signal (of an intensity modulation optical signal and a phase modulation optical signal) into three signals, and output one to the wavelength-selective switch 53 connected on the output transmission fiber 140, another to the drop wavelength-selective switch 55, and still another to an add port of the wavelength-selective switch 54 connected on the transmission fiber 140 forming the roundabout route.

Directing attention to the optical transmitter 111C-4 that relays the multiplexed input signal which is transmitted through the route indicated by reference character A in FIG. 32, the first optical coupler 51 is constructed to output the first split optical signal of the multiplexed input signal to the wavelength-selective switch 53 leading to the transmission fiber 140 connected to the optical transmitter 111C-8 forming the relay route A, the second split optical signal to the drop wavelength-selective switch 55, and the third split optical signal to an add port of the wavelength-selective switch 54 leading to the transmission fiber 140 forming the roundabout route (route between the optical transmitters 111C-4 and 111C-5) B.

The second optical coupler 52 is connected on the transmission fiber 140 forming the roundabout route B (between the optical transmitters 111C-4 and 111C-5), and is constructed to split the optical signal from the transmission fiber 140 forming the roundabout route B into three optical signals, and output one to an add port of the wavelength-selective switch 53 leading to the transmission fiber 140 forming the output route A, another to the drop wavelength-selective switch 56, and still another to the wavelength-selective switch 54 leading to the transmission fiber 140 forming the roundabout route B.

The first wavelength-selective switch 53 is a device to which the multiplexed signal, transmitted through the upstream transmission fiber 140 forming the relay route A and output from the first optical coupler 51, is input and the optical signal, transmitted through the transmission fiber 140 forming the roundabout route B and output from the second optical coupler 52, is input through an add port, and which selects and outputs an optical signal of a wavelength which is to be relayed to the downstream transmission fiber 140 forming the relay route A.

The second wavelength-selective switch 54 is a device to which the optical signal transmitted through the transmission fiber 140 forming the roundabout route B is input through the second optical coupler 52, and the split optical signal from the first optical coupler 51 is input through an add port, and which selects and outputs a wavelength that is to be output through the output port.

The controller 3C is constructed to set and control the route selection for each wavelength that is performed in the wavelength-selective switches 53 to 56, based on management information collected in the information collector 2. For example, based on management information collected in the information collector 2, when a transmission fiber 140 to which an output signal is sent out is determined to be vulnerable to cross-phase modulation, the controller 3C sets the roundabout route B between the optical transmitters 111C-4 and 111C-5 for the roundabout transmission of an intensity modulation optical signal, by controlling the route selection for each wavelength in the wavelength-selective switches 53 and 54.

More specifically, by controlling the wavelength-selective switch 54, between the intensity modulation and phase modulation optical signals of the multiplexed signal that is input through the add port of the switch 54 from the first optical coupler 51, one of the two signals (e.g., the intensity modulation optical signal in the case of FIG. 33) is sent out to the roundabout route B.

In addition, by controlling the wavelength-selective switch 53, between the intensity modulation and phase modulation optical signals of the multiplexed signal that is input from the first optical coupler 51, the other of the two signals (e.g., the phase modulation optical signal in the case of FIG. 33) is sent out to the downstream relay route A, while the intensity modulation optical signal (transmitted by way of the roundabout route B) from the optical coupler 52 that is input through the add port of the switch 53 is sent out to the downstream relay route A.

Thus, the optical coupler 51, wavelength-selective switch 53, and wavelength-selective switch 54 as a whole realize the function of a separating unit that separate a wavelength multiplexed input signal into an intensity modulation optical signal and a phase modulation optical signal. The wavelength-selective switch 54 constitutes a roundabout route sending-out unit that sends out either of the intensity modulation and phase modulation optical signals separated in the separating unit to the roundabout route. Further, the optical couplers 51, 52 and wavelength-selective switch 53 as a whole constitute a wavelength multiplexing and relaying unit that wavelength-multiplexes one of the intensity modulation and phase modulation optical signals which is input through the roundabout route and the other of the two signals which is input from the separating unit, and relays the wavelength multiplexed signal.

In the optical transmitter 111C-4 shown in FIG. 32 configured as described above, as shown in FIG. 33, after it is recognized, based on management information collected in the information collector 2, that a wavelength multiplexed output signal is vulnerable to cross-phase modulation in the downstream transmission fiber 140 forming the relay route A (e.g., after it is recognized that the downstream transmission fiber 140 is a fiber whose chromatic dispersion value is small), the route selection in the wavelength-selective switches 53, 54 is controlled by the controller 3C, whereby the routes of the intensity modulation optical signal and phase modulation optical signal are selected so that a time delay difference is given therebetween.

More specifically, by causing wavelengths and modulation methods to correspond in a 1:1 ratio, and selecting wavelengths with the wavelength-selective switches 53, 54, an optical signal is routed according to the modulation method. That is, as shown in FIG. 33, the intensity modulation optical signal is sent out to the roundabout route B so that it is delayed with respect to the phase modulation optical signal, and then they are multiplexed. As a result, as the bit patterns of the phase modulation optical signal and intensity modulation optical signal do not overlap each other in the optical transmitters of 111C-8 and 111C-7 disposed after the optical transmitter 111C-4, the accumulation of phase modulation due to cross-phase modulation can be reduced.

Thus, according to the optical transmitter of the fourth embodiment of the present invention, the roundabout route setting unit is able to set the roundabout route to either an intensity modulation optical signal or a phase modulation optical signal, whereby a bit time difference can be provided between the intensity modulation optical signal and the phase modulation optical signal. Therefore, as with the first embodiment, by wavelength-multiplexing the intensity modulation optical signal transmitted through the roundabout route and the phase modulation optical signal not transmitted through the roundabout route and transmitting the wavelength multiplexed signal, the accumulation of red chirp can be reduced compared with the case where both modulation signals are transmitted without the roundabout route. Thus, the influence of cross-phase modulation at the signal receiving end can be suppressed, whereby transmission quality degradation can be suppressed in network systems in which intensity modulation and phase modulation optical signals are multiplexed.

Besides, since transmission systems can be easily upgraded by phase modulation optical signals, the enhancement of system performance (a wavelength utilization factor, an OSNR (optical signal-to-noise ratio) characteristic, etc.) can be expected, and the flexibility of network management can be increased.

[E] Fifth Embodiment

Figure 34:
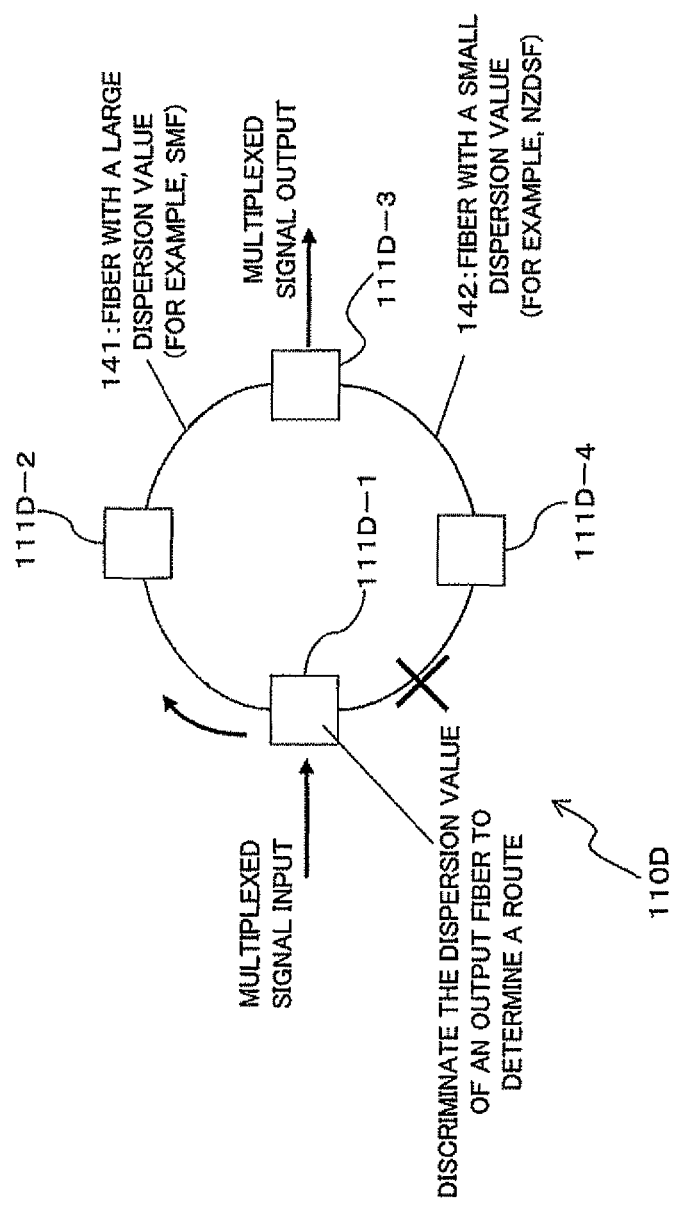
FIG. 34 is a diagram showing the configuration of a data transmission network system to which an optical transmitter according to a fifth embodiment of the present invention is applied.

FIG. 34 shows the configuration of a data transmission network system to which an optical transmitter according to a fifth embodiment of the present invention is applied. As shown in the figure, in the data transmission network system 110D of the fifth embodiment, optical transmitters 111D-1 to 111D-3 are interconnected through a transmission fiber 141 with a relatively large dispersion value (e.g., SMF (Single-Mode Fiber)), while optical transmitters 111D-1, 111D-4, and 111D-3 are interconnected through a transmission fiber 142 with a relatively small dispersion value (e.g., NZDSF (Nonzero Dispersion-Shifted Fiber)).

Thus, in outputting a multiplexed input signal from the optical transmitter 111D-1 toward the optical transmitter 111D-3, the data transmission network system 110D can employ either the route via the single-mode fiber 141 or the route via the nonzero dispersion-shifted fiber 142. As set forth above, in the case where a wavelength multiplexed optical signal includes an intensity modulation optical signal and a phase modulation optical signal, when employing an optical fiber with a relatively small dispersion value such as the nonzero dispersion-shifted fiber 142, the walk-off between the intensity modulation optical signal and the phase modulation optical signal is small. Therefore, the wavelength multiplexed signal is determined to be vulnerable to cross-phase modulation at the signal receiving end. Hence, when transmitting a multiplexed signal that is vulnerable to cross-phase modulation, the multiplexed signal is relayed to the optical transmitter 111D-3 via the single-mode fiber 141, whereby the influence of cross-phase modulation at the signal receiving end can be reduced.

On the other hand, in the case where it is conceivable that depending on the modulation method and wavelength pattern of each channel of a wavelength multiplexed input signal, transmission via the nonzero dispersion-shifted fiber 142 will have better reception quality than transmission via the single-mode fiber 141, the input signal can be relayed to the optical transmitter 111D-3 via the nonzero dispersion-shifted fiber 142.

Figure 35:
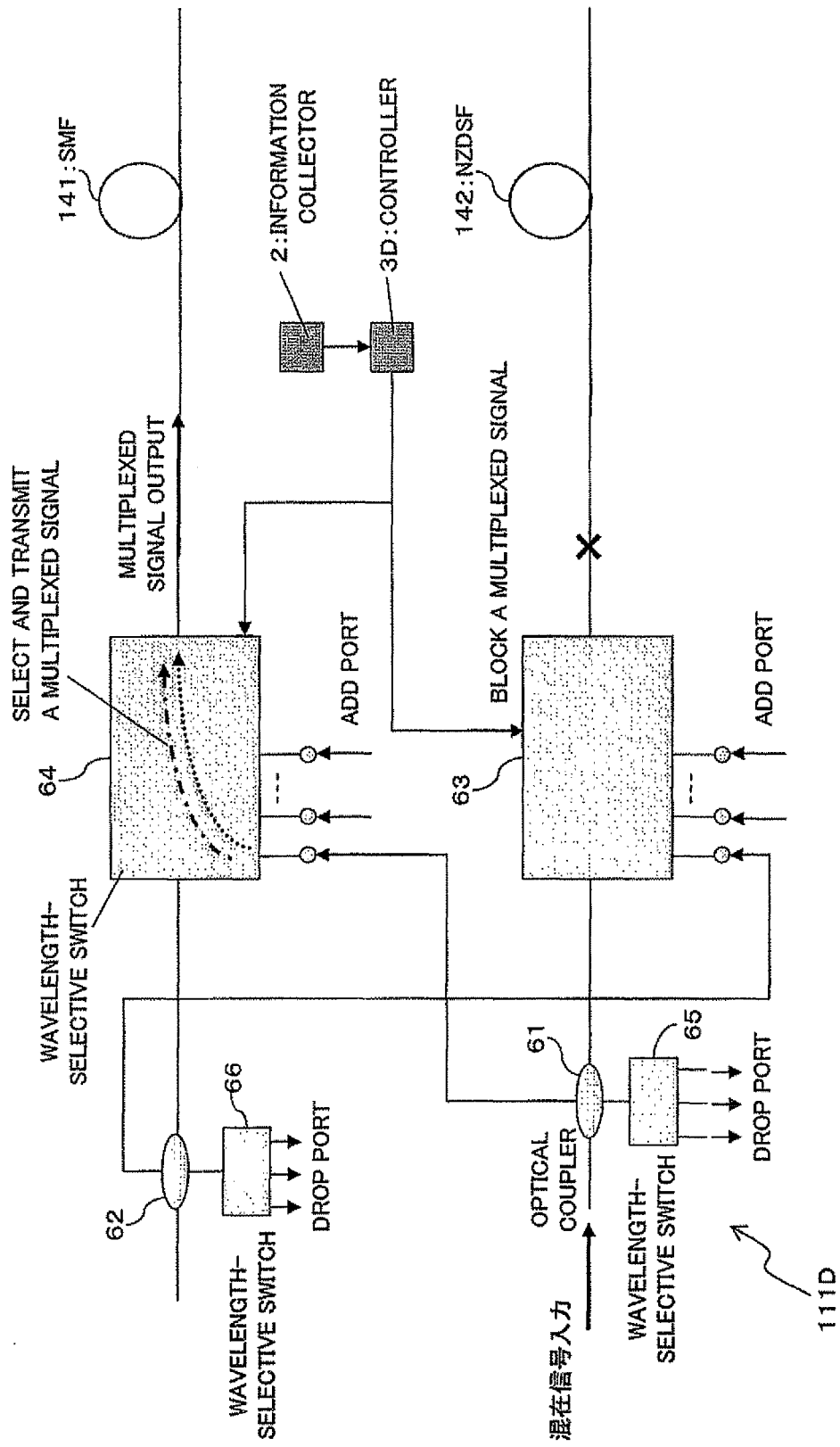
FIG. 35 is a block diagram showing the optical transmitter configured in accordance with the fifth embodiment of the present invention.

FIG. 35 shows the configuration of the optical transmitter 111D that has the function of determining a route through which a multiplexed signal is transmitted. The optical transmitter 111D, as shown in the figure, includes optical couplers 61, 62 and wavelength-selective switches 63 to 66, and includes an information collector 2 and a controller 3D which are basically the same as the first embodiment.

That is, as a relay transmitter in the single-mode fiber 141, the optical transmitter 111D shown in FIG. 35 includes the optical coupler 62, wavelength-selective switch 64, and drop wavelength-selective switch 66. As a relay transmitter in the nonzero dispersion-shifted fiber 142, it includes the optical coupler 61, wavelength-selective switch 63, and drop wavelength-selective switch 65.

The optical coupler 61 is constructed to split a wavelength multiplexed input signal (e.g., a multiplexed signal of an intensity modulation optical signal and a phase modulation optical signal) into three optical signals, and output one to the wavelength-selective switch 63 leading to the nonzero dispersion-shifted fiber 142, another to the drop wavelength-selective switch 65, and still another to an add port of the wavelength-selective switch 64 leading to the single-mode fiber 141.

Directing attention now to the case of relaying a wavelength multiplexed input signal from the optical transmitter 111D-1 shown in FIG. 34 toward the optical transmitter 111D-3, the optical coupler 61 is constructed to output the first split signal of the input signal to the wavelength-selective switch 63 leading to the nonzero dispersion-shifted fiber 142, the second split signal to the drop wavelength-selective switch 65, and the third split signal to an add port of the wavelength-selective switch 64 leading to the single-mode fiber 141.

The optical coupler 62 is connected to an upstream transmission fiber (e.g. a single-mode fiber) differing from the fiber connected with the optical coupler 61, and is constructed to split the optical signal from this upstream transmission fiber into three optical signals, and output one to an add port of the wavelength-selective switch 63 leading to the nonzero dispersion-shifted fiber 142, another to the drop wavelength-selective switch 66, and still another to the wavelength-selective switch 64 leading to the single-mode fiber 141.

The wavelength-selective switch 63 is a device to which the split signal from the optical coupler 61 is input and the split signal from the optical coupler 62 is input through an add port of the switch 63, and which selects a wavelength that is to be relayed to the nonzero dispersion-shifted fiber 142. The wavelength-selective switch 64 is a device to which the split signal from the optical coupler 62 is input and the split signal from the optical coupler 61 is input through an add port of the switch 64, and which selects a wavelength that is to be relayed to the single-mode fiber 141.

Thus, the optical coupler 61, wavelength-selective switch 63, and wavelength-selective switch 64 as a whole constitute a route switching unit that selects a route through which a wavelength multiplexed input signal is transmitted.

The controller 3D is constructed to set and control the route selection for each wavelength in the wavelength-selective switches 63 to 66, based on management information collected in the information collector 2.

For instance, when, based on management information from the collector 2 and information on the combination of modulation methods (presence of a multiplexed signal of an intensity modulation optical signal and a phase modulation optical signal) and wavelength patterns of a wavelength multiplexed input signal, the controller 3D determines the input signal to be vulnerable to cross-phase modulation at the signal receiving end, the controller 3D controls the route selection for each wavelength in the wavelength-selective switches 63, 64, thereby setting the route via the single-mode fiber 141 as the route for suppressing the influence of cross-phase modulation at the signal receiving end.

More specifically, by controlling the wavelength-selective switch 64, the multiplexed signal from the optical coupler 61 is sent out to the single-mode fiber 141. On the other hand, by controlling the wavelength-selective switch 63, the multiplexed signal that is input from the optical coupler 61 is blocked so it is not sent out to the nonzero dispersion-shifted fiber 142.

When, based on management information from the information collector 2, the route of the nonzero dispersion-shifted fiber 142 is determined to be more proper than the route of the single-mode fiber 141, the controller 3D controls the route selection for each wavelength in the wavelength-selective switches 63 and 64, thereby setting the route via the nonzero dispersion-shifted fiber 142 and blocking the route to the single-mode fiber 141.

In other words, the controller 3D controls the selection of the route to single-mode fiber 141 or nonzero dispersion-shifted fiber 142 in the wavelength-selective switches (route switching units) 63 and 64, based on management information collected in the information collector 2.

Thus, according to the fifth embodiment of the present invention, the controller 3D is able to control the route selection that is performed in the wavelength-selective switches 63 and 64 as the route switching unit, based on management information collected in the information collector 2. Therefore, when a wavelength multiplexed signal is vulnerable to cross-phase modulation at the signal receiving end, a route can be adaptably selected so that cross-phase modulation is minimized. Thus, the fifth embodiment has the advantage of suppressing transmission quality degradation. In addition, because transmission systems can be easily upgraded by phase modulation optical signals, the enhancement of system performance (a wavelength utilization factor, an OSNR (optical signal-to-noise ratio) characteristic, etc.) can be expected, and the flexibility of network management can be increased.

[F] Sixth Embodiment

Figure 36:
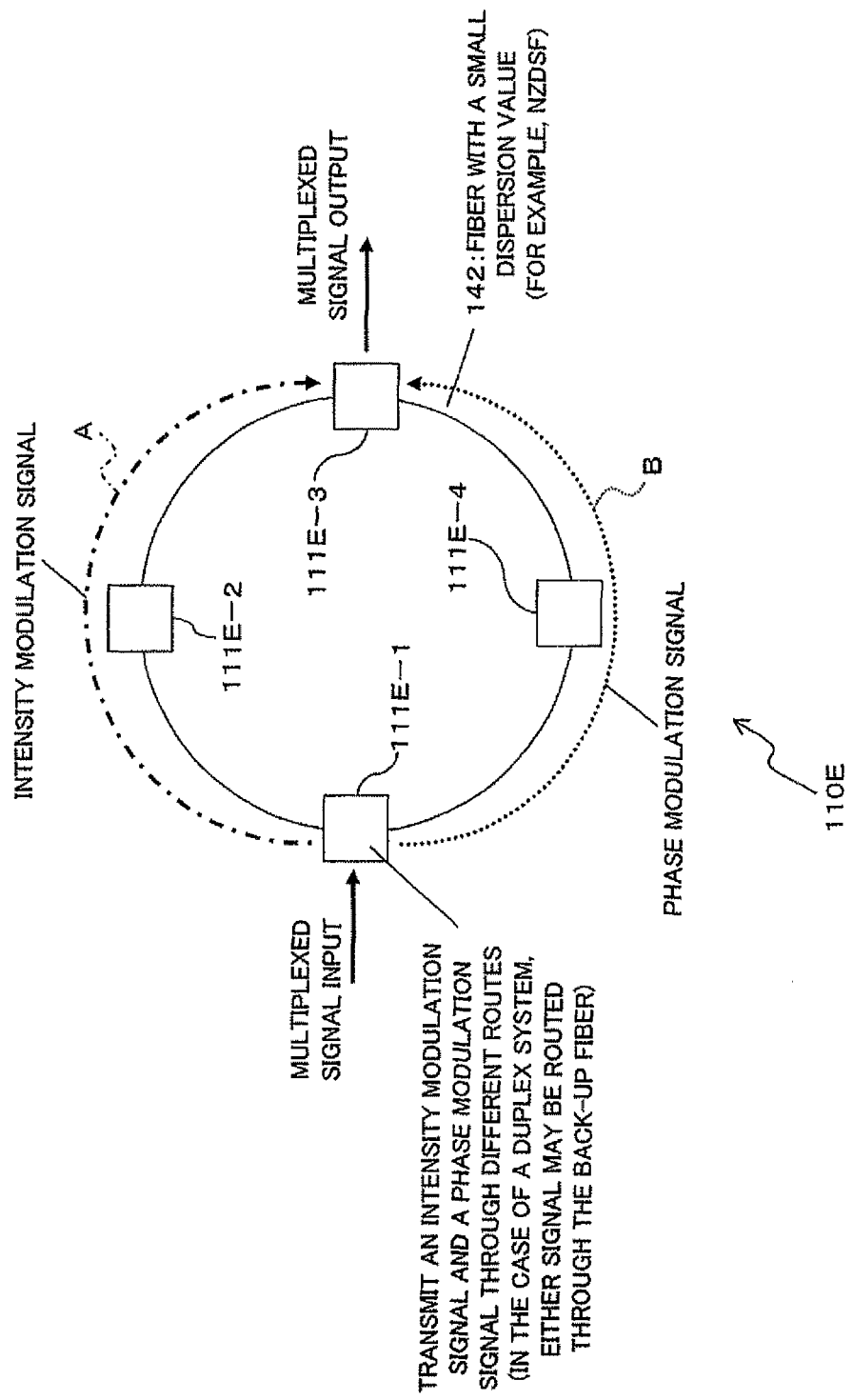
FIG. 36 is a diagram showing the configuration of a data transmission network system to which an optical transmitter according to a sixth embodiment of the present invention is applied.

FIG. 36 shows the configuration of a data transmission network system to which an optical transmitter according to a sixth embodiment of the present invention is applied. As shown in the figure, in the data transmission network system 110E of the sixth embodiment, optical transmitters 111E-1 to 111E-4 are connected in ring form through a transmission fiber 142 with a relatively small dispersion value (e.g., NZDSF (Nonzero Dispersion-Shifted Fiber)).

Thus, in outputting a multiplexed input signal from the optical transmitter 111E-1 toward the optical transmitter 111E-3, the data transmission network system 110E is able to employ either the route via the optical transmitter 111E-2 (see reference character A in FIG. 36) or the route via the optical transmitter 111E-4 (reference character B in FIG. 36).

Figure 37:
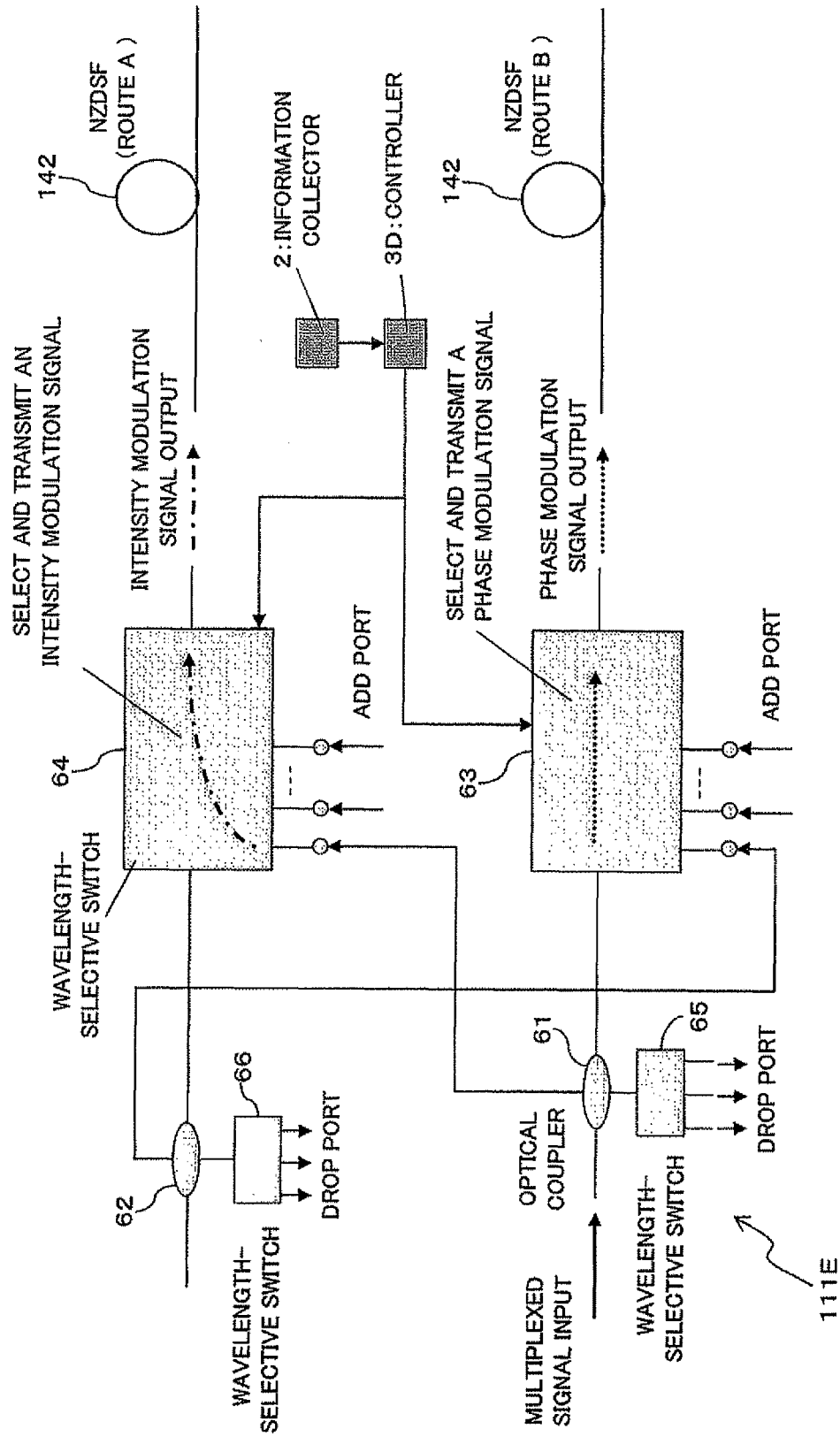
FIG. 37 is a block diagram showing the optical transmitter configured in accordance with the sixth embodiment of the present invention.

In the optical transmitter 111E according to the sixth embodiment, as shown in FIG. 37, by the configuration which is basically the same as the optical transmitter 111D of the fifth embodiment (see reference numerals 61 to 66, 2, and 3D in FIG. 35), when a wavelength multiplexed Input signal is a multiplexed signal of an intensity modulation optical signal and a phase modulation optical signal, the routes to which the intensity modulation optical signal and the phase modulation optical signal are sent out are determined so that they are different routes (directing attention to the optical transmitter 111E-1 of FIG. 36, routes A and B). This makes it possible to suppress the influence of cross-phase modulation at the receiving end due to the transmission of a multiplexed signal of an intensity modulation optical signal and a phase modulation optical signal.

Therefore, even in the sixth embodiment, when a multiplexed input signal is vulnerable to cross-phase modulation at the signal receiving end, routes can be adaptably selected so cross-phase modulation is minimized. As a result, this embodiment has the advantage of being able to suppress transmission quality degradation. In addition, because transmission systems can be easily upgraded by phase modulation optical signals, the enhancement of system performance (a wavelength utilization factor, an OSNR (optical signal-to-noise ratio) characteristic, etc.) can be expected, and the flexibility of network management can be increased.

Note that in the case of a duplex network system, either a phase modulation optical signal or an intensity modulation optical signal can be transmitted through the back-up route.

[G] Seventh Embodiment

Figure 38:
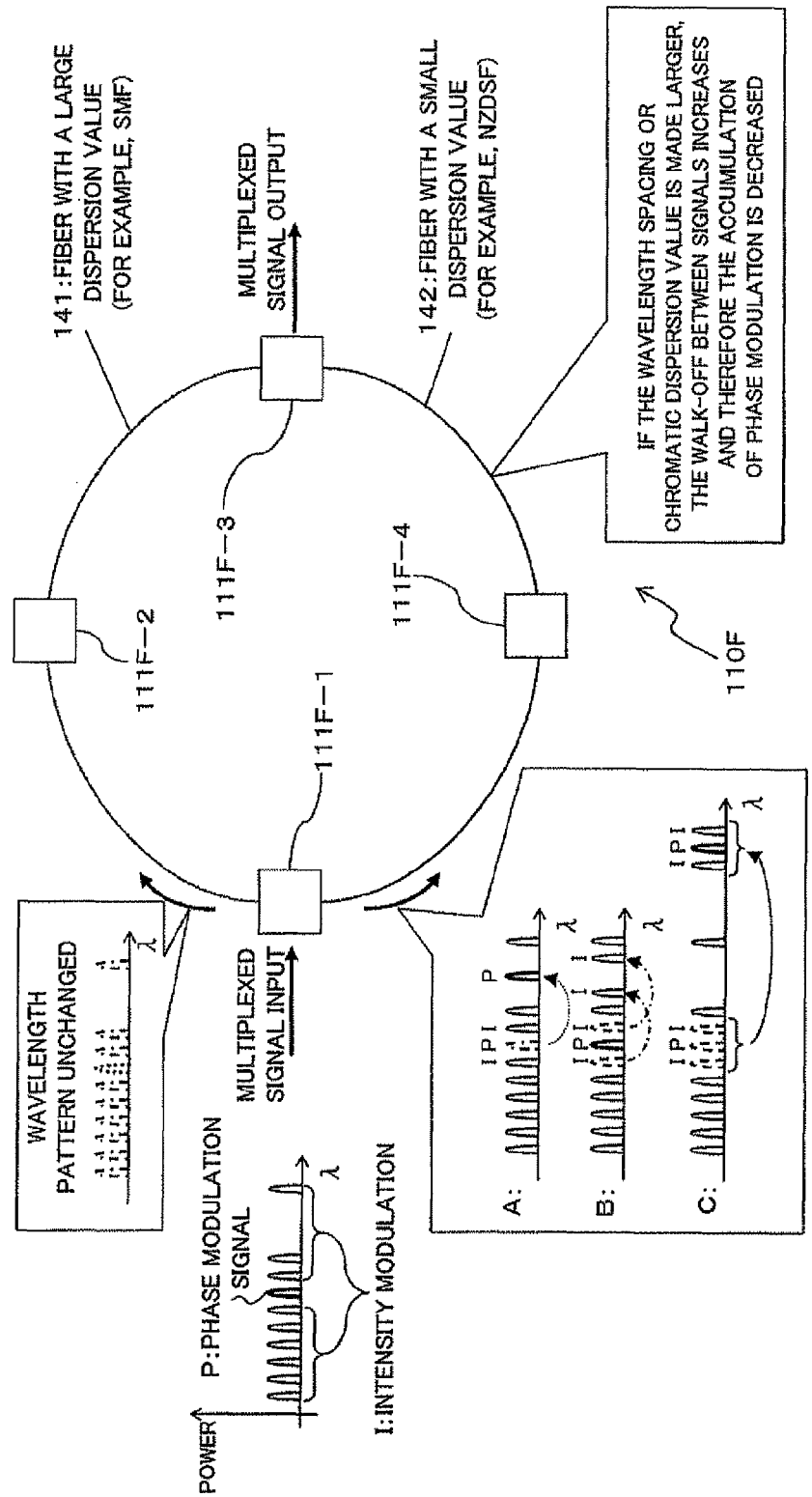
FIG. 38 is a diagram showing the configuration of a data transmission network system to which an optical transmitter according to a seventh embodiment of the present invention is applied.

FIG. 38 shows the configuration of a data transmission network system to which an optical transmitter according to a seventh embodiment of the present invention is applied. As shown in the figure, in the data transmission network system 110F of the seventh embodiment, as with the data transmission network system 111D of the fifth embodiment, optical transmitters 111F-1 to 111F-3 are interconnected through a transmission fiber 141 with a relatively large dispersion value (e.g., SMF (Single-Mode Fiber)), while optical transmitters 111F-1, 111F-4, and 111F-3 are interconnected through a transmission fiber 142 with a relatively small dispersion value (e.g., NZDSF (Nonzero Dispersion-Shifted Fiber)).

Thus, in outputting a multiplexed input signal from the optical transmitter 111F-1 toward the optical transmitter 111F-3, the data transmission network system 110F can employ either the route via the single-mode fiber 141 or the route via the nonzero dispersion-shifted fiber 142. As set forth above, in the case where a wavelength multiplexed optical signal includes an intensity modulation optical signal and a phase modulation optical signal, when employing an optical fiber with a relatively small dispersion value such as the nonzero dispersion-shifted fiber 142, the walk-off between the intensity modulation optical signal and the phase modulation optical signal is small. Therefore, the wavelength multiplexed signal can be considered vulnerable to cross-phase modulation at the signal receiving end.

Hence, in the optical transmitter 111F of the seventh embodiment, in the case where a multiplexed signal is transmitted through the nonzero dispersion-shifted fiber 142, the wavelength pattern of a phase modulation optical signal vulnerable to cross-phase modulation and adjacent intensity modulation optical signals is changed.

Figure 39:
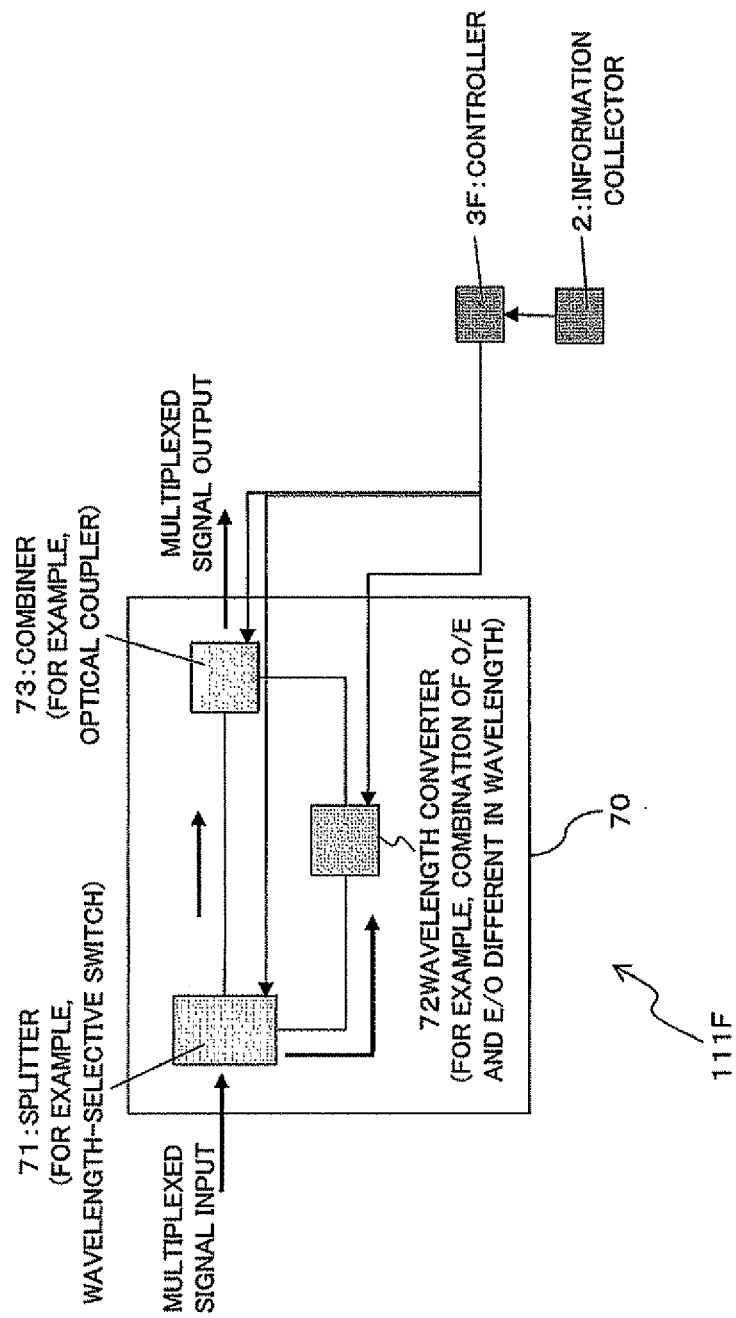
FIG. 39 is a block diagram showing the optical transmitter configured in accordance with the seventh embodiment of the present invention.

FIG. 39 shows the optical transmitter 111F having the function of changing a wavelength pattern. As shown in the figure, the optical transmitter 111F includes a wavelength pattern converting unit 70, which is equipped with a splitter 71, a wavelength converter 72, and a combiner 73, and includes the same information collector 2 and controller 3F as those of the first embodiment.

Directing attention now to the case where the optical transmitter 111F is employed as the optical transmitter 111F-1 of FIG. 38, either the single-mode fiber 141 or the nonzero dispersion-shifted fiber 142 can be selected in wavelength units as a route through which a multiplexed output signal is transmitted. The optical transmitter 111F may have the configuration of the optical transmitter 111D shown in FIG. 35 and have the wavelength pattern converting unit 70 of FIG. 39 interposed between the wavelength-selective switch 63 and nonzero dispersion-shifted fiber 142 of FIG. 35.

The splitter 71 is a separating unit that separates optical signals of one wavelength band of a wavelength multiplexed signal from optical signals of another wavelength band. For example, it can be constituted by a wavelength-selective switch that selects an output route for each wavelength according to a control signal from the controller 3F. Particularly, for optical signals of one wavelength band, they can pass through different routes in channel units, respectively.

The wavelength converter 72 constitutes wavelength allocation changing unit that changes the wavelength allocation of intensity modulation optical signals of one wavelength band separated in the splitter 71. For example, it is constituted by parallel-arranging pairs of a photoelectric converter and an electro-optic converter that have different conversion wavelengths according to the number of wavelengths of the optical signals of one wavelength band. This makes it possible to convert optical signals of one wavelength band separated in the splitter 71 to optical signals of different wavelengths converted according to the number of wavelengths of the conversion source.

Note that the splitter 71 can separate an optical signal of the wavelength of a phase modulation optical signal. However, in this case, the wavelength converter is constructed to demodulate a separated phase modulation optical signal and then phase-modulate it into an optical signal of a wavelength different from the wavelength of the conversion source.

As an alteration of the wavelength allocation in the wavelength converter 72, as shown by reference character A in FIG. 38, only the channel of a phase modulation optical signal P vulnerable to cross-phase modulation is shifted to an unused channel on the long wavelength side whose dispersion value is relatively large (preferably, an adjacent unused channel), whereby the influence of cross-phase modulation can be suppressed. As another alteration, as shown by reference character B in FIG. 38, the channels of intensity modulation optical signals I adjacent to the phase modulation optical signal P vulnerable to cross-phase modulation are shifted to unused channels (e.g., channels on the long wavelength side), whereby the channel of the phase modulation optical signal P can be provided with a practical guard band. As still another alteration, as shown by reference character C in FIG. 38, the channels of the phase modulation optical signal P vulnerable to cross-phase modulation and intensity modulation optical signals I adjacent to the phase modulation optical signal P are shifted to channels on the long wavelength side whose dispersion value is large, whereby the influence of cross-phase modulation can be suppressed.

The combiner 73 is a wavelength multiplexing and relaying unit that wavelength-multiplexes optical signals in which wavelength allocation was changed in the wavelength converter 72 and optical signals of another wavelength band from the splitter 71 in which wavelength allocation remains unchanged, and which relays the multiplexed signal. For example, it can be constituted by an optical coupler.

In the optical transmitter 111F constructed as described above, after the controller 3F recognizes, based on management information collected in the information collector 2, that a wavelength multiplexed signal is vulnerable to cross-phase modulation in a transmission fiber to which the multiplexed signal is sent out (e.g., after the controller 3F recognizes that the transmission fiber is a fiber with a small wavelength dispersion value such as the nonzero dispersion-shifted fiber 142), in the span during which the signal is vulnerable to cross-phase modulation, a route in the wavelength-selective switch 71 leading to the wavelength converter 72 is selected for each wavelength in order to change a wavelength pattern so that the nonlinear effect between the wavelengths of an intensity modulation optical signal and a phase modulation optical signal is suppressed.

Thus, by increasing wavelength spacing or chromatic dispersion, the walk-off between signals can be increased, so that the accumulation of phase modulation can be reduced.

Therefore, the seventh embodiment also has the advantage of reducing the influence of cross-phase modulation at the signal receiving end and suppressing transmission quality degradation. In addition, since transmission systems can be easily upgraded by phase modulation optical signals, the enhancement of system performance (a wavelength utilization factor, an OSNR (optical signal-to-noise ratio) characteristic, etc.) can be expected, and the flexibility of network management can be increased.

[H] Eighth Embodiment

Figure 40:
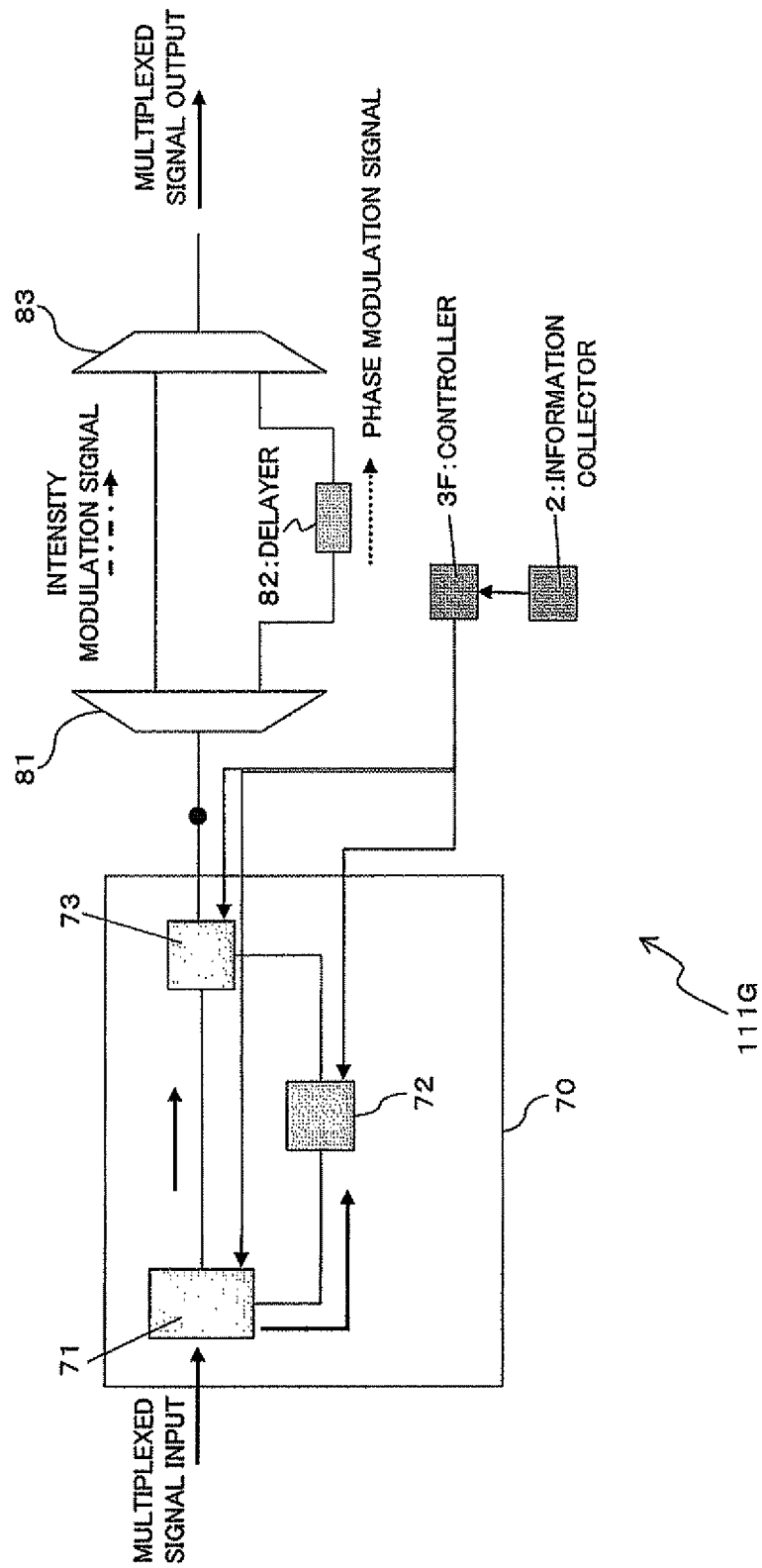
FIG. 40 is a block diagram showing an optical transmitter constructed in accordance with an eighth embodiment of the present invention.

FIG. 40 shows an optical transmitter 111G according to an eighth embodiment of the present invention. The optical transmitter 111G shown in the figure also is used for relaying a wavelength multiplexed signal of an intensity modulation optical signal and a phase modulation optical signal through a transmission line. The optical transmitter 111G includes a wavelength pattern converting unit 70, an information collector 2, and a controller 3F, which are nearly the same as those of the seventh embodiment, and further includes a first interleaving unit (wavelength group dividing unit) 81, a delayer 82, and a second interleaving unit (wavelength group coupling unit) 83.

The wavelength pattern converting unit 70 is constructed to perform conversion of a wavelength pattern on a wavelength multiplexed input signal so that the intensity modulation optical signals and phase modulation optical signals are alternately arranged, and output the wavelength multiplexed optical signal in which the intensity modulation optical signals and phase modulation optical signals are alternately arranged. For this purpose, in the wavelength converter 72, the wavelength conversion function for all wavelength channels is provided for each modulation method (intensity modulation and phase modulation optical signals).

The wavelength group dividing unit 81 divides the wavelength multiplexed signal in which conversion of a wavelength pattern was performed in the wavelength pattern converting unit 70, into two wavelength groups with alternate wavelengths as one wavelength group. That is, because wavelengths different in modulation method have been alternately arranged in the wavelength pattern converting unit 70, one wavelength group consists of optical signals of the wavelength of an intensity modulation optical signal, while the other wavelength group consists of optical signals of the wavelength of a phase modulation optical signal.

The delayer 82 is a bit time difference giving unit that gives a bit time difference between two wavelength groups divided in the wavelength group dividing unit 81. The delayer 82 shown in FIG. 40 is constructed to give a predetermined time delay to the timing at which either of the two wavelength groups divided in the wavelength group dividing unit 81 (i.e., either the intensity modulation signal group or the phase modulation signal group) is output to the wavelength group coupling unit 83.

The wavelength group coupling unit 83 is used for coupling one wavelength group delayed in the delayer 82 and the other wavelength group not delayed in the delayer 82, and outputting the multiplexed signal. Thus, the wavelength group coupling unit 83 functions as a wavelength group coupling unit that couples the two wavelength groups from the wavelength group dividing unit 81 and delayer 82 and outputs the coupled signal.

In the optical transmitter 111G of the eighth embodiment described above, the wavelength pattern converting unit 70 performs wavelength allocation so that intensity modulation and phase modulation optical signals are alternately arranged at even channels and odd channels, respectively. Then, the wavelength group coupling unit 81 divides the phase modulation and intensity modulation optical signals into two wavelength groups. Then, for example, the phase modulation optical signal is given a time delay by being passed through the delayer 82. Therefore, in the case where optical transmitters 111G are interconnected through an optical fiber with a relatively small dispersion value, each optical transmitter 111G can give a time delay difference between the intensity modulation optical signal and the phase modulation optical signal. As a result, since the bit patterns of the intensity modulation and phase modulation optical signals do not overlap at the output side of each optical transmitter, the accumulation of phase modulation due to cross-phase modulation is reduced and the waveform degradation of phase modulation optical signals can be suppressed.

Thus, the eighth embodiment also is able to possess the same advantages as the first embodiment.

[I] Ninth Embodiment

Figure 41:
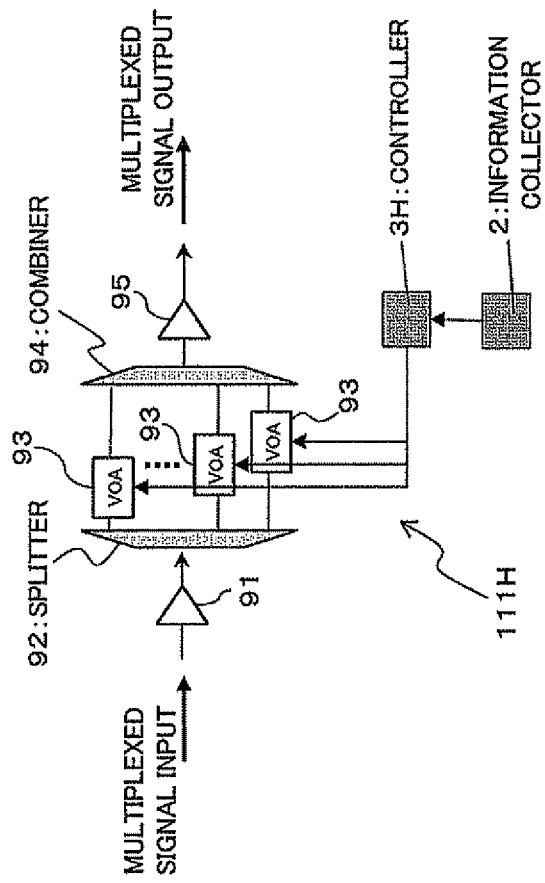
FIG. 41 is a block diagram showing an optical transmitter configured in accordance with a ninth embodiment of the present invention.
Figure 42A:
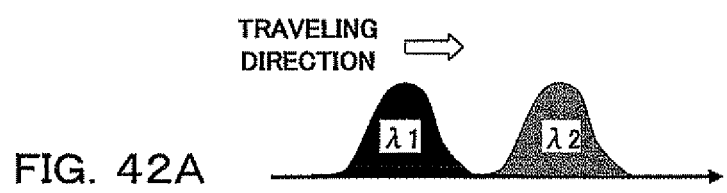
FIGS. 42A, 42B, and 42C, is a conceptual diagram showing the phenomenon of cross-phase modulation between optical pulses.
Figure 42B:
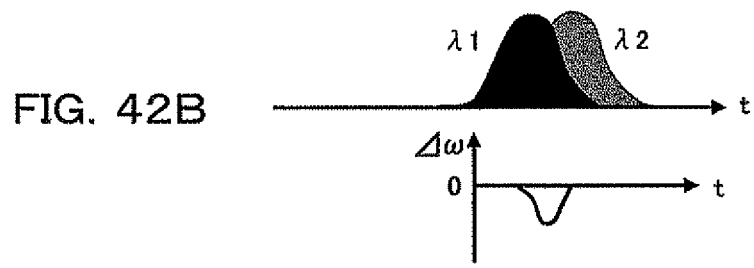
Figure 42C:
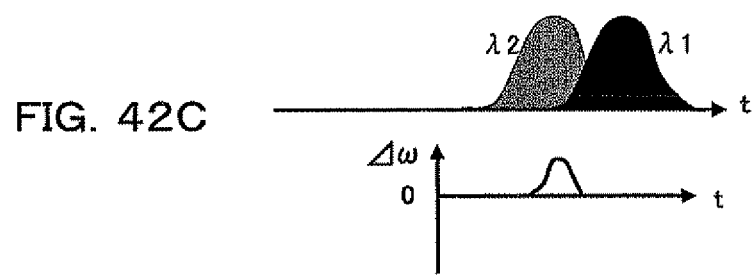
Figure 43A:
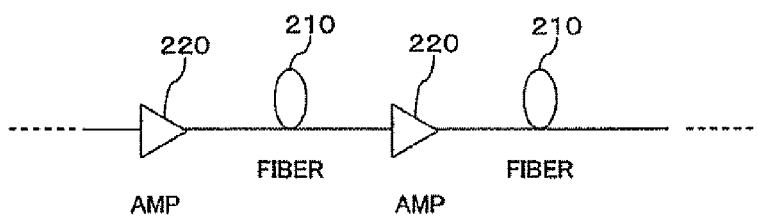
FIGS. 43A, 43B, 43C, and 43D, is a diagram used to explain how chirp remains behind because of cross-phase modulation that arises during each relay span.
Figure 43B:
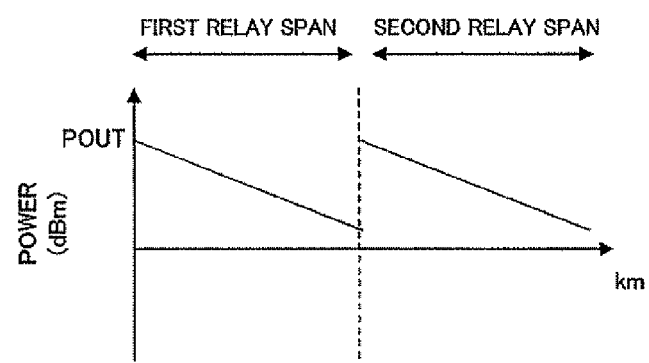
Figure 43C:
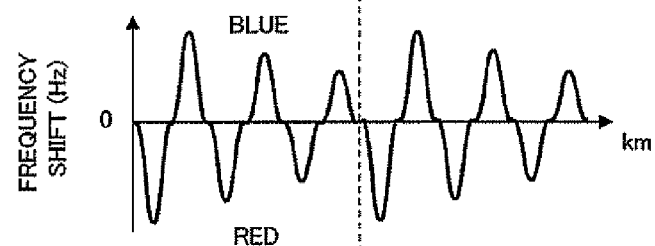
Figure 43D:
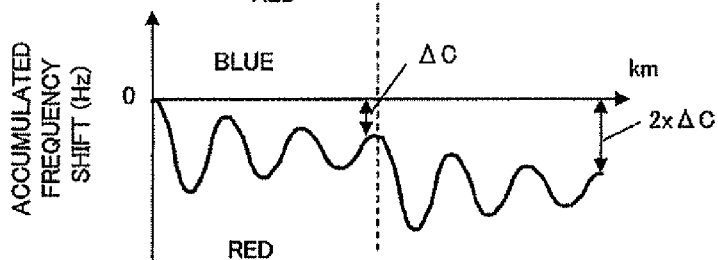

FIG. 41 shows an optical transmitter 111H according to a ninth embodiment of the present invention. The optical transmitter 111H shown in the figure also is used for relaying a wavelength multiplexed signal of intensity modulation and phase modulation optical signals through a transmission line. The optical transmitter 111H includes an information collector 2, which is approximately the same as that of the first embodiment, and further includes an input amplifier 91 for amplifying a wavelength multiplexed input signal, a splitter 92, variable optical attenuators (VOAs) 93, a combiner 94, an output amplifier 95 for amplifying a wavelength multiplexed output signal, and a controller 3H.

The splitter 92 is used for splitting a wavelength multiplexed signal input through the input amplifier 91 into a plurality of wavelengths (channels), and is a separating unit that separates a wavelength multiplexed signal into intensity modulation and phase modulation optical signals. The variable optical attenuators 93 are disposed to correspond to the channels separated in the splitter 92 and functions to give variable attenuation quantities to optical signals of different channels. That is, the variable optical attenuator 93 is an intensity difference giving unit that gives an intensity difference between the phase modulation optical signal and the intensity modulation optical signal separated in the splitter 92.

The combiner 94 is used for combining (wavelength-multiplexing) optical signals of different channels variably attenuated in the variable optical attenuators 93, and is a wavelength multiplexing and relaying unit that wavelength-multiplexes the intensity modulation and phase modulation optical signals given intensity differences in the variable optical attenuators 93 and outputs the wavelength multiplexed signal. Note that the wavelength multiplexed signal combined in the combiner 94 is sent out to a transmission fiber through the output amplifier 95.

After recognizing, based on management information collected in the information collector 2, that a wavelength multiplexed signal is vulnerable to cross-phase modulation in a transmission fiber (e.g., after recognizing a transmission fiber with a small chromatic dispersion value), the controller 3H reduces the output power of the optical transmitter 111H (i.e., the optical power of the intensity modulation and phase modulation optical signals) to suppress the influence of nonlinear effects.

More specifically, the controller 3H controls the variable optical attenuators 93 so that an attenuation quantity at the variable optical attenuator 93 corresponding to the channel of an intensity modulation optical signal differs from that at the variable optical attenuator 93 corresponding to the channel of a phase modulation optical signal (e.g., the attenuation quantity of an intensity modulation optical signal becomes larger than that of a phase modulation optical signal). This can suppress cross-phase modulation (nonlinear effect) that occurs in a transmission fiber, in practically the same manner as the first embodiment. As a result, the optical transmitter 111H of the ninth embodiment is able to suppress the cross-phase modulation between an intensity modulation optical signal and a phase modulation optical signal, and reduce the waveform degradation of phase modulation optical signals due to cross-phase modulation.

Besides, by adjusting the excitation light power of a relay transmitter to give a power difference between phase modulation and intensity modulation optical signals, the waveform degradation of phase modulation optical signals due to cross-phase modulation can be reduced.

[J] Other Embodiments

While the present invention has been described with reference to the preferred embodiments thereof, the invention is not to be limited to the details given herein, but may be modified within the scope of the invention hereinafter claimed.

For example, the above embodiments may be carried out independently of each other, and as set forth above, some embodiments may be carried out in combination with each other.

Now that the preferred embodiments of the present invention have been described, it will be apparent to those skilled in this art that the optical transmitter of the present invention can be easily carried out and manufactured.

What is claimed is:

1. An optical transmission system transmitting a wavelength multiplexed signal through a transmission line, the optical transmission system comprising:
   a time difference given signal generator which generates a time difference, and gives the time difference between an intensity modulation optical signal of a first channel and a phase modulation optical signal of a second channel different from the first channel both of which are included in said wavelength multiplexed signal; and
   a wavelength multiplexed signal output unit to which said intensity modulation optical signal and said phase modulation optical signal are input from said time difference given signal generator, and which generates and outputs a wavelength multiplexed signal in which said time difference was given between said intensity modulation optical signal and said phase modulation optical signal, wherein
   said time difference given signal generator comprises:
   a splitter to split said wavelength multiplexed signal into said intensity modulation optical signal and said phase modulation optical signal; and
   a time difference giving unit to give a time difference between said intensity modulation optical signal and said phase modulation optical signal split in said splitter, wherein
   said wavelength multiplexed signal output unit comprises a wavelength-selective switch, and wherein
   said optical transmission system comprises:
   an information collector to collect network management information on properties of transmission lines constituting a network to which said optical transmission system is applied, and about methods in which optical signals are modulated; and
   a controller to control wavelength selection that is performed in said wavelength-selective switch, based on said management information collected in said information collector.

2. The optical transmission system as set forth in claim 1, wherein said time difference given signal generator is constructed such that said intensity modulation optical signal and said phase modulation optical signal are given a time delay difference with each other by delaying one of two timings at which said intensity modulation optical signal and said phase modulation optical signal are input to said wavelength multiplexed signal output unit, with respect to the other of said two timings.

3. The optical transmission system as set forth in claim 1, wherein said time difference given signal generator is constructed such that as said two optical signals, it generates optical signals loaded with different chromatic dispersion quantities.

4. The optical transmission system as set forth in claim 1, wherein said optical transmission system includes a plurality of optical transmitters configurable to transmit said wavelength multiplexed signal which are connected in multiple stages through transmission lines in said optical transmission system;
   wherein each said optical transmitter includes a dispersion compensating unit to compensate for chromatic dispersion of a wavelength multiplexed signal that was input through an upstream transmission line;
   and wherein said time difference given signal generator is constructed to generate optical signals having said time difference so that a time difference larger than a residual dispersion quantity after said compensation is given between said intensity modulation optical signal and said phase modulation optical signal that are input through said dispersion compensating unit.

5. The optical transmission system as set forth in claim 1, further comprising an amplifying unit to amplify the wavelength multiplexed signal that is output from said wavelength multiplexed signal output unit.

6. The optical transmission system as set forth in claim 1, wherein said optical transmission system includes an optical communication system in which a plurality of optical transmitters to transmit said wavelength multiplexed signal are connected in multiple stages through transmission lines, and which each said optical transmitter includes a dispersion compensating unit to compensate for chromatic dispersion of a wavelength multiplexed signal that was input through an upstream transmission line;

and wherein said time difference between the optical signals generated in said time difference given signal generator is a time difference such that a time difference larger than a quantity of a residual dispersion quantity at an end receiving said wavelength multiplexed signal is given between said intensity modulation optical signal and said phase modulation optical signal that are output from said wavelength multiplexed signal output unit.

7. The optical transmission system as set forth in claim 1, wherein said transmission line comprises a dispersion-shifted fiber.

8. An optical transmission system transmitting a wavelength multiplexed signal through a transmission line, the optical transmission system comprising:
a time difference given signal generator which generates a time difference, and gives the time difference between an intensity modulation optical signal of a first channel and a phase modulation optical signal of a second channel different from the first channel both of which are included in said wavelength multiplexed signal; and
a wavelength multiplexed signal output unit to which said intensity modulation optical signal and said phase modulation optical signal are input from said time difference given signal generator, and which generates and outputs a wavelength multiplexed signal in which said time difference was given between said intensity modulation optical signal and said phase modulation optical signal, wherein
said time difference given signal generator comprises:
a separator to separate said wavelength multiplexed signal into said phase modulation optical signal and said intensity modulation optical signal; and
a time difference giving unit to give a time difference between said phase modulation optical signal and intensity modulation optical signal separated in said separator, and wherein said optical transmission system further comprising:
an information collector to collect network management information on properties of transmission lines constituting a network to which said optical transmission system is applied, and about methods in which optical signals are modulated; and
a controller to control the signal separation that is performed in said separator, based on said management information collected in said information collector.

9. An apparatus comprising:
a wavelength demultiplexer configured to demultiplex an input light into an intensity-modulated signal light with a first wavelength and a phase-modulated signal light with a second wavelength different from the first wavelength;
an optical delayer configured to give a time delay difference between the intensity-modulated signal light with the first wavelength and the phase-modulated signal light with the second wavelength to reduce a cross-phase modulation between the both signal lights output from the wavelength demultiplexer;
a wavelength multiplexer configured to multiplex the intensity-modulated signal light and the phase-modulated signal light to output a multiplexed signal light;
an information collector to collect network management information on properties of transmission lines constituting a network to which an optical transmission system is applied, and about methods in which optical signals are modulated; and
a controller to control the demultiplexing in said wavelength demultiplexer based on said management information collected in said information collector.

10. The apparatus as set forth in claim 9, wherein the time delay value of the optical delayer is controllable.

\* \* \* \* \*

UNITED STATES PATENT AND TRADEMARK OFFICE
CERTIFICATE OF CORRECTION

| | | |
|---|---|---|
| PATENT NO. | : 8,625,996 B2 | Page 1 of 1 |
| APPLICATION NO. | : 11/939646 | |
| DATED | : January 7, 2014 | |
| INVENTOR(S) | : Tanaka et al. | |

It is certified that error appears in the above-identified patent and that said Letters Patent is hereby corrected as shown below:

On the Title Page, In Column 2 (Abstract), Line 13, Delete "phase" and insert -- intensity --, therefor.

Signed and Sealed this
Twenty-ninth Day of April, 2014

Michelle K. Lee
*Deputy Director of the United States Patent and Trademark Office*